US011041636B2

(12) United States Patent
Walker

(10) Patent No.: US 11,041,636 B2
(45) Date of Patent: *Jun. 22, 2021

(54) COGENERATION SYSTEMS AND METHODS FOR GENERATING HEATING AND ELECTRICITY

(71) Applicant: IMBY ENERGY, INC., Peterborough, NH (US)

(72) Inventor: Steve Walker, Peterborough, NH (US)

(73) Assignee: IMBY Energy, Inc., Peterborough, NH (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/017,187

(22) Filed: Jun. 25, 2018

(65) Prior Publication Data

US 2018/0372333 A1 Dec. 27, 2018

Related U.S. Application Data

(60) Provisional application No. 62/525,513, filed on Jun. 27, 2017.

(51) Int. Cl.
*F24D 11/02* (2006.01)
*F01K 25/10* (2006.01)
(Continued)

(52) U.S. Cl.
CPC .......... *F24D 11/0278* (2013.01); *F01K 25/10* (2013.01); *F24D 3/08* (2013.01);
(Continued)

(58) Field of Classification Search
CPC .... F24D 11/0278; F24D 11/00; F24D 11/002; F24D 11/0214; F24D 3/08; F24D 3/18;
(Continued)

(56) References Cited

U.S. PATENT DOCUMENTS 2,299,531 A * 10/1942 Crawford ............... F24F 3/001
62/157
3,858,802 A * 1/1975 Stobart .................. F02G 1/055
237/12.1
(Continued)

FOREIGN PATENT DOCUMENTS

EP 1096120 A2 * 5/2001 ............. F02N 19/02
EP 1628091 A2 * 2/2006 ............. F25B 13/00
(Continued)

OTHER PUBLICATIONS

Office Action dated Apr. 24, 2020, related to U.S. Appl. No. 16/017,296.
(Continued)

*Primary Examiner* — Daniel E. Namay
(74) *Attorney, Agent, or Firm* — Dinsmore & Shohl LLP

(57) ABSTRACT

Systems and methods utilize a cogeneration system for providing heating, cooling, and/or electricity to an enclosure. The system includes a heat engine for heating and supplying electricity to the enclosure through fluid transfer from the heat engine to the enclosure to transfer thermal energy from the fluid to the enclosure. The system further includes a heat pump configured to supply at least heating and cooling to the enclosure through movement of fluid from the heat pump to the enclosure to transfer thermal energy from the fluid to the enclosure.

16 Claims, 23 Drawing Sheets

(51) Int. Cl.

| | | |
|---|---|---|
| *F24F 3/10* | (2006.01) | |
| *F25B 30/02* | (2006.01) | |
| *H02K 7/18* | (2006.01) | |
| *F28D 20/00* | (2006.01) | |
| *F24D 3/08* | (2006.01) | |
| *F24D 11/00* | (2006.01) | |
| *F24D 15/04* | (2006.01) | |
| *F25B 30/06* | (2006.01) | |
| *F24D 3/18* | (2006.01) | |
| *F25B 25/00* | (2006.01) | |
| *F25B 27/02* | (2006.01) | |

(52) U.S. Cl.
CPC ............... *F24D 3/18* (2013.01); *F24D 11/00* (2013.01); *F24D 11/002* (2013.01); *F24D 15/04* (2013.01); *F24F 3/10* (2013.01); *F25B 30/02* (2013.01); *F25B 30/06* (2013.01); *F28D 20/0034* (2013.01); *H02K 7/1815* (2013.01); *F24D 2200/26* (2013.01); *F24H 2240/02* (2013.01); *F25B 25/005* (2013.01); *F25B 27/02* (2013.01); *F25B 2339/047* (2013.01); *F28D 2020/0069* (2013.01)

(58) Field of Classification Search
CPC ...... F24D 15/04; F24D 2200/26; F24D 12/02; F01K 25/10; F24F 3/10; F25B 30/02; F25B 30/06; F25B 25/005; F25B 27/02; F25B 2339/047; F28D 20/0034; F28D 2020/0069; H02K 7/1815; F24H 2240/02
USPC ........ 237/2 A, 2 B, 2 R, 8 A, 8 B, 8 R, 12.1, 237/13, 16, 19; 60/614, 624, 320, 597, 60/648, 206, 266, 272, 280, 604; 62/238.7; 122/1 R; 126/19.5, 344; 219/200, 201
See application file for complete search history.

(56) References Cited

U.S. PATENT DOCUMENTS

| | | | | |
|---|---|---|---|---|
| 4,754,607 | A * | 7/1988 | Mackay | F02C 6/18 237/12.1 |
| 4,873,840 | A * | 10/1989 | Gilliusson | F01K 17/02 62/238.6 |
| 4,976,464 | A | 12/1990 | Swenson | |
| 4,987,748 | A * | 1/1991 | Meckler | F02G 1/043 62/176.1 |
| 5,131,238 | A * | 7/1992 | Meckler | F02G 1/043 62/271 |
| 5,181,387 | A * | 1/1993 | Meckler | F02G 1/043 62/176.1 |
| 5,537,823 | A | 7/1996 | Vogel | |
| 5,632,442 | A * | 5/1997 | Misawa | F02D 29/04 165/240 |
| 6,290,142 | B1 * | 9/2001 | Togawa | F02G 5/00 237/12.1 |
| 6,435,420 | B1 * | 8/2002 | Kasai | F02G 5/00 237/12.1 |
| 6,523,357 | B1 * | 2/2003 | Katayama | F25B 15/06 62/141 |
| 6,966,185 | B2 | 11/2005 | Shimada et al. | |
| 7,114,351 | B2 | 10/2006 | Jones, Jr. et al. | |
| 7,145,258 | B2 | 12/2006 | Kang et al. | |
| 7,170,191 | B2 | 1/2007 | Kang et al. | |
| 7,174,727 | B2 * | 2/2007 | Kim | F25B 27/00 62/115 |
| 7,240,504 | B2 * | 7/2007 | Cho | F02G 5/02 62/238.7 |
| 7,240,505 | B2 * | 7/2007 | Kim | F25B 13/00 62/238.7 |
| 7,243,504 | B2 * | 7/2007 | Kang | F25B 13/00 62/238.7 |
| 7,243,505 | B2 | 7/2007 | Cho et al. | |
| 7,240,503 | B2 | 10/2007 | Kang et al. | |
| 7,275,382 | B2 * | 10/2007 | Cho | F25B 13/00 62/238.7 |
| 7,305,840 | B2 * | 12/2007 | Kang | F24F 3/1423 62/238.7 |
| 7,305,841 | B2 * | 12/2007 | Ryu | F25B 13/00 62/238.7 |
| 7,466,034 | B2 * | 12/2008 | Kang | F25B 27/02 290/40 C |
| 7,481,071 | B2 * | 1/2009 | Choi | F25B 13/00 62/238.7 |
| 7,600,695 | B2 * | 10/2009 | Kang | F25B 27/00 237/12.1 |
| 8,011,598 | B2 | 9/2011 | Kelly et al. | |
| 8,245,948 | B2 * | 8/2012 | Cho | F25B 27/02 237/12.1 |
| 8,371,512 | B2 * | 2/2013 | Douarre | B60H 1/004 237/2 B |
| 9,038,390 | B1 | 5/2015 | Kreuger | |
| 9,429,018 | B2 | 8/2016 | Zachary et al. | |
| 9,890,664 | B2 * | 2/2018 | Benson | F01K 13/006 |
| 9,927,157 | B2 * | 3/2018 | Benson | F25B 27/02 |
| 2001/0049933 | A1 * | 12/2001 | Iwamoto | F25B 17/12 60/785 |
| 2002/0108745 | A1 * | 8/2002 | Kimura | F28D 20/0056 165/236 |
| 2003/0051496 | A1 * | 3/2003 | Fukushima | F28D 20/02 62/238.3 |
| 2004/0007879 | A1 * | 1/2004 | Ruggieri | F22B 21/26 290/52 |
| 2004/0084905 | A1 | 5/2004 | Strand | |
| 2006/0037338 | A1 * | 2/2006 | Kim | F25B 27/02 62/238.7 |
| 2006/0037341 | A1 * | 2/2006 | Kang | F25B 27/02 62/323.1 |
| 2006/0037343 | A1 * | 2/2006 | Kang | F25B 13/00 62/323.1 |
| 2006/0037344 | A1 * | 2/2006 | Cho | F25B 27/02 62/323.1 |
| 2006/0037347 | A1 * | 2/2006 | Kang | F25D 21/04 62/323.3 |
| 2006/0037348 | A1 * | 2/2006 | Kang | F25B 27/02 62/323.3 |
| 2006/0037351 | A1 * | 2/2006 | Kim | F25B 27/02 62/323.3 |
| 2006/0037352 | A1 * | 2/2006 | Cho | F25B 13/00 62/323.3 |
| 2006/0037742 | A1 * | 2/2006 | Kim | F25B 13/00 165/201 |
| 2006/0123818 | A1 * | 6/2006 | Kim | F25B 27/02 62/236 |
| 2006/0123819 | A1 * | 6/2006 | Choe | F25B 27/02 62/238.3 |
| 2006/0123820 | A1 * | 6/2006 | Kim | F25B 13/00 62/238.7 |
| 2006/0123821 | A1 * | 6/2006 | Ryu | F25B 13/00 62/238.7 |
| 2006/0123822 | A1 * | 6/2006 | Cho | F25B 13/00 62/238.7 |
| 2006/0123823 | A1 * | 6/2006 | Ha | F25B 13/00 62/238.7 |
| 2006/0144067 | A1 * | 7/2006 | Choi | F25B 27/02 62/238.7 |
| 2006/0144585 | A1 * | 7/2006 | Ha | F01N 3/2889 126/307 R |
| 2006/0191265 | A1 * | 8/2006 | Kang | F24F 1/56 60/659 |
| 2006/0242977 | A1 * | 11/2006 | Cho | F25B 27/00 62/238.7 |
| 2006/0254294 | A1 * | 11/2006 | Shimamoto | F24F 3/065 62/238.7 |
| 2006/0283967 | A1 * | 12/2006 | Cho | F25B 27/02 237/12.1 |

(56) References Cited

U.S. PATENT DOCUMENTS

| | | | |
|---|---|---|---|
| 2007/0012058 A1* | 1/2007 | Cho | F25B 27/00 62/238.7 |
| 2007/0012418 A1 | 1/2007 | Cho et al. | |
| 2008/0022707 A1 | 1/2008 | Cho et al. | |
| 2008/0022708 A1* | 1/2008 | Cho | F25B 13/00 62/238.7 |
| 2008/0023961 A1* | 1/2008 | Cho | F25B 27/02 290/2 |
| 2008/0061158 A1* | 3/2008 | Nakagawa | F24D 11/005 237/12.1 |
| 2008/0197206 A1* | 8/2008 | Murakami | F25B 13/00 237/2 B |
| 2010/0072292 A1* | 3/2010 | Munro | F24H 3/08 237/53 |
| 2011/0296849 A1* | 12/2011 | Benson | F25B 7/00 62/6 |
| 2012/0006023 A1* | 1/2012 | Johnson | F01K 25/10 60/645 |
| 2012/0255302 A1* | 10/2012 | Hugelman | F22B 1/167 60/651 |
| 2013/0126625 A1* | 5/2013 | Groskreutz | F24D 19/1051 237/8 A |
| 2013/0205814 A1* | 8/2013 | Hayashida | F24D 19/1039 62/115 |
| 2014/0013785 A1* | 1/2014 | Takemoto | F25B 30/02 62/238.7 |
| 2014/0033743 A1* | 2/2014 | Hancock | F25B 27/02 62/79 |
| 2014/0041387 A1* | 2/2014 | Benson | F01K 13/006 60/655 |
| 2019/0383232 A1* | 12/2019 | Seong | F25B 27/02 |
| 2020/0088450 A1* | 3/2020 | Watson | F02G 5/02 |

FOREIGN PATENT DOCUMENTS

| | | | | |
|---|---|---|---|---|
| EP | 1628092 A2 | * | 2/2006 | F25B 40/04 |
| EP | 1628094 A2 | * | 2/2006 | F25B 13/00 |
| EP | 1628097 A2 | * | 2/2006 | F25B 13/00 |
| EP | 1628098 A2 | * | 2/2006 | F25B 13/00 |
| EP | 1628099 A2 | * | 2/2006 | F25B 27/00 |
| EP | 1628100 A2 | * | 2/2006 | F01N 5/02 |
| EP | 1669585 A2 | * | 6/2006 | F25B 13/00 |
| EP | 1717529 A2 | * | 11/2006 | F25B 27/00 |
| EP | 1719962 A2 | * | 11/2006 | F25B 13/00 |
| EP | 1734317 A1 | * | 12/2006 | F25B 13/00 |
| EP | 1744109 A2 | * | 1/2007 | F25B 13/00 |
| EP | 1744110 A2 | * | 1/2007 | F25B 13/00 |
| EP | 1882890 A2 | * | 1/2008 | F25B 27/02 |
| EP | 1882891 A2 | * | 1/2008 | F25B 13/00 |

OTHER PUBLICATIONS

Office Action dated Apr. 22, 2020, related to U.S. Appl. No. 16/017,050.

* cited by examiner

COGENERATION SYSTEMS AND METHODS FOR GENERATING HEATING AND ELECTRICITY

CROSS REFERENCE TO RELATED APPLICATIONS

This disclosure claims priority to U.S. Provisional App. No. 62/525,513, filed Jun. 27, 2017, entitled "COGENERATION SYSTEM FOR GENERATING HEATING, COOLING, AND/OR ELECTRICITY," the entirety of which is incorporated by reference herein. This application is related, but does not claim priority, to U.S. patent Ser. Nos. 16/017,296 and 16/017,050 and International PCT Patent Application Serial No. PCT/US2018/039310, each of which were filed on the same date as the present application.

FIELD OF THE DISCLOSURE

This disclosure relates to a cogeneration system, and more particularly to a cogeneration system for generating heating, cooling, and/or electricity.

BACKGROUND

Many communities today receive electric power from a central power station (e.g., a power plant) via a network of a transmission and distribution lines otherwise known as the grid. Centralized power stations typically process fuel (e.g., coal, natural gas, nuclear, oil,) to generate thermal energy which drives a heat engine to produce mechanical work which is then converted into electricity. These power stations may include a prime mover, such as a steam or gas turbine, to accomplish work. Using the thermal energy generated by processing the fuel (e.g., through combustion or chemical reaction) the prime mover can be operated (e.g., using dynamic gas or vapor pressure) to perform work. The prime mover is commonly coupled to a generator to convert mechanical work into electricity. The generator may produce electricity in response to movement of the prime mover (e.g., rotation of a shaft coupled to the prime mover). This electricity can then be supplied to consumers via the transmission and distribution lines of the network.

SUMMARY

In an embodiment, a cogeneration system for providing heating, cooling, and electricity to an enclosure may include a heat engine configured for heating and supplying electricity to the enclosure, a heat pump configured for heating and cooling of the enclosure, a first conduit coupled to the heat engine, a second conduit coupled to the heat pump, and a third conduit coupled to the heat pump, wherein the heat pump may be configured to supply heating and cooling to the enclosure simultaneously. The first conduit may be filled with a first heat transfer fluid, and the first conduit may be constructed and arranged to transfer the first heat transfer fluid from the heat engine to the enclosure such that thermal energy is transferred from the first heat transfer fluid to the enclosure to provide heating to the enclosure. The second conduit may be filled with the first heat transfer fluid, and the second conduit may be constructed and arranged to transfer the first heat transfer fluid from the heat pump to the enclosure such that thermal energy is transferred from the first heat transfer fluid to the enclosure to provide heating to the enclosure. The third conduit may be filled with a second heat transfer fluid, and the third conduit may be constructed and arranged to transfer the second heat transfer fluid from the heat pump to the enclosure such that thermal energy is absorbed by the second heat transfer fluid from the enclosure to provide cooling to the enclosure.

The heat engine may further include a heat exchanger, and the first conduit may be coupled to the heat exchanger to transfer thermal energy from the heat engine to the enclosure. The first conduit and the second conduit may be constructed and arranged to transfer thermal energy via the first heat transfer fluid to the enclosure to provide space heating to the enclosure. The cogeneration system may further include a heating system heat exchanger constructed and arranged to be coupled to a heating system associated with the enclosure, and the first conduit and the second conduit may be fluidly coupled to the heating system heat exchanger such that thermal energy is transferred from the first heat transfer fluid to the heating system heat exchanger to provide heating to the enclosure. The cogeneration system may be in combination with the heating system associated with the enclosure. The cogeneration system may further include a thermal storage system heat exchanger constructed and arranged to be coupled to a thermal storage system associated with the enclosure, and the first conduit and the second conduit may be fluidly coupled to the thermal storage system heat exchanger such that thermal energy is transferred from the first heat transfer fluid to the thermal storage system heat exchanger. The cogeneration system may be in combination with the thermal storage system. The thermal storage system may be a hot water storage tank, and the first conduit and the second conduit may be fluidly coupled to the thermal storage system heat exchanger to transfer thermal energy from the first heat transfer fluid to the thermal storage system heat exchanger to heat water in the hot water storage tank. The cogeneration system may further include a cooling system heat exchanger, constructed and arranged to be coupled to a cooling system associated with the enclosure, and the third conduit may be fluidly coupled to said cooling system heat exchanger so that the second heat transfer fluid absorbs thermal energy from the enclosure to provide cooling to the enclosure. The cogeneration system may be in combination with the cooling system associated with the enclosure.

In embodiments, the first heat transfer fluid and the second heat transfer fluid may contain glycol. The heat engine further may include a generator and the heat pump further may be an electric motor. The generator may be constructed and arranged to selectively provide electricity to the electric motor of the heat pump. The heat pump may be constructed and arranged to provide heating and cooling to the enclosure without requiring operation of the heat engine. The heat engine may be constructed and arranged to provide heating and electricity to the enclosure without requiring operation of the heat pump. The heat engine and the heat pump may be constructed and arranged to be operated simultaneously so that the heat engine provides heating and electricity to the enclosure and provides electricity to operate the heat pump, and the heat pump provides heating and cooling to the enclosure.

In another embodiment, a cogeneration system for providing heating and electricity to an enclosure may include a heat engine configured for heating and supplying electricity to the enclosure, a heat pump configured for heating of the enclosure, a first conduit coupled to the heat engine, and a second conduit coupled to the heat pump and the first conduit. Said first conduit may be filled with a heat transfer fluid, and the first conduit may be constructed and arranged to transfer the heat transfer fluid from the heat engine to the enclosure such that thermal energy is transferred from the heat transfer fluid to the enclosure to provide heating to the enclosure. The second conduit may be filled with the heat transfer fluid, and said second conduit may be constructed and arranged to transfer the heat transfer fluid from the heat pump to the enclosure such that thermal energy is transferred from the heat transfer fluid to the enclosure to provide heating to the enclosure. The first conduit and the second conduit may be fluidly coupled such that the heat transfer fluid in the first conduit is the same as the heat transfer fluid in the second conduit.

Said first conduit may be coupled to the second conduit in series such that either the heat transfer fluid moves from the second conduit into the first conduit, or the heat transfer fluid moves from the first conduit into the second conduit. The heat engine may further include a heat exchanger, and the first conduit may be coupled to the heat exchanger to transfer thermal energy from the heat exchanger to the enclosure, and the heat pump further may include a condenser. The second conduit may be coupled to the condenser to transfer the thermal energy from the condenser to the enclosure. In an embodiment, the first conduit is coupled to the second conduit in series such that either the heat transfer fluid moves from the condenser of the heat pump into the heat exchanger of the heat engine, or the heat transfer fluid moves from the heat exchanger of the heat engine into the condenser of the heat pump. In another embodiment, the cogeneration system may further include valve coupling the first conduit to the second conduit, and the first conduit may be coupled to the second conduit in parallel such that the heat transfer fluid from the first conduit is selectively mixed by the valve with the heat transfer fluid from the second conduit. The heat engine may further include a heat exchanger, and the first conduit may be coupled to the heat exchanger to transfer thermal energy from the heat exchanger to the enclosure, the heat pump may further include a condenser, and the second conduit may be coupled to the condenser to transfer the thermal energy from the condenser to the enclosure, and the first conduit may be coupled to the second conduit in parallel such that the heat transfer fluid that moves through the condenser of the heat pump is selectively mixed by the valve with the heat transfer fluid that moves through the heat exchanger of the heat engine. In embodiments, the heat transfer fluid within the first conduit and the heat transfer fluid within the second conduit contains glycol. The cogeneration system may further include a third conduit coupled to the heat pump. The third conduit may be filled with the heat transfer fluid, and the third conduit may be constructed and arranged to transfer the heat transfer fluid from the heat pump to a heat source such that thermal energy is absorbed from the heat source by the heat transfer fluid to operate the heat pump and thereby provide cooling to the enclosure. The first conduit and the second conduit may form a separate piping system from the third conduit so that the enclosure absorbs thermal energy from the heat transfer fluid in the first and second conduits and the heat transfer fluid in the third conduit absorbs thermal energy from the heat source. The heat transfer fluid within the third conduit may not be mixed with the heat transfer fluid within the first conduit and the second conduit.

In yet another embodiment, a cogeneration system for providing heating and electricity to an enclosure may include a heat engine configured to produce heating and electricity for the enclosure, a heat pump configured to produce heating for the enclosure, a heat reservoir constructed and arranged to transfer thermal energy from an area outside of the enclosure to the heat pump, a thermal storage system associated with the enclosure and including a thermal storage system heat exchanger, a first conduit coupled to the heat engine, and a second conduit coupled to the heat pump. The first conduit may be filled with a first heat transfer fluid, and the first conduit may be constructed and arranged to transfer the first heat transfer fluid from the heat engine to the thermal storage system heat exchanger such that thermal energy is transferred from the first heat transfer fluid to the thermal storage system. The second conduit may be filled with the first heat transfer fluid, and the second conduit may be constructed and arranged to transfer the first heat transfer fluid from the heat pump to the thermal storage system heat exchanger such that thermal energy is transferred from the first heat transfer fluid to the thermal storage system. The first conduit and the second conduit may be fluidly coupled to the thermal storage system heat exchanger such that the first heat transfer fluid from the first conduit and the second conduit is transferred to the thermal storage system heat exchanger to store thermal energy within the thermal storage system.

The thermal storage system may be a hot water storage tank, and the first conduit and the second conduit may be fluidly coupled to the thermal storage system heat exchanger to transfer the first heat transfer fluid from the first conduit and the second conduit to the thermal storage system heat exchanger to transfer thermal energy from the first heat transfer fluid to a fluid within the hot water storage tank. The cogeneration system may further include a heating system heat exchanger constructed and arranged to be coupled to a heating system associated with the enclosure, and the first conduit and the second conduit may be fluidly coupled to the heating system heat exchanger to transfer the first heat transfer fluid from the first conduit and the second conduit to the heating system heat exchanger to provide heating to the enclosure. The cogeneration system may further include a third conduit coupled to the heat pump, the third conduit filled with a second heat transfer fluid, and the third conduit constructed and arranged to transfer the second heat transfer fluid from the heat pump to a heat source at which thermal energy is absorbed from the heat source by the second heat transfer fluid. The first conduit and the second conduit may be fluidly coupled to the thermal storage system heat exchanger such that the first heat transfer fluid is transferred from the first conduit and the second conduit to the thermal storage system heat exchanger to store thermal energy within the thermal storage system, and the third conduit is fluidly coupled to a cooling system heat exchanger to transfer the second heat transfer fluid from the cooling system heat exchanger to the heat pump to cool the enclosure.

In one other embodiment, a cogeneration system for providing heating, cooling and electricity to an enclosure may include a heat engine configured to produce heating and electricity for the enclosure, a heat pump configured to produce heating and cooling for the enclosure, a first conduit coupled to the heat engine, a second conduit coupled to the heat pump, a third conduit coupled to the heat pump, and a valve arrangement. The first conduit may be filled with a first heat transfer fluid, and the first conduit may be constructed and arranged to transfer the first heat transfer fluid from the heat engine to the enclosure such that thermal energy is transferred from the first heat transfer fluid to the enclosure to provide heating to the enclosure. The second conduit may be filled with the first heat transfer fluid, and the second conduit may be constructed and arranged to transfer the first heat transfer fluid from the heat pump to the enclosure such that thermal energy is transferred from the first heat transfer fluid to the enclosure to provide heating to the enclosure. Said third conduit may be filled with a second heat transfer fluid, and the third conduit may be constructed and arranged to transfer the second heat transfer fluid from the heat pump to the enclosure such that thermal energy is absorbed by the second heat transfer fluid from the enclosure to provide cooling to the enclosure. The valve arrangement may be constructed and arranged to selectively couple the first conduit and the second conduit to transfer the first heat transfer fluid to the enclosure to provide at least one of space heating and water heating, and to selectively couple the third conduit to transfer the second heat transfer fluid to the enclosure to provide at least one of space cooling and a source of thermal energy for the heat pump.

The cogeneration system may further include a heating system heat exchanger constructed and arranged to be coupled to a heating system associated with the enclosure, and the valve arrangement may be constructed and arranged to selectively couple the first conduit and the second conduit with the heating system to selectively transfer the first heat transfer fluid to the heating system heat exchanger via the first conduit and the second conduit. The cogeneration system may further include a thermal storage system heat exchanger constructed and arranged to be coupled to a thermal storage system associated with the enclosure, and the valve arrangement may be constructed and arranged to selectively couple the third conduit with the thermal storage system to selectively transfer the second heat transfer fluid to the thermal storage system heat exchanger via the third conduit. The cogeneration system may be in combination with the thermal storage system associated with the enclosure. The valve arrangement may be constructed and arranged to selectively couple the third conduit with the thermal storage system heat exchanger to selectively transfer heat transfer fluid to the heat pump via the third conduit. The cogeneration system may further include a heat reservoir constructed and arranged to be coupled to a thermal storage system heat exchanger associated with the enclosure, and the valve arrangement may be constructed and arranged to selectively couple the third conduit with the thermal storage system heat exchanger to selectively transfer the second heat transfer fluid to the heat reservoir via the third conduit.

In yet one other embodiment, a cogeneration system for providing heating, cooling, and electricity to an enclosure may include a heat engine configured for heating and supplying electricity to the enclosure, a heat pump configured for heating and cooling of the enclosure, a first conduit coupled to the heat engine, a second conduit coupled to the heat pump, and a third conduit coupled to said heat pump. The heat engine may be configured to supply electricity to operate the heat pump. The first conduit may be filled with a first heat transfer fluid, and the first conduit may be constructed and arranged to transfer the first heat transfer fluid from the heat engine to the enclosure such that thermal energy is transferred from the first heat transfer fluid to the enclosure to provide heating to the enclosure. The second conduit may be filled with the first heat transfer fluid, and the second conduit may be constructed and arranged to transfer the first heat transfer fluid from the heat pump to the enclosure such that thermal energy is transferred from the first heat transfer fluid to the enclosure to provide heating to the enclosure. Said third conduit may be filled with a second heat transfer fluid, and the third conduit may be constructed and arranged to transfer the second heat transfer fluid from the heat pump to the enclosure such that thermal energy is absorbed by the second heat transfer fluid from the enclosure to provide cooling to the enclosure.

The cogeneration system may further include a generator constructed and arranged to be coupled to the heat engine, an electrical storage system constructed and arranged to be coupled to the generator using one or more electrical cables, and a power panel constructed and arranged to be coupled to the generator and configured to distribute electricity to the enclosure. The electrical storage system may be configured to receive electricity provided by the generator, and to selectively transfer the electricity to one of the heat pump and the power panel. The cogeneration system may further include an electrical grid isolation device constructed and arranged to decouple the power panel from an electrical grid meter. The cogeneration system may further include an electrical grid isolation device constructed and arranged to decouple the power panel from an electrical grid meter if the enclosure is receiving power from the generator coupled to the heat engine. The cogeneration system may further include an electrical grid isolation device constructed and arranged to enable electricity produced by the generator associated with the heat engine to be transferred to one or more energy suppliers.

In one another embodiment, a cogeneration system for providing at least heating to an enclosure may include a heat engine configured for heating to the enclosure, a heat pump configured for heating the enclosure, a first conduit coupled to the heat engine, and a second conduit coupled to the heat pump. The cogeneration system may further be for providing electricity to the enclosure, and the heat engine configured for heating and supplying electricity to the enclosure. The first conduit may filled with a first heat transfer fluid constructed and arranged to transfer the first heat transfer fluid from the heat engine to the enclosure such that thermal energy is transferred from the first heat transfer fluid to the enclosure to provide heating to the enclosure. The second conduit may be filled with the first heat transfer fluid and constructed and arranged to transfer the first heat transfer fluid from the heat pump to the enclosure such that thermal energy is transferred from the first heat transfer fluid to the enclosure to provide heating to the enclosure. The first conduit and the second conduit may be fluidly coupled and configured to at least one of proportion and thermally isolate the first heat transfer fluid between the first conduit and the second conduit.

The heat engine may further include a heat exchanger, and the first conduit may coupled to the heat exchanger to transfer thermal energy from the heat engine to the enclosure. The cogeneration system may further include a heating system heat exchanger constructed and arranged to be coupled to a heating system associated with the enclosure, and the first conduit and the second conduit may be fluidly coupled to the heating system heat exchanger such that thermal energy is transferred from the first heat transfer fluid to the heating system heat exchanger to provide space heating to the enclosure. The cogeneration system may further include a thermal storage system heat exchanger constructed and arranged to be coupled to a thermal storage system associated with the enclosure, and the first conduit and the second conduit may be fluidly coupled to the thermal storage system heat exchanger such that thermal energy is transferred from the first heat transfer fluid to the thermal storage system heat exchanger. The thermal storage system may be a hot water storage tank, and the first conduit and the second conduit may be fluidly coupled to the thermal storage system heat exchanger to transfer thermal energy from the first heat transfer fluid to the thermal storage system heat exchanger to heat water in the hot water storage tank. The hot water storage tank may include one or more heat exchangers. The cogeneration system may further include a cooling system heat exchanger, constructed and arranged to be coupled to a cooling system associated with the enclosure, a third conduit coupled to the heat pump, the third conduit filled with a second heat transfer fluid and constructed and arranged to transfer the second heat transfer fluid from the heat pump to the enclosure such that thermal energy is absorbed by the second heat transfer fluid from the enclosure to provide cooling to the enclosure. The third conduit may be fluidly coupled to said cooling system heat exchanger so that the second heat transfer fluid absorbs thermal energy from the enclosure to provide cooling to the enclosure, and said heat pump may be configured to supply heating and cooling to the enclosure simultaneously. The first heat transfer fluid and the second heat transfer fluid may contain glycol. The heat engine may further include a generator, and the heat pump may further an electric motor. The generator may be constructed and arranged to selectively provide electricity to the electric motor of the heat pump.

The heat pump may be constructed and arranged to provide heating and cooling to the enclosure without requiring operation of the heat engine, the heat engine may be constructed and arranged to provide heating and electricity to the enclosure without requiring operation of the heat pump, or the heat engine and the heat pump may be constructed and arranged to be operated simultaneously so that the heat engine provides heating and electricity to the enclosure and provides electricity to operate the heat pump, and the heat pump provides heating and cooling to the enclosure. The heat engine and the heat pump may be constructed and arranged to be operated simultaneously so that the heat engine provides heating and electricity to one or more portions of the enclosure and provides electricity to operate the heat pump, and the heat pump provides heating and cooling to one or more portions the enclosure.

The cogeneration system may further include a thermal storage system associated with the enclosure and comprising one or more heat exchangers, and a heat reservoir. The third conduit may be fluidly coupled to the thermal storage system and the heat reservoir to move the second heat transfer fluid from the one or more heat exchangers of the thermal storage system in a first direction to supply thermal energy to the heat reservoir to prevent excess ice from accumulating on the heat reservoir, and to move the second heat transfer fluid from the heat reservoir in a second direction opposite the first direction to return the second heat transfer fluid to the one or more heat exchangers of the thermal storage system. The cogeneration system may further include a valve arrangement constructed and arranged to selectively couple the first conduit and the second conduit to transfer the first heat transfer fluid to the enclosure to provide at least one of space heating and water heating, and to selectively couple the third conduit to transfer the second heat transfer fluid to the enclosure to provide at least one of space cooling, water cooling, and a source of thermal energy for the heat pump. The cogeneration system may further include a heating system heat exchanger constructed and arranged to be coupled to a heating system associated with the enclosure, and a thermal storage system heat exchanger constructed and arranged to be coupled to a thermal storage system associated with the enclosure. The valve arrangement may be constructed and arranged to selectively couple the first conduit and the second conduit with at least one of the heating system to selectively transfer the first heat transfer fluid to the heating system heat exchanger via at least one of the first conduit and the second conduit to provide space heating, and the thermal storage system to selectively transfer the first heat transfer fluid to the thermal storage system heat exchanger via at least one of the first conduit and the second conduit to provide water heating. The cogeneration system may further include a cooling system heat exchanger constructed and arranged to be coupled to a cooling system associated with the enclosure. The valve arrangement may be constructed and arranged to selectively couple the third conduit with at least one of the cooling system to absorb thermal energy via the cooling system heat exchanger into the second heat transfer fluid in the third conduit to provide space cooling, and the thermal storage system to absorb thermal energy via the thermal storage system heat exchanger into the second heat transfer fluid in the third conduit to provide at least one of water cooling and the source of thermal energy for the heat pump.

In embodiments, the cogeneration system(s) as described herein may be in combination a cooling system associated with the enclosure. The cogeneration system(s) may be in combination with a heating system associated with the enclosure. The cogeneration system(s) may be in combination with a thermal storage system associated with the enclosure. The cogeneration system(s) may be in combination with the enclosure. The enclosure may be a building. The enclosure may be a motor vehicle. The cogeneration system(s) may be constructed and arranged as an auxiliary power unit. The auxiliary power unit may be for a motor vehicle. The auxiliary power unit may be for the enclosure. The heat pump may be a vapor compression heat pump. The heat engine may include a fuel burning engine. The heat engine may be a closed-loop Brayton cycle heat engine.

In an embodiment, a method of providing heating, cooling and electricity to an enclosure using a cogeneration system may include generating thermal energy and electricity by operation of a heat engine, providing thermal energy by operation of a heat pump using the electricity from the heat engine, transferring thermal energy from the heat engine and the heat pump to a first heat transfer fluid, and providing at least one of space heating and water heating to the enclosure via the first heat transfer fluid at a heating system heat exchanger constructed and arranged to be coupled to a heating system associated with the enclosure. The method may further include providing space cooling to the enclosure by operation of the heat pump via a second heat transfer fluid that absorbs thermal energy from the enclosure at a cooling system heat exchanger constructed and arranged to be coupled to a cooling system associated with the enclosure, wherein at least one of space heating and water heating are provided to the enclosure simultaneously with space cooling to the enclosure.

The method may further include providing thermal energy to a thermal storage system heat exchanger, the thermal storage system heat exchanger constructed and arranged to be coupled to a thermal storage system associated with the enclosure. At least one of space heating and water heating may be provided to the enclosure before thermal energy is provided to the thermal storage system heat exchanger. Thermal energy may be provided to the thermal storage system periodically to maintain an amount of thermal energy stored in the thermal storage system above a threshold level. The method may further include providing thermal energy from the thermal storage system heat exchanger to the second heat transfer fluid, and providing thermal energy from the second heat transfer fluid to a heat reservoir to prevent excess ice from accumulating on the heat reservoir. The method may further include providing thermal energy from the thermal storage system heat exchanger to the second heat transfer fluid, and providing thermal energy to the heat pump by absorption of thermal energy from the second heat transfer fluid to operate the heat pump. The method may further include providing electricity to an electrical energy storage system, the electrical energy storage system constructed and arranged to selectively transfer the electricity to at least one of the heat pump and a power panel.

In yet another embodiment, a method of providing heating, cooling and electricity to an enclosure using a cogeneration system may include generating thermal energy and electricity by operation of a heat engine, providing thermal energy by operation of a heat pump, transferring thermal energy from the heat engine and the heat pump to a first heat transfer fluid, and moving the first heat transfer fluid through a valve arrangement, the valve arrangement constructed and arranged to distribute the first heat transfer fluid to one or more cogeneration system components. The method may further include providing at least one of space heating and water heating to the enclosure via the first heat transfer fluid at a heating system heat exchanger constructed and arranged to be coupled to a heating system associated with the enclosure, moving a second heat transfer fluid through the valve arrangement, the valve arrangement constructed and arranged to distribute the second heat transfer fluid to one or more cogeneration system components without the first heat transfer fluid contacting the second heat transfer fluid, and providing space cooling to the enclosure by operation of the heat pump via the second heat transfer fluid that absorbs thermal energy from the enclosure at a cooling system heat exchanger constructed and arranged to be coupled to a cooling system associated with the enclosure.

The method may further include moving the first heat transfer fluid from at least one of the heat engine and heat pump and through the valve arrangement in a first direction to supply thermal energy to the heating system heat exchanger to provide heating to the enclosure, and moving the first heat transfer fluid from the heating system heat exchanger and through the valve arrangement in a second direction opposite the first direction to return the first heat transfer fluid to at least one of the heat engine and the heat pump so that the first heat transfer fluid absorbs further thermal energy from at least one of the heat engine and the heat pump. The method may further include moving the second heat transfer fluid from the heat pump and through the valve arrangement in a first direction to receive thermal energy from the cooling system heat exchanger to provide cooling to the enclosure, and moving the second heat transfer fluid from the cooling system heat exchanger and through the valve arrangement in a second direction opposite the first direction to return the second heat transfer fluid the heat pump at which further thermal energy is transferred from the second heat transfer fluid to the heat pump. The method may further include moving the second heat transfer fluid from a thermal storage system heat exchanger and through the valve arrangement in a first direction to supply thermal energy to the heat pump to operate the heat pump, and moving the second heat transfer fluid from the heat pump and through the valve arrangement in a second direction opposite the first direction to return the second heat transfer fluid to the thermal storage system heat exchanger. The method may further include moving the second heat transfer fluid from a thermal storage system heat exchanger and through the valve arrangement in a first direction to supply thermal energy to heat reservoir to prevent excess ice from accumulating on the heat reservoir, and moving the second heat transfer fluid from the heat reservoir and through the valve arrangement in a second direction opposite the first direction to return the second heat transfer fluid to the thermal storage system heat exchanger.

In one other embodiment, a method of providing heating, cooling and electricity to an enclosure using a cogeneration system may include generating thermal energy and electricity by operation of a heat engine, providing thermal energy by operation of a heat pump, transferring thermal energy from the heat engine and the heat pump to a first heat transfer fluid, providing at least one of space heating and water heating to the enclosure via the first heat transfer fluid at a heating system heat exchanger constructed and arranged to be coupled to a heating system associated with the enclosure, and providing thermal energy to a thermal storage system heat exchanger via at least one of the first heat transfer fluid and a second heat transfer fluid, the thermal storage system heat exchanger constructed and arranged to be coupled to a thermal storage system associated with the enclosure.

The method may further include providing space cooling to the enclosure via the second heat transfer fluid that absorbs thermal energy from the enclosure at a cooling system heat exchanger constructed and arranged to be coupled to a cooling system associated with the enclosure. The method may further include supplying electricity generated by the heat engine to one or more energy suppliers. Thermal energy may be provided to the thermal storage system periodically to maintain an amount of thermal energy stored in the thermal storage system above a threshold level.

These and additional features provided by the embodiments described herein will be more fully understood in view of the following detailed description, in conjunction with the drawings.

Figure 1:
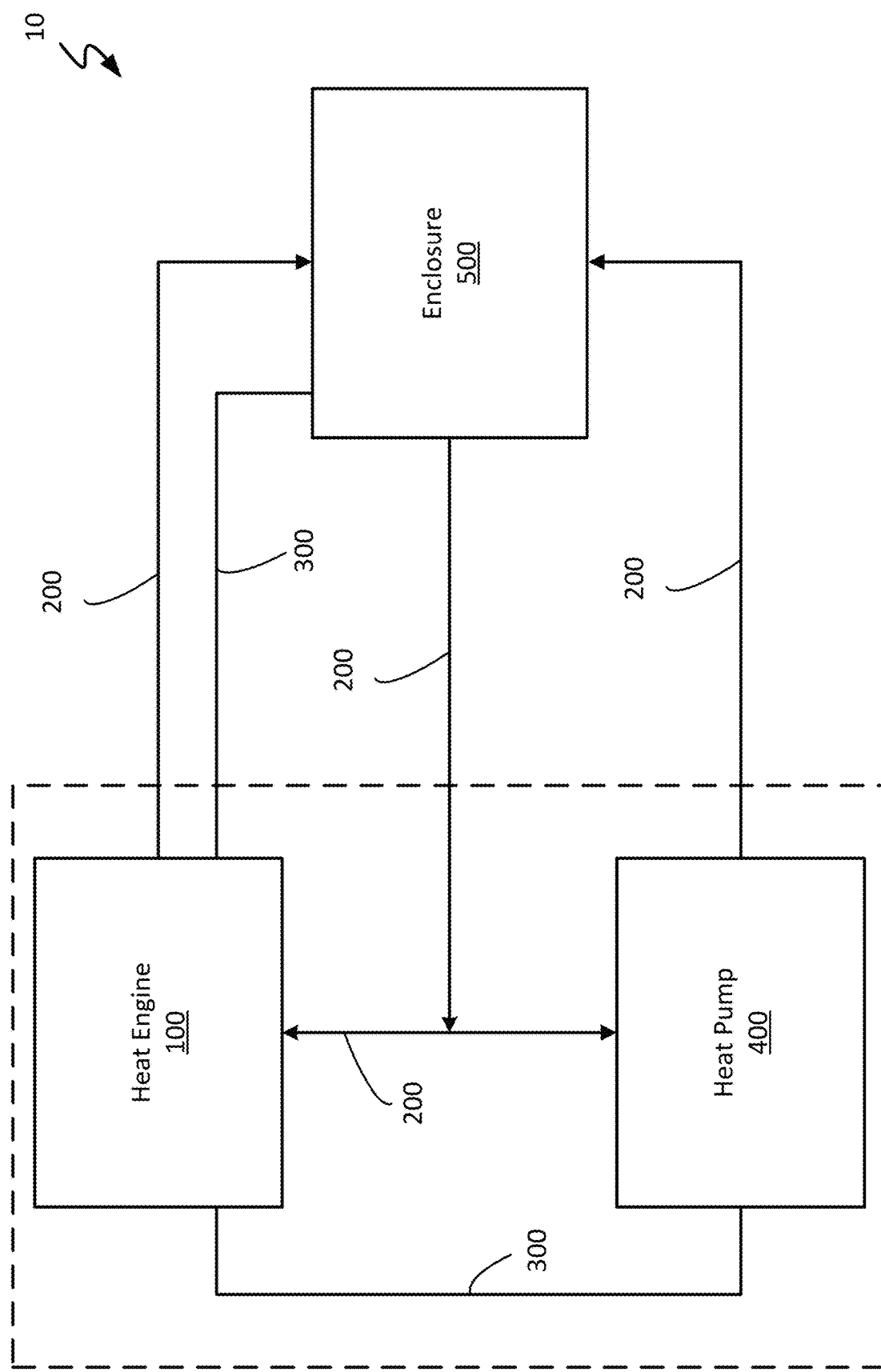
FIG. 1 is a block diagram of a cogeneration system including a heat engine and a heat pump that provides heating, cooling, and electricity to an enclosure, in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Systems and methods are disclosed for a cogeneration system configured to provide heating, cooling, and/or electricity to an enclosure. As discussed in more detail below, in one embodiment, the system is configured for use with an enclosure such as a residential, municipal, commercial, or any other type of building (e.g., a home or office). As discussed below, in another embodiment, the system is configured as an auxiliary power unit (APU) and may be configured for use with an enclosure such as a vehicle (including various types of automobiles, including but not limited to long-haul trucks). In yet another embodiment, the system is configured as an APU and may be configured for a variety of mobile applications, including but not limited to, military temporary power systems, micro-grids, and boats.

As discussed in greater detail below, the system may broadly include a heat engine and a heat pump that can be operated together or individually to supply heating, cooling, or electricity (or a combination thereof). The heat engine can provide heating or electricity (or both) to the enclosure. Thermal energy generated by the heat engine, in some examples, can also be used for process heating, for example. The cogeneration system, in some examples, can be further configured to transfer electricity produced by the heat engine to the grid. Attached or otherwise coupled to the heat engine is a first conduit that is filled with a heat transfer fluid. The heat transfer fluid enables thermal energy generated by the heat engine to be used for heating of the enclosure. The system further includes a heat pump that can heat or cool (or both) the enclosure. The heat pump may supply both heating and cooling to the enclosure simultaneously or one at a time. Coupled to the heat pump may be a second conduit and a third conduit that are filled with a heat transfer fluid. The second conduit is constructed and arranged to allow thermal energy generated by the heat pump to be transferred to the enclosure for space heating and/or water heating. The third conduit is constructed and arranged to enable thermal energy to be absorbed by the heat transfer fluid from the enclosure to provide space cooling.

General Overview

Thermal power generating stations, such as those systems that include a central power station, do not efficiently supply electricity (e.g., generate and distribute electric power) to consumers. Many central power stations, for example, produce electricity at an efficiency of less than 50%. This poor efficiency may be caused by thermal energy losses (e.g., rejected heat) that are inherent in the conversion of thermal energy into electricity. The efficiency of such centralized systems may be yet further reduced as electricity is transmitted many miles from the source to the consumer. As electricity is transmitted along the network of distribution lines (i.e., the grid) that electrically connects the consumer to the central power station, thermal energy losses (e.g., heat) can occur. As a result, it is estimated that only approximately 34% of the energy from the fuel processed by the central power station may be supplied to consumers.

Once the electricity is produced, there are also many challenges with managing its distribution. For instance, the distribution of electricity is typically managed using supplyside management techniques. Such techniques may involve generating electricity based on the needs or circumstances of the power station rather than based on the needs or circumstances of the consumer. For instance, a power station may produce less electricity than its rated capacity when it is more cost effective to do so, for example when the cost of fuel is high, or consumer demand is low. As a result, electricity is distributed based on the availability of electricity produced by the central power station rather than consumer demand. Thus, there may be periods during a year, such as peak-demand periods, in which there is not enough electricity to satisfy consumer demands. In many such instances, users may experience a loss of electric power (e.g., a power blackout).

Thus, and in accordance with an embodiment of the present disclosure, systems and methods are disclosed for a cogeneration system configured to provide heating, cooling, and/or electricity to an enclosure. As mentioned above, the enclosure can be any type of building such as but not limited to a stationary structure, a home, office, retail building, school, hotel and/or factory. In some other embodiments, the enclosure can be a mobile platform, for example a camper, bus, mobile home, or tractor of a semi-trailer truck. The system includes a heat engine and a heat pump that can be operated together or individually to supply heating, cooling, or electricity (or a combination thereof) to the enclosure. As discussed in more detail below, a heat engine, such as a closed-loop, turbo-Brayton cycle heat engine, can provide heating or electricity (or both) to the enclosure by processing a working fluid contained therein to create thermal energy. In other embodiments, the heat engine can be configured differently, such as, but not limited to an Open-loop Brayton cycle (e.g., Jet Engine), an Otto-cycle gas piston engine, a diesel engine, a steam or organic Rankine-cycle engine, fuel cell, or a Stirling engine, or a thermoelectric generator. Attached or otherwise coupled to the heat engine is a first conduit that is filled with a heat transfer fluid, such as, but not limited to glycol or water. The heat transfer fluid, in a general sense, is a medium (e.g., a liquid or gas or other phase change material) that is capable of absorbing and transferring thermal energy. The heat transfer fluid enables thermal energy generated by the heat engine or the heat pump (or both) to be used for heating of the enclosure.

In one embodiment, thermal energy generated by the heat engine can also be stored within one or more thermal storage devices. These devices maintain or otherwise keep a source of thermal energy that can be used to improve system performance. For instance, in one embodiment, the stored thermal energy can be used as a heat source by the heat pump when the outside temperature is low and below a level at which one could otherwise efficiently operate the heat pump. As discussed more below, in one embodiment, the stored thermal energy can also be used for other purposes, such as de-icing the point of contact to a heat reservoir, such as an outside heat exchanger, or recovering of thermal energy to prevent a loss of energy to the environment and improve cogeneration system performance.

Furthermore, in one embodiment, the cogeneration system may be configured to be operated without using electricity from energy suppliers via the grid. For example, in one embodiment, the heat engine can provide electricity to operate the heat pump. This off-the-grid operation allows the enclosure to operate without the risk that electricity may not be available as so commonly occurs from the fluctuating energy requirements associated with energy suppliers. In one embodiment, the heat engine provides electricity to operate both the heat pump and enclosure. The cogeneration system, in one embodiment, may also include other energy generating devices, such as, but not limited to, solar panels, to supply electricity to operate the enclosure or the heat pump (or both). In one embodiment, the cogeneration system may include one or more electrical energy storage devices, for example batteries or capacitors, to store energy generated by the heat engine (or other energy generation devices) for future use or as a source of backup electricity.

The system further includes a heat pump that is configured to heat and/or cool the enclosure (or both). In one embodiment, the heat pump is configured as a vapor-compression cycle heat pump, and in another embodiment, the heat pump may be configured as a Reverse Brayton cycle, a thermal electric, or other forms of heat pump. The heat pump can supply both heating and cooling to the enclosure simultaneously or one at a time by transferring thermal energy from the working fluid contained therein to the heat transfer fluid of the system. The working fluid generally speaking can be a gas or liquid, for example propane. As discussed below, in one embodiment, coupled to the heat pump is a second conduit and a third conduit that are each filled with a heat transfer fluid. In one embodiment, the heat transfer fluid is the same fluid in each of the first, second and third conduits of the cogeneration system. Depending on a given application, the heat transfer fluid of the second conduit can transfer thermal energy generated by the heat pump to the enclosure for space heating and/or water heating. In addition, the heat transfer fluid of the third conduit can absorb thermal energy from the enclosure to provide space cooling, or from the surrounding environment via a heat reservoir to operate the heat pump. In one embodiment, the use of the heat transfer fluid of the second and third conduits allows for the space cooling of some enclosed region while providing heating to another enclosed region. Numerous cogeneration system configurations will be apparent in light of the present disclosure.

Example Cogeneration System Application

FIG. 1 is a block diagram of a cogeneration system 10 including a heat engine 100 and a heat pump 400 that provide heating, cooling, and/or electricity to an enclosure 500, in accordance with an embodiment of the present disclosure. As previously descried herein, there are many disadvantages associated with only receiving electricity from a central power station. Thus, cogeneration systems of the present disclosure may provide a more reliable and efficient alternative to traditional central power electrical distribution systems. In more detail, the cogeneration systems as described herein are configured to generate thermal and electrical energy locally to satisfy heating, cooling, and electricity demands of an enclosure (e.g., a home, commercial or other building, or vehicle). Thus, according to one embodiment, consumers may not need to be dependent on a centralized power station via the grid for their electricity. Moreover, consumers may not need to be subject to fluctuating requirements (e.g., availability of electricity and cost) that are common with managing centralized power systems. In one embodiment, the cogeneration systems of the present disclosure can be connected to existing heating, cooling, and electrical distribution systems of the enclosure. In another embodiment, the cogeneration system may replace existing heating and cooling systems. No matter the manner in which it is installed, the cogeneration systems of the present disclosure can eliminate the necessity for separate heating and cooling systems and backup generators. In another embodiment, the cogeneration system 10 can provide electricity to the grid when the cogeneration system 10 generates more electricity than needed by the enclosure.

In addition, the cogeneration systems as described herein may also serve as a source of electricity when there is no commercially available source of electricity. In one embodiment, the cogeneration system 10 can be an auxiliary power unit for use with stationary (e.g., a home or office building) or mobile (e.g., a motor vehicle) platforms. In one embodiment, the cogeneration system 10 can be configured to replace conventional sources of backup energy, such as generators, to provide energy during a power outage (e.g., black out). The cogeneration system can be configured to connect or otherwise interface with existing temporary or auxiliary power systems of the enclosure. In other embodiments, the cogeneration system can be configured as an auxiliary power unit (APU) to provide energy to mobile platforms (e.g., a long haul truck). An APU, in a general sense, can be a device that provides energy to a motor vehicle for functions other than those that cause the vehicle to move. In some embodiments, for instance, the cogeneration system 10 can be used to provide heating, cooling, and/or electricity to an occupant compartment (e.g., a cab of a truck) to allow an occupant to remain comfortably in the vehicle when the primary drive engine is not operating (e.g., not idling). Thus, heating, cooling, and/or electricity can be provided to a compartment of the vehicle (e.g., a cab of a truck or cargo space of a trailer) without operating the primary drive engine. As a result, owners and operators of trucking lines can reduce fuel costs, engine hours, maintenance and services costs because the primary drive engine of the vehicle is not operating for long periods of time when the vehicle is not moving (e.g. overnight while the driver rests). The cogeneration system 10, in some embodiments, can provide electricity, heating, and cooling to a long-haul truck or its trailer (or both). The cogeneration system 10, in some other embodiments, can also provide electricity to charge one or more batteries of the vehicle. Regardless of whether commercial power is available or not, the cogeneration systems of the present disclosure provide heating, cooling, and/or electricity to the enclosure. As can be seen, broadly speaking, the cogeneration system 10 illustrated in FIG. 1 includes a heat engine 100, a plurality of conduits 200, electrical cables 300, a heat pump 400, and an enclosure 500. The heat engine 100 and heat pump 400, in some embodiments can be constructed and arranged as one unit or device held within a common housing (as indicated by the dotted lines in FIG. 1). In other embodiments, the heat engine 100 and heat pump 400 may be located separately from one another to install or otherwise connect the cogeneration system to the enclosure 500. No matter how they are installed, the heat engine 100 and the heat pump 400, provide thermal energy or electricity (or both) to the enclosure 500 via conduits 200 and electrical cables 300, as described further herein.

The cogeneration system 10 includes a heat engine 100 to convert thermal energy (e.g., heat) to work which can be used to generate electricity. The heat engine 100 processes fuel, for example wood pellets, coal, oil, propane, natural gas or other biogases, to generate thermal energy. As the fuel is processed or otherwise consumed, the heat engine 100 produces work (e.g., mechanical work such as a rotating shaft) that can be used to generate electricity to operate other components of the cogeneration system 10 (e.g., the heat pump 400). In one embodiment, the generated electricity can also be provided to a centralized power generation system (e.g., the grid), depending on the electricity demands of the enclosure 500. Besides the generation of electricity, the heat engine 100 can also produce thermal energy (e.g., heat) as it processes the fuel to generate mechanical work. This thermal energy can be transferred to one or more components of the cogeneration system 10 or an enclosure 500, as discussed further herein.

Attached to the heat engine 100 are one or more conduits 200 for the distribution of thermal energy within the cogeneration system 10. The conduits 200 transmit a heat transfer fluid from the heat engine 100 to one or more components of the cogeneration system 10. Heat transfer fluid, in a general sense, is a medium (e.g., a liquid or gas) that is capable of absorbing and transferring thermal energy. In one embodiment, the heat transfer fluid contains glycol. In another embodiment, the heat transfer fluid contains water. In another embodiment, the heat transfer fluid is mixture of water and glycol. The conduits 200 can be filled with a common heat transfer fluid or different conduit sections may contain different fluids, depending on a given application. In an example embodiment, conduits 200 may be pipes, ducts, tubing or other plumbing systems for transporting the heat transfer fluid to the various components of the cogeneration system 10. The conduits 200 can be constructed and arranged to create separate high-temperature and low temperature heat transfer fluid paths or loops. Each path can contain one or more fluid pumps for moving the heat transfer fluid through the conduits 200. The heat transfer fluid may absorb thermal energy from the high temperature thermal energy reservoirs (e.g., heat engine 100) and transfer it to low temperature thermal energy reservoirs (e.g., a heat exchanger). One of ordinary skill in the art will recognize that the heat transfer fluid can be moved through the cogeneration system 10 using pumps, valves, diverters, or other fluid flow devices integrated within or otherwise connected to conduits 200. For instance, in some embodiments, the cogeneration system 10 may include a proportioning valve to direct returning heat transfer fluid from the enclosure 500 to the heat engine 105 and heat pump 405. As a result, the heat engine 105 and heat pump 405 can operate at different outputs and thereby improve system efficiency. Numerous plumbing system configurations will be apparent in light of the present disclosure.

Attached to the heat engine 100 are also one or more electrical cables 300 for distributing electricity generated by the heat engine 100 to other components of the cogeneration system 10. For instance, electrical cables 300 may electrically connect the heat engine 100 to heat pump 400 to enable the heat pump 400 to be operated using electricity provided by the heat engine 100. Electrical cables 300 may also connect the heat pump 400 to the enclosure 500 to provide alternate supply of electricity (e.g., the grid or storage battery) to operate the heat pump 400, depending on a given application in which the cogeneration system 10 is being operated.

The cogeneration system 10 includes a heat pump 400 to transfer thermal energy (e.g., heat) from a high temperature reservoir to a low temperature reservoir. As one of ordinary skill in the art will appreciate, a heat pump 400 is a device that transfers thermal energy from a source of heat to a relatively lower temperature space or object (e.g., a thermal energy sink). In operation, the working fluid of the heat pump 400 both absorbs and transfers thermal energy. In more detail, the high-temperature working fluid of the heat pump 400 transfers thermal energy via a heat exchanger (also referred to as a condenser) to a heat transfer fluid which in turn transfers heat to enclosure 500. In addition, low-temperature working fluid of the heat pump 400 absorbs thermal energy from another heat transfer fluid in communication with a high-temperature source (e.g., are area around the enclosure 500) to enable the low-temperature working fluid to be converted to a high-temperature fluid, and thus provide a source of thermal energy. To accomplish this heat transfer process, work is put into the cogeneration system 10 in the form of electricity supplied to the heat pump 400. Sources of electricity for operating the heat pump 400 may include, but are not limited to, the heat engine 100, storage batteries, or the grid, depending on a given application in which the cogeneration system 10 is being operated.

As illustrated in FIG. 1, the cogeneration system 10 also includes an enclosure 500 that receives thermal and electrical energy from the heat engine 100 and heat pump 400. In general sense, the enclosure 500 can be any space or area, in which electricity or thermal energy (or both) is used to, for example, operate electrical appliances. In an example embodiment, the enclosure 500 is a residence, such as a single family home. In other embodiments, the enclosure 500 can be any type of building or structure, such as, but not limited to, a church, a school or other government building, a multiple-family structure (e.g., an apartment or condominium building), retail (e.g., a department store or restaurant), or commercial structure (e.g., an office building or factory). The enclosure 500, in yet other embodiments, can be a mobile platform, such as a motor vehicle, a camper, bus, mobile home, or a long-haul truck (e.g., a semi-trailer truck). The thermal energy generated by the heat engine 100 or heat pump 400 (or both) is transferred to the enclosure components via the heat transfer fluid carried by a number of conduits 200 and other plumbing system components. Similarly, electrical energy provided by the heat engine 100 is transferred to one or more components of the enclosure 500 via electrical cables 300. Some of the conduits 200 function as supply and return lines to move heat transfer fluid between the enclosure 500 and the heat engine 100 or heat pump 400 (or both). The conduits 200 and electrical cables 300 have been previously described herein. Numerous other enclosure configurations will be apparent in light of the present disclosure.

Figure 2:
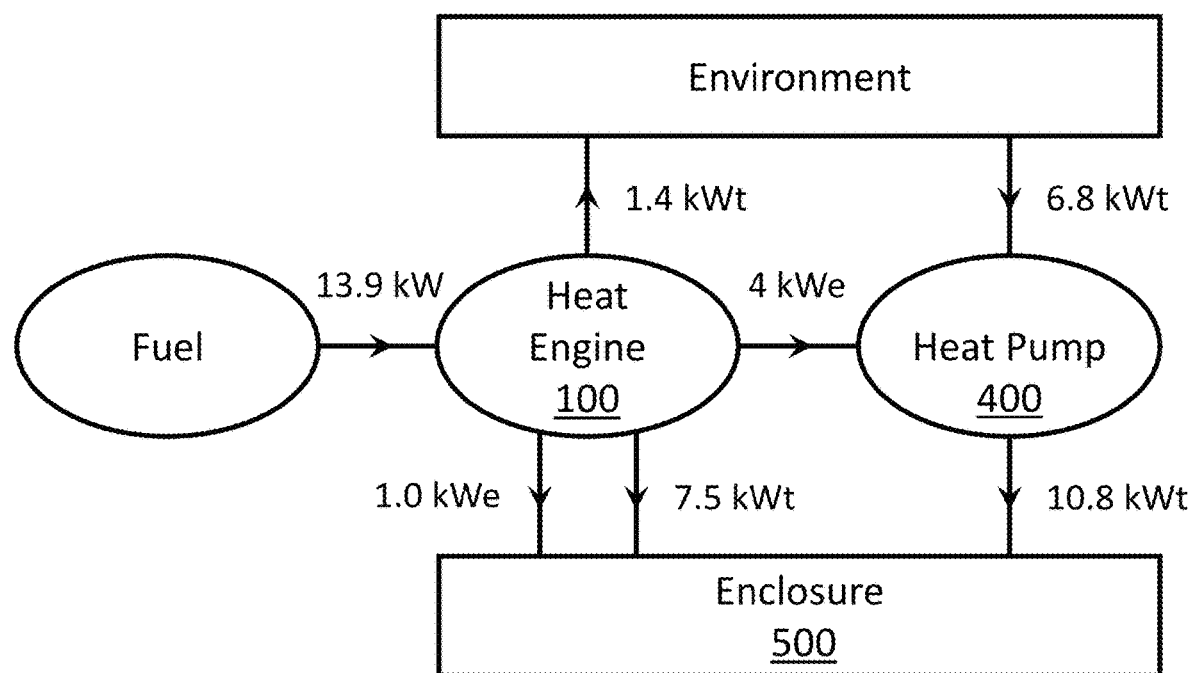
FIG. 2 is a block diagram of a cogeneration system illustrating the production of energy, in accordance with an embodiment of the present disclosure.

FIG. 2 is a block diagram of a cogeneration system 10 illustrating the production of energy, in accordance with an embodiment of the present disclosure. In general, the cogeneration system 10 of the present disclosure can supply energy to satisfy heating, cooling, and electricity demands for an enclosure (e.g., a home or office building) while using significantly less energy as compared to present systems (or combination of systems) currently available in the marketplace. For instance, as described herein, in one particular embodiment, the cogeneration system 10 can operate using between 20 to 50 percent less energy than present systems. In an example embodiment, the heat engine 100 can generate up to 5 kilo-watt (kW) of electricity using approximately 13.9 kW of fuel (e.g., oil, natural gas, or propane). As can be seen, the fuel consumed by the heat engine 100 is converted to both thermal (e.g., 8.9 kW) and electrical (e.g., 5.0 Kw) energy. Some of the thermal energy (e.g., 1.4 kW) is waste or unused heat that is transferred to an area outside the enclosure 500 (e.g., the surrounding environment) during heat engine operation. The remainder of the thermal energy (e.g., 7.5 kW) can be transferred to the enclosure for purposes of space heating or water heating (or both). Besides thermal energy, the heat engine 100 may also produce electrical energy in the form of electricity. As can be seen, the heat engine 100 can generate electricity (e.g., 5 kW) that can be used to supply electricity to the heat pump 400 or enclosure 500. Once received, the heat pump 400 uses the electricity from the heat engine 100 to generate thermal energy. In operation, the heat pump 400 absorbs thermal energy (e.g., 6.8 kw) from the surrounding environment to produce thermal energy (e.g., 10.8 kW) that can be used to supply space heating or water heating (or both) to the enclosure 500. In one example, the cogeneration system may receive thermal energy directly from environment (e.g., thermal energy stored within a heat reservoir such as a body of water or in the ground). In such instances, conduits of the cogeneration system may be in contact with a heat reservoir, such as a lake or stream within the environment or a portion of the ground beneath the environment, to receive thermal energy therefrom. In other examples, the cogeneration system may indirectly receive thermal energy from the environment by using, for example, a heat exchanger, as will be described further herein. The cogeneration system 10 can produce approximately 18.3 kW of thermal energy (at a temperature of the environment of −10° C.) and 1 kW of electricity for use by the enclosure 500. As can be seen, the cogeneration system 10 may be configured to provide enough energy (thermal and electrical energy) to the enclosure 500 without using electricity from an energy supplier via the grid. Thus, the cogeneration system 10 may be used for off-grid operation. In one embodiment, however, the cogeneration system 10 can also serve as an energy sink (e.g., an energy consumer) or energy source (e.g., an energy provider) for the grid in response to fluctuating requirements of available energy, as will be described further herein.

Example Heat Engine and Heat Pump Cogeneration Systems

Figure 3:
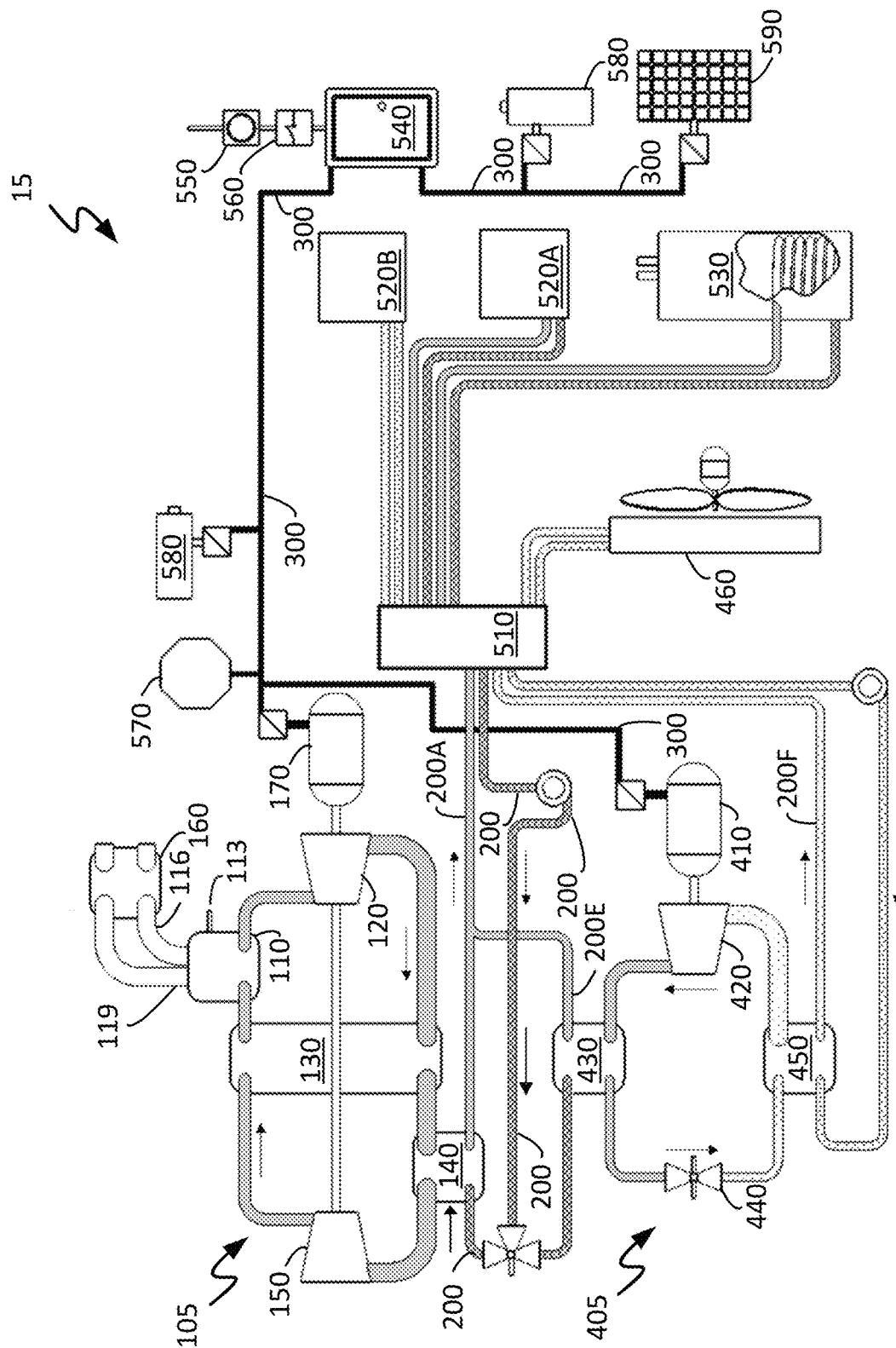
FIG. 3 is a schematic diagram of a cogeneration system including a Brayton-cycle heat engine and vapor compression heat pump that provide heating, cooling, and electricity to the enclosure shown in FIG. 1, in accordance with another embodiment of the present disclosure.

FIG. 3 is a schematic diagram of a cogeneration system 15 including a closed-loop Brayton cycle heat engine 105 (hereinafter referred to as heat engine 105) and vapor compression heat pump 405 (hereinafter referred to as heat pump 405) to provide heating, cooling, and electricity to the enclosure 500 shown in FIG. 1, in accordance with another embodiment of the present disclosure. Attached or otherwise coupled to the heat engine 105 is a first conduit 200A that is filled with a heat transfer fluid to enable thermal energy generated by the heat engine to be used for heating of the enclosure. The heat transfer fluid may be a first heat transfer fluid. Coupled to the heat pump 405 is a second conduit 200E and a third conduit 200F that are also filled with a heat transfer fluid. The second conduit 200E is constructed and arranged to allow thermal energy generated by the heat pump 405 to be transferred to the enclosure for space heating and/or water heating. The third conduit 200F is constructed and arranged to enable thermal energy to be absorbed by the heat transfer fluid from the enclosure to provide space cooling. The heat transfer fluid associated with the second conduit 200E may be the first heat transfer fluid associated with the first conduit 200A, and the heat transfer fluid associated with the third conduit 200F may be a second heat transfer fluid. The first conduit 200A and the second conduit 200E may be fluidly coupled and configured to at least one of proportion and thermally isolate the first heat transfer fluid between the first conduit 200A and the second conduit 200E. The first heat transfer fluid may be proportioned between the first conduit 200A and the second conduit 200E through a valve arrangement 510, as described in greater detail further below.

As can be seen, the heat engine 105 and heat pump 405 are connected in parallel with one another via conduits 200A and 200E so that the heat transfer fluid can flow in separate paths to each component. This type of configuration allows the cogeneration system 15 to move the heat transfer fluid without experiencing thermal energy losses caused by moving the heat transfer fluid through the heat engine 105 or heat pump 405 when they are not operating. In an example embodiment, the cogeneration system 15 can include a heat engine 105, heat pump 405 and an enclosure 500.

Heat Engine

The cogeneration system 15 includes a heat engine 105 to generate heat and electricity to operate one or more other components of the system 15 (e.g., the heat pump 405). In some embodiments, a closed-loop Brayton-cycle heat engine, such as heat engine 105, provides several advantages over other types of heat engines. These advantages can include, for instance, higher efficiency, smaller mass and size, longer intervals between engine maintenance, undetectable vibration, and flexible packaging. The heat engine 105, in an example embodiment, is a turbo machine and capable of generating up to 5 Kilowatts (kW). In other embodiments, the heat engine 100 can be an Open-loop Brayton cycle (e.g., Jet Engine), an Otto-cycle gas piston engine, a diesel engine, a steam or organic Rankine-cycle engine, fuel cell, or a Stirling engine, or a thermoelectric generator. The type of heat engine implemented in the cogeneration system 15 can be selected based on a number of factors including electric efficiency, emissions, fuel flexibility, and turn-down ratio, depending on a given application. As can be seen, the heat engine 105 includes a thermal source 110, an expander 120, heat engine recuperator 130, heat exchanger 140, compressor 150, thermal source recuperator 160, and generator 170.

The heat engine 105 includes a thermal source 110 to transfer thermal energy to a working fluid of the heat engine 105. The thermal source 110 operates as a thermal reservoir to raise the temperature of the working fluid as it contacts the thermal source 110. A working fluid can be a gas or liquid that actuates or otherwise operates a machine. In an example embodiment, the thermal source 110 is a combustor that includes, for example a burner and a combustion chamber. The thermal source 110 can generate thermal energy through combustion of fuel (e.g., fossil or renewable fuels). Attached to the thermal source 110 are fuel tube 113, air intake tube 116, and exhaust tube 119 to promote the combustion of fuel by the burner within the combustion chamber of the thermal source 110. The fuel tube 113 is adapted to supply fuel, such as such as oil, propane, or natural gas to the combustion chamber of the thermal source 110. In some other embodiments, the fuel tube is configured to supply renewable fuels, such as biofuels including for example wood pellets and BioMass or BioFuels (bio gas, bio oil), renewable fuels. As can be seen, an air intake tube 116 is also attached to the thermal source 110. The air intake tube 116 is adapted or otherwise configured to supply air to the thermal source 110 to enable combustion of the fuel therein. Once the fuel has been consumed, the exhaust gases can leave the thermal source via an exhaust tube 119 attached thereto. The exhaust tube 119 is configured to carry the exhaust gases from the thermal source 110 to the surrounding environment. Numerous other thermal source configurations will be apparent in light of the present disclosure.

The heat engine 105 includes an expander 120 for changing the pressure of the working fluid from a high pressure to a low pressure. In an example embodiment, the expander 120 is a turbo expander, such as a radial flow turbine, in which high pressure gas is expanded to produce work, such as mechanical movement of a shaft. The output work of the expander 120 can be used to operate the compressor 150 to compress the working fluid at another point during the operating cycle of the heat engine 105. In addition, the work generated by the expander 120 can be used to operate the generator 170 to produce electricity, as will be described further herein. The expander 120, in some other embodiments, can be an axial flow turbine or positive displacement mechanism. As it produces work via the expander 120, the pressure of the working fluid is reduced to a lower pressure, but maintains a relatively high temperature as compared to the surrounding environment. The efficiency of the heat engine 105 can thus be improved by transferring some of this thermal energy from the low-pressure working fluid to the high-pressure working fluid presently further along in the closed cycle of engine 105.

The heat engine 105 includes a heat engine recuperator 130 (hereinafter referred to as recuperator 130) to transfer thermal energy from the high temperature working fluid that exits the expander 120 to other low temperature working fluid. In a general sense, the recuperator 130 is a device for recovery of waste thermal energy (e.g., heat). In an example embodiment, the recuperator 130 recovers or otherwise absorbs thermal energy from the high-temperature working fluid that exits the expander 120 and transfers it to other low-temperature working fluid prior to entering the thermal source 110. As a result, the overall efficiency for the heat engine 105 is improved because less fuel is consumed by the thermal source 110 because the working fluid entering the source 110 is at a higher temperature. In an example embodiment, the recuperator 130 is a vertical flat panel counter-flow heat exchanger that physically separates the high-temperature working fluid from the low-temperature working fluid. In operation, the high-temperature working fluid flows through the recuperator 130 and contacts one surface, such as a wall or panel. As a result of this contact, the panel absorbs thermal energy from the high-temperature working fluid by way of convection. This thermal energy is transferred through the wall via conduction, and is absorbed by the low temperature working fluid in contact with an opposing surface of the panel. In another embodiment, the recuperator 130 can be a counter-flow heat exchanger, such as a horizontal flat panel or cellular type heat exchanger. Although thermal energy has been absorbed from the high-temperature working fluid, there can still be additional thermal energy that can be recovered therefrom. Thus, efficiency of the heat engine 105 can yet further be improved upon recovery of this additional thermal energy.

The heat engine 105 further includes a heat exchanger 140 for transferring thermal energy (e.g., heat) from the working fluid of the heat engine 105 to the heat transfer fluid of the cogeneration system 15. As described above, the working fluid exiting the heat engine recuperator 130 contains thermal energy that is removed from the working fluid (and heat engine) which can be used elsewhere within the cogeneration system 15 (e.g., to heat the enclosure 500) or rejected to a heat reservoir. In a general sense, heat exchanger 140 can be a device for transferring thermal energy between a solid object and a fluid or between two or more fluids. In some applications, the two or more fluids can be separated by a barrier (e.g., a wall, piping or a panel) to prevent mixing of the fluids. In other applications, the fluids can be in direct contact with each other (e.g., mixed together). In an example embodiment, heat exchanger 140 is a shell and tube heat exchanger. In such an embodiment, the heat exchanger 140 enables thermal energy to be absorbed from the working fluid of the heat engine 105 and transferred to the heat transfer fluid of the cogeneration system 15 to provide thermal energy (e.g., heat) to the enclosure 500, as will be described in more detail herein. In other embodiments, the heat exchanger 140 can be a plate, or a plate and shell heat exchanger. No matter its particular configuration, the heat exchanger 140 reduces the amount of unrecovered thermal energy (e.g., waste heat) produced by the engine 105, and thus improves the overall efficiency of the heat engine 105.

The heat engine 105 further includes a compressor 150 for moving the working fluid from a low pressure to a high pressure. In a general sense, the compressor 150 can be a mechanical device that increases the pressure of a gas by reducing a volume in which the gas is contained. As described above, the working fluid entering the compressor 150 is at a low pressure (e.g., atmospheric pressure) upon flowing through the expander 120. To compress the working fluid, work is inputted into the cogeneration system 15. In an example embodiment, the compressor 150 receives an input (e.g., mechanical work in the form of rotating shaft) from the expander 120. As a result of moving the working fluid through the compressor 150, the pressure of the working fluid is significantly increased, but the temperature of the working fluid has only slightly increased. Thus, the working fluid can move to the thermal source 110 at which its temperature is increased, and thereby readying the fluid for the next heat engine operating cycle.

The heat engine 105, in some embodiments, can include a thermal source recuperator 160, to transfer thermal energy from the exhaust gases within the exhaust tube 119 to low temperature air flowing through the air intake tube 116. In a general sense, the thermal source recuperator 160 is a device for recovery of waste thermal energy (e.g., heat), such as a heat exchanger. In more detail, the thermal source recuperator 160 recovers or otherwise absorbs thermal energy from exhaust gases flowing through the exhaust tube 119 and transfers it to the low-temperature air flowing through the air intake tube 116, and subsequently entering the thermal source 110. As a result, the overall efficiency for the heat engine 105 is improved, because less fuel is used to raise the temperature of the working fluid since the air entering the thermal source 110 is at a higher temperature than the ambient air temperature of the surrounding environment.

The heat engine 105 also includes a generator 170 for producing electricity using the output of work provided by the expander 120. In a general sense the generator 170 is a device that converts mechanical energy (e.g., a rotating shaft) into electrical energy for use. In an example embodiment, the generator 170 may be a variable speed generator having an operating range of 50,000 to 80,000 revolutions per minute (RPM) and capable of producing up to 5 kW of electric power. The generator 170, in some other embodiments, can be a dynamo type generator that produces direct current using a permanent magnet field and a commutator. In other embodiments, the generator 170 can be a direct current or an alternating current generator having a coil of wire rotating in a magnetic field to produce electricity. Numerous other generator configurations will be apparent in light of the present disclosure.

Heat Pump

The cogeneration system 15 also includes a heat pump 405 to supply or remove thermal energy (e.g., heat) to or from the enclosure 500. As previously discussed, the heat pump 405 is configured to provide thermal energy (e.g., heat) to the enclosure 500. In an example embodiment, the heat pump 405 is an advanced vapor-compression cycle heat pump. In some such embodiments, the heat pump 405 is a two-stage compression cycle heat pump. The heat pump 405, in yet other embodiments, can be a solid state or other chemical reactive process for absorption or adsorption of thermal energy. Regardless of its configuration, the heat pump 405 may operate in a temperature range of between −10° Celsius (C) and 15° C. In some applications, note that the heat pump 405 can provide thermal energy to the enclosure 500 despite ambient outside temperatures being as low as −30° C. As a result, the cogeneration system 15 can be installed and operated in the vast majority of the country in which heating systems are operated.

The heat pump 405 contains a working fluid that absorbs thermal energy from one thermal energy reservoir and transfers it to another. A working fluid generally speaking can be a gas or liquid that is actuated by a machine. In an example embodiment, the working fluid of the heat pump 405 is propane. Propane offers several advantages over synthetic materials including lower cost, less toxicity, and reduced environmental impact. In some other embodiments, the working fluid can be a refrigerant. No matter its working fluid, the heat pump 405 can be configured, such as with hermetically seal packaging, to prevent the working fluid from contaminating or otherwise contacting the surrounding environment. Such packaging allows the heat pump 405 to be safely operated with a number of different working fluids and outside the enclosure 500. In contrast, traditional heat pump systems move working fluid through the enclosure. As result, traditional heat pumps have a limited number of working fluids that can be safely used within the enclosure. The heat pump 405 of the present disclosure is not so limited. In more detail, the heat pump 405 can use a number of different types of working fluids because it may be sealed and packaged to prevent loss of fluid to the surrounding environment. In addition, the working fluid of the heat pump 405 can remain outside the enclosure 500 where it can be safely used and contained such that it does not pose a danger to occupants within the enclosure 500. As a result, less working fluid is used by heat pump 405, because the working fluid remains in the pump 405 rather than being moved to transfer thermal energy to the enclosure 500.

The heat pump 405 may include an electric motor 410, a compressor 420, a condenser 430, a reducing valve 440, and an evaporator 450. In a general sense, electric motor 410 converts electricity (e.g., electricity from the generator 170) into mechanical work (e.g., a rotating shaft). The outputted work from the electric motor 410 can be used to operate the compressor 420, as will be described further herein. In an example embodiment, the electric motor 410 is alternating current (AC) electric motor. Electric motor 410, in some embodiments, is a direct current (DC) electric motor. No matter its configuration, the electric motor 410 is to provide work to operate the heat pump 405.

As can be seen, the heat pump 405 is coupled to or otherwise connected to the heat engine 105 to receive electricity via the generator 170 and electrical cables 300. In one embodiment, when operating, the heat engine 105 can supply electricity to power the heat pump 405, and thus avoid using electricity from a supplier (e.g., the grid), which can be expensive, or not always available. The cogeneration system 15 can also be alternatively configured to electrically connect the heat pump 405 to the grid and/or one more electrical storage systems via electrical cables 300 to receive electricity from a source other than the heat engine 105 when operating the heat engine 105 may not be desirable or practicable.

The heat pump 405 further includes a compressor 420 to increase the pressure and temperature of the working fluid of the heat pump 405. In a general sense, note that the compressor 420 can be a mechanical device that increases the pressure of a gas by reducing a volume in which the gas is contained. The compressor 420, in other words, can be a device that moves the working fluid from a low pressure to a high pressure. In operation, the compressor 420 receives an input from the electric motor 410, such as work. It is this work that can be used to operate the compressor 420 in which to compress the working fluid. In an example embodiment, the compressor 420 can be a scroll compressor. The compressor 420, in some other embodiments, can be a rotary piston or reciprocating piston compressor. In operation, the working fluid enters the compressor 420 with a relatively low pressure and temperature. Once compressed, the working fluid (e.g., a propane gas) experiences an increase in temperature and pressure.

In one embodiment with a vapor compression-type heat pump, the heat pump 405 may further includes a condenser 430 to transfer thermal energy from the working fluid of the heat pump 405 to a heat transfer fluid of the cogeneration system 15. Generally speaking, the condenser 430 can be a device, for example a heat exchanger, which is configured to transfer of thermal energy from one fluid or solid to another. As described above, the working fluid exits the compressor 420 and contains an amount thermal energy. This thermal energy can be used elsewhere within the cogeneration system 15, such as to heat the enclosure 500. In more detail, the condenser 430 absorbs thermal energy from the working fluid and transfers it to the heat transfer fluid. As a result, the temperature of the heat transfer fluid increases so that it can be used to provide heat (e.g., space or water heating) to the enclosure 500. On the other hand, the temperature and pressure of the working fluid decreases as a result of the transfers of thermal energy to the heat transfer fluid. In an example embodiment, the condenser 430 is a shell and tube heat exchanger. The working fluid and heat transfer fluid, in such embodiments, can be separated by a barrier (e.g., a wall, piping or a panel) to prevent mixing of the fluids. In other embodiments, the condenser 430 can be a plate or a plate and shell heat exchanger. Numerous other condenser configurations will be apparent in light of the present disclosure.

In one embodiment, the heat pump 405 may also include a pressure reducing valve 440 (also known as an expansion valve) to decrease or otherwise lower the pressure of the working fluid. The pressure reducing value 440, in a general sense, can be a device that reduces the input pressure of a fluid to a particular value at its output, thereby regulating the flow of the fluid. As described above, the working fluid exits the condenser 430 at a pressure greater than atmospheric. To ready the working fluid for the next operating cycle, the pressure of the working fluid within the heat pump 405 is to be reduced. The working fluid can flow or otherwise pass through the pressure reducing valve 440 to reduce its pressure. In addition, the temperature of the working fluid also decreases as the working fluid expands while moving through the reducing valve 440.

In one embodiment with a vapor compression-type heat pump, the heat pump 405 may further include an evaporator 450 that enables the working fluid to absorb thermal energy from another thermal energy source or reservoir. Broadly speaking, the evaporator 450 can be a device, for example a heat exchanger, which is configured to transfer thermal energy from one fluid to another. In an example embodiment, the evaporator 450 is a shell and tube heat exchanger configured to transfer thermal energy from the heat transfer fluid of the cogeneration system 15 to the working fluid of the heat pump 405. In such embodiments, the working fluid and heat transfer fluid can be separated by a barrier (e.g., a wall, piping or a panel) to prevent mixing of the fluids. In other embodiments, the evaporator 450 can be a plate or a plate and shell heat exchanger. As described above, upon exiting the reducing valve 440 the temperature of the working fluid has been reduced. To raise its temperature, the working fluid can flow or otherwise move through the evaporator 450. In more detail, the evaporator 450 absorbs thermal energy from the heat transfer fluid and transfers it to the working fluid. As a result, the temperature and pressure of the working fluid increases.

The heat pump 405 also includes a heat reservoir, such as an outside heat exchanger 460 to transfer thermal energy from the surrounding environment to the heat transfer fluid. As previously described, the heat exchanger can be a device configured to transfer thermal energy from one fluid or gas to another. In an example embodiment, the cogenerations system 15 includes an outside heat exchanger 460, such as shell and tube heat exchanger, configured to function as a heat source or heat sink, depending on a given application. A heat source is a medium or device that transfers thermal energy to another, while a heat sink absorbs thermal energy from another medium or device. In more detail, the heat reservoir can transfer thermal energy from ambient air to the heat transfer fluid, and thereby function as a heat source that increases the temperature of the heat transfer fluid. In other embodiments, the thermal energy can be transferred from the heat transfer fluid to the ambient air via the outside heat exchanger 460. In such embodiments, the heat exchanger 460 can function as a heat sink that absorbs thermal energy from the heat transfer fluid to transfer and release to the ambient air. As a result of the heat sink, the temperature of the heat transfer fluid decreases. In addition, note that single or common heat exchanger configurations reduce both manufacturing/installation costs and complexity of the system as compared to systems having multiple outdoor heat exchangers. In other embodiments, the heat exchanger 460 can be a plate or a plate and shell heat exchanger. In such an embodiment, the outside heat exchanger 460 can operate using low pressure heat transfer fluid. In yet other embodiments, the cogeneration system 15 can include more than one heat reservoir, depending on the giver application. The heat reservoir, in some other embodiments, can be or otherwise integrated with a geothermal system to transfer thermal energy to and from the ground. In operation, the heat transfer fluid exits the evaporator 450 at temperature lower than the ambient air temperature of the surrounding environment. The heat transfer fluid can then flow through the heat exchanger 460, in which it absorbs thermal energy from the ambient air. As a result, the temperature of the heat transfer fluid increases, thereby allowing it to supply thermal energy to the working fluid of the heat pump 405 at the evaporator 450 for the next cycle, as previously described herein.

In some embodiments, the heat pump 405 can be configured to receive thermal energy from a surrounding environment without an outdoor heat exchanger. In such an instance, one or more conduits in fluid communication with the heat pump 405 can be installed in the environment so that the conduits are in contact with a heat reservoir (e.g., buried underground or in a body of water) present in the environment. Thermal energy (e.g. geothermal energy) from the heat reservoir is transferred to the conduit and low-temperature heat transfer fluid moving therein to increase the temperature of the fluid. The higher-temperature heat transfer fluid can flow back via one or more conduits to operate the heat pump 405. Numerous other ways of transferring thermal energy to heat transfer fluid for operating the heat pump will be apparent in light of the present disclosure.

Enclosure

As mentioned above, in one embodiment, the cogeneration system 15 further includes an enclosure 500, in which thermal energy and electricity generated by the heat engine 105 and heat pump 405 can be supplied thereto for purposes of supplying heating, cooling, and/or electricity. As can be seen in FIG. 3, the enclosure 500 may include a valve arrangement 510 (including but not limited to a manifold), an inside heat exchanger 520, a thermal storage system 530, a power panel 540, an electric grid meter 550, an electric grid isolation switch 560, an control panel 570, an electrical energy storage system 580, and/or solar energy panels 590. The valve arrangement 510 can be configured to selectively couple to one or more conduits 200 to receive the heat transfer fluid flowing from the heat engine 105 or heat pump 405 (or both). In general, the valve arrangement 510 can be one device, such as a valve block, or a group of devices, such as a group of individual valves, that guide or otherwise direct the flow of the heat transfer fluid throughout the cogeneration system 15. As illustrated in FIG. 3, the valve arrangement 510 is connected to one or more conduits 200 that form a plumbing system for moving the heat transfer fluid throughout the cogeneration system 15. In more detail, upon receiving the heat transfer fluid, the valve arrangement 510 can be configured to selectively transfer heat transfer fluid (e.g., by diverting or otherwise directing the flow of fluid) to one or more components of the cogeneration system, as will be described further herein. In one embodiment, the valve arrangement 510 creates a separate piping system that separates the heat transfer fluid from the heat engine 105 and heat pump 405 from other system conduits. The heat transfer fluid received from the heat engine 105 or heat pump 405 (or both) may exit the valve arrangement 510 in at least one direction (e.g., in a supply direction) to other cogeneration system components. Similarly, heat transfer fluid from other cogeneration system components may exit the valve arrangement 510 in at least one other direction (e.g., in a return direction) to the heat engine 105 or heat pump 405 (or both) to repeat the heating or cooling cycle, depending on a given application. Regardless of its configuration, the valve arrangement 510 directs heat transfer fluid movement between the various components of the cogeneration system 15.

The enclosure 500 may include one or more inside heat exchangers to supply heating or cooling to the enclosure. In one illustrative embodiment, the enclosure includes inside heat exchangers 520A and 520B (collectively 520) located within or adjacent to, the enclosure 500 to supply heating or cooling thereto. As previously described herein, a heat exchanger, in general, can be a device that transfers thermal energy, for example, from one fluid to another. As can be seen, the heat exchangers 520 are connected to one or more conduits 200 to receive and transfer heat transfer fluid between the heat exchangers 520 and the heat engine 105 or heat pump 405 (or both) via the valve arrangement 510. Depending on a given application, the heat exchanger 520A (e.g., a heating system heat exchanger) may enable the thermal energy to be absorbed from the heat transfer fluid and transferred to the surrounding environment within the enclosure 500 to heat the enclosure. In such an instance, the heat transfer fluid can have a higher temperature than the ambient air temperature of the enclosure 500, because the heat transfer fluid has received thermal energy from the heat engine 105 or heat pump 405 (or both). Thus, the cogeneration system 15 is operating to heat the enclosure 500. In other applications, the heat transfer fluid can absorb thermal energy from ambient air within the enclosure 500. In such an application, the heat transfer fluid can have a lower temperature than the ambient air temperature of the enclosure 500, because the heat transfer fluid moving through the heat exchanger 520B (e.g., a cooling system heat exchanger) has transferred some of its thermal energy to the working fluid of the heat pump 405, as previously described further herein. The cogeneration system 15, for such applications, is operating to cool the enclosure 500. In one embodiment, the heat exchanger 520A may be part of an existing heating system for the enclosure 500 and the cogeneration system may be retrofitted to the existing heating system. Likewise, in one embodiment, the heat exchanger 520B may be part of an existing cooling system for the enclosure and the cogeneration system may be retrofitted to the existing cooling system. In another embodiment, one or both of the heat exchangers 520A, 520B may be a component of the cogeneration system, and the cogeneration system may further include a heating system and/or a cooling system for the enclosure.

In an embodiment, the valve arrangement 510 is configured to switch between operating modes to heat or cool at least a portion of the enclosure 500 while simultaneously effective opposite operating modes to cool or heat another portion or component of the enclosure 500 or another component of the cogeneration system. As a non-limiting embodiment, the cogeneration system may heat the enclosure 500 while simultaneously cooling a pool within the enclosure 500, or vice versa. As another non-limiting example, such as on a cold day, a first operating mode of the valve arrangement 510 may direct the cogeneration system to heat the enclosure 500 through the heat exchanger 520A, configured to enable thermal energy to be absorbed from a first heat transfer fluid of the first conduit 200A and/or second conduit 200E and transferred to the enclosure 500 to heat the enclosure 500. The first operating mode of the valve arrangement 510 may simultaneously direct the cogeneration system to use a heat reservoir such as the outside heat exchanger 460 as a heat source, such that thermal energy from the second heat transfer fluid of the third conduit 200F that has a temperature below ambient air absorbs thermal energy from the outside heat exchanger 460 to increase the temperature of the second heat transfer fluid. The valve arrangement 510 may switch between the first operating mode and a second operating mode, opposite the first operating mode. By way of example, and not as a limitation, such as on a hot day, the second operating mode of the valve arrangement 510 may direct the cogeneration system to cool the enclosure 500 through the heat exchanger 520B, configured to enable thermal energy to be absorbed from the enclosure 500 and transferred to the second heat transfer fluid of the third conduit 200F to cool the enclosure 500. The second operating mode of the valve arrangement 510 may simultaneously direct the cogeneration system to use the outside heat exchanger 460 as a heat sink, and the first heat transfer fluid that has a temperature above ambient air may be absorbed by the outside heat exchanger 460 to decrease the temperature of the first heat transfer fluid.

The enclosure 500 further includes a thermal storage system 530 located within or adjacent to the enclosure 500. In a general sense, in one embodiment, the thermal storage system 530 is a device (or combination of devices) in which thermal energy is stored and made available for use at a later time. As can be seen, the thermal storage device 530 may be connected to a plurality of conduits 200 to move heat transfer fluid to and from the device 530 to other components of the cogeneration system 15. Depending on a given application, the thermal storage system 530 can house or otherwise contain low or high temperature heat transfer fluid for purposes of supplying cooling or heating to the enclosure, as will be described further herein. Thus, the thermal storage system 530 can function as a heat source or a heat sink, as will be described further detail herein. As set forth above, a heat source is a medium or device that transfers thermal energy to another. A heat sink, on the other hand, absorbs thermal energy from another medium or device. In one example embodiment, the thermal storage system 530 is a fluid storage tank (e.g., hot water storage tank) that includes a heat exchanger (e.g., a thermal storage system heat exchanger) disposed therein. As the heat transfer fluid passes through the heat exchanger, either thermal energy is transferred to the fluid within the tank to heat the fluid (e.g., to heat water) or thermal energy is absorbed from the fluid within the tank to heat the heat transfer fluid, depending on the given application. As a result, the fluid in the storage tank is either heated or cooled by the flow of the heat transfer fluid through the heat exchanger. In other embodiments, the thermal storage system 530 can be phase change materials. Numerous other thermal storage system configurations will be apparent in light of the present disclosure. The thermal storage system 530 may include one or more heat exchangers. As a non-limiting first embodiment, the thermal storage system 530 may include a storage heat exchanger configured to store a heated or cooled medium for the thermal storage system 530. As a non-limiting second embodiment, the thermal storage system 530 may include a domestic water supply heat exchanger configured to heat or cool domestic water, such as for a shower in the enclosure 500. As a non-limiting third embodiment, the thermal storage system 530 may include two heat exchangers, one being a storage heat exchanger and the other being a domestic water supply heat exchanger.

The enclosure 500 also includes an electrical panel 540, electrical grid meter 550, and an electrical grid isolation device 560. As previously described herein, the enclosure 500 may receive electricity from an electrical power supplier via a network of transmission and distribution lines, otherwise known as the electric grid, to satisfy its electricity demands. In a general sense, enclosures 500, such as homes or office buildings, can include an electric grid meter 550 to transfer electricity from the grid to an electrical panel 540 of the enclosure 500. The electrical panel 540 is configured to distribute the electricity received to various locations throughout the enclosure 500 to operate electrical appliances therein. In some embodiments, however, the cogeneration system 15 can be configured to supply electricity to the enclosure 500 rather than using electricity received from the grid. In such instances, the enclosure 500 can be disconnected or otherwise isolated from the grid to avoid transmitting electricity to the grid and thereby causing damage thereto. Thus, to avoid causing damage to the grid, the enclosure 500 can also include an electrical grid isolation device 560. The electrical grid isolation device 560, in general, can be a device that breaks or otherwise disrupts an electrical connection between the power panel 540 and electrical meter 550. Furthermore, the electrical grid isolation device can also be used to electrically isolate the enclosure from the electric grid when the grid is not operating properly. In an example embodiment, the electrical grid isolation device 560 can be a switch that can be physically operated to electrically isolate the enclosure 500 from the grid. In other embodiments, the electrical grid isolation device can be an electrical disconnect or electronic switching mechanism.

In one embodiment, the enclosure 500 may also include a control panel 570 for operating cogeneration system components to manage the transfer of electricity and thermal energy to satisfy demands of the enclosure 500. In an example embodiment, the control panel 570 can be a combination of hardware, software, or firmware that is used to operate the cogeneration system 15 and monitor its performance. As illustrated in FIG. 3, the control panel 570 is connected to one or more electrical cables 300 to operatively couple the panel 570 to components of the cogeneration system 15. In more detail, the control panel 570 can generate and transmit electrical signals to control or otherwise operate system components, for example, heat engine 105 or heat pump 405. The control panel 570 may include a transceiver (e.g., a router or cellular communication device) for receiving or transmitting information via a wired or wireless network (e.g., a local area network or the internet). For instance, in one embodiment, the control panel 570 may receive electricity prices from electrical energy suppliers in real time, and in turn determine how to operate the cogeneration system 15 to most effectively and efficiently satisfy the electrical demands of the enclosure 500. In addition, the control panel may also include a graphical user interface to allow it to be configured or otherwise accessed during installation or operation of the system. Numerous other control panel configurations will be apparent in light of the present disclosure.

As illustrated in FIG. 3, in one embodiment, the enclosure 500 may further include an electrical energy storage system 580. Broadly speaking, the electrical energy storage system 580 is a device (or combination of devices) in which electricity is stored or otherwise maintained and made available for future use, such as in off-grid use to start the cogeneration system and/or to meet demand fluctuations to allow heat engine to run at relatively constant output. As can be seen, the cogeneration system 15 may include one or more electrical energy storage systems 580 that are electrically connected to other devices of the system 15 via electrical cables 300. In operation, the cogeneration system 15 can be configured to transfer electricity, for example from the generator 170 or solar energy panels 590, to the electrical energy storage system 580 in which electricity can be stored to provide a backup source of electricity. Then, depending on a particular application, electricity can be transferred from the electrical energy storage system 580 to one or more cogeneration system components, for instance electric motor 410 to operate the heat pump 405 or supply electricity to the power panel 540. Electricity from the electrical energy storage system 580 may be used in a number of instances including, for example, when electricity is not available from the grid (e.g., a power outage) or when the cost of electricity supplied by the grid is high (e.g., during peak demand periods).

As shown in the embodiment illustrated in FIG. 3, the enclosure 500 may also include one or more solar energy panels 590 that provide a source a renewable electrical energy. In a general sense, note that solar panels are devices configured to absorb or otherwise receive energy (e.g., radiation in the form of light rays) from an external source of energy (e.g., the sun) and transfer that energy into heat or electricity. As can be seen, solar energy panels 590 can be connected to one or more other cogeneration system components, for example, to electrical energy storage systems 580 via electrical cables 300. The solar energy panels, in some other embodiments, can also interface with one or more conduits 200 to transfer thermal energy to heat transfer fluid flowing therethrough. In an example embodiment, the solar energy panels are photovoltaic modules that include photovoltaic solar cells.

Figure 4:
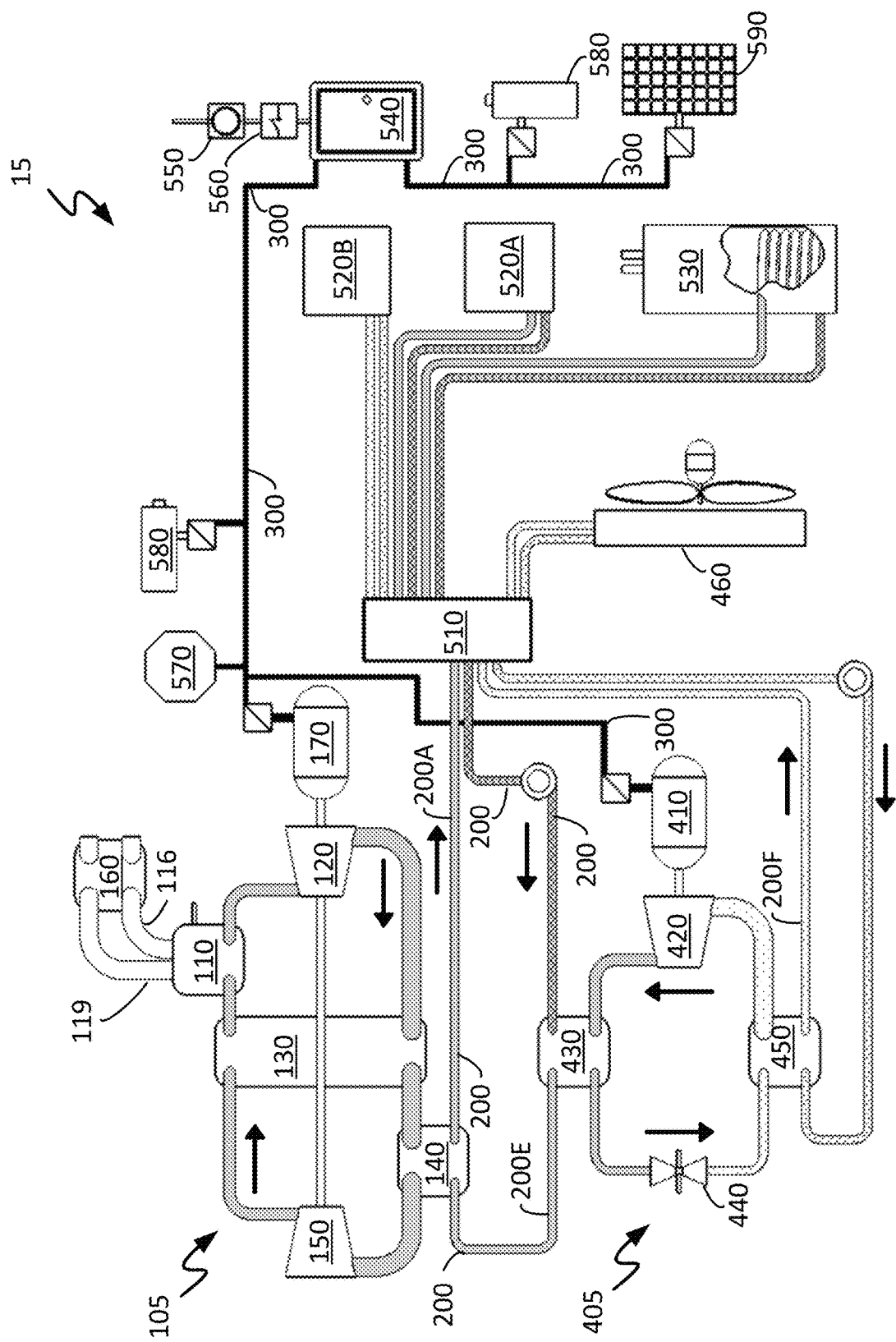
FIG. 4 is a schematic diagram of a cogeneration system including a Brayton-cycle heat engine operatively coupled in series to a vapor compression heat pump, in accordance with another embodiment of the present disclosure.
Figure 5:
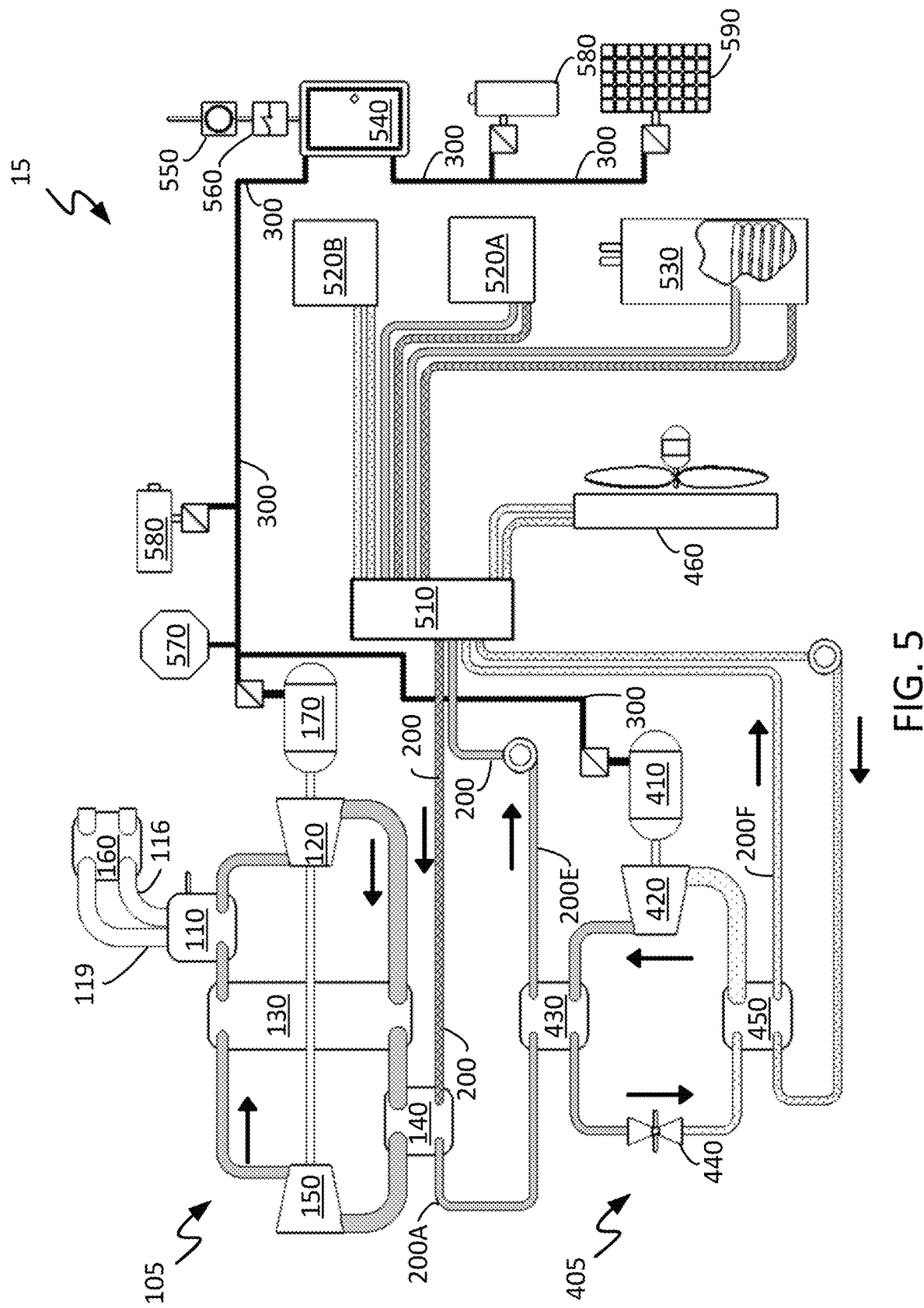
FIG. 5 is a schematic diagram of a cogeneration system including a vapor compression heat pump coupled in series to a Brayton-cycle heat engine operatively, in accordance with another embodiment of the present disclosure.

FIG. 4 is a schematic diagram of a cogeneration system 15 including a closed-loop Brayton cycle heat engine 105 operatively coupled via conduits 200A and 200E in series to a vapor compression heat pump 405, in accordance with another embodiment of the present disclosure. FIG. 5 is a schematic diagram of a cogeneration system including a vapor compression heat pump coupled via conduits 200A and 200E in series to a Brayton-cycle heat operatively, in accordance with another embodiment of the present disclosure. In some applications, the cogeneration system 15 can be configured to move heat transfer fluid from heat pump 405 to the heat engine 105 (or vice versa) rather than separately to each component, as previously shown in FIG. 2, where the conduits 200 are in configured in a parallel configuration.

There are some advantages to moving the heating transfer fluid through conduits 200 configured in series. For instance, a series configuration is less complex than a parallel conduit configuration because the plumbing system includes fewer components (e.g., fewer conduit sections and valves). In addition, the series configuration can use less sophisticated components, such as pumps or valves, which are easier to operate and configure. In an example embodiment shown in FIG. 4, the heat transfer fluid leaving the valve arrangement 510 can move along conduit 200 (as indicated by the arrows) and through the condenser 430 to absorb thermal energy from the working fluid of the heat pump 405. The heat transfer fluid can then continue moving to heat exchanger 140 of heat engine 105 along conduit 200E. At the heat exchanger 140, the heat transfer fluid can absorb thermal energy from the working fluid of the heat engine 105. Upon receiving the thermal energy from heat engine 105, the heat transfer fluid can move back to the valve arrangement 510 via conduit 200A at which it can be distributed to other components of the cogeneration system. In some other embodiments, the cogeneration system 15 is constructed and arranged to move the heat transfer fluid in a direction opposite of that shown in FIG. 4. For example, as illustrated by FIG. 5, the heat transfer fluid can move from the heat engine 105 to the heat pump 405 (as indicated by the arrows) so that it can absorb thermal energy prior to being distributed to other system components. Numerous other cogeneration system configurations will be apparent in light of the present disclosure.

Example System Operation Applications

The cogeneration systems of the present disclosure can be operated to provide one or more services to the enclosure 500. Services, such as space heating and/or cooling, water heating, and thermal and electrical energy generation, can be supplied or otherwise provided to the enclosure 500 by operation of a heat engine, heat pump or combination thereof. In an example embodiment, the cogeneration system 15 can be configured to determine whether to operate the heat engine 105 or heat pump 405 (or both) based on a number of factors. Factors, such as availability of electricity from an energy supplier, market price of electricity and fuels (e.g., fossil or renewable chemical fuels), temperature of the surrounding environment, backup energy supplies (e.g., from the thermal or electrical energy storage systems), or service demands of the enclosure 500 can be considered individually or collectively to determine a manner in which to operate cogeneration system components.

Figure 6:
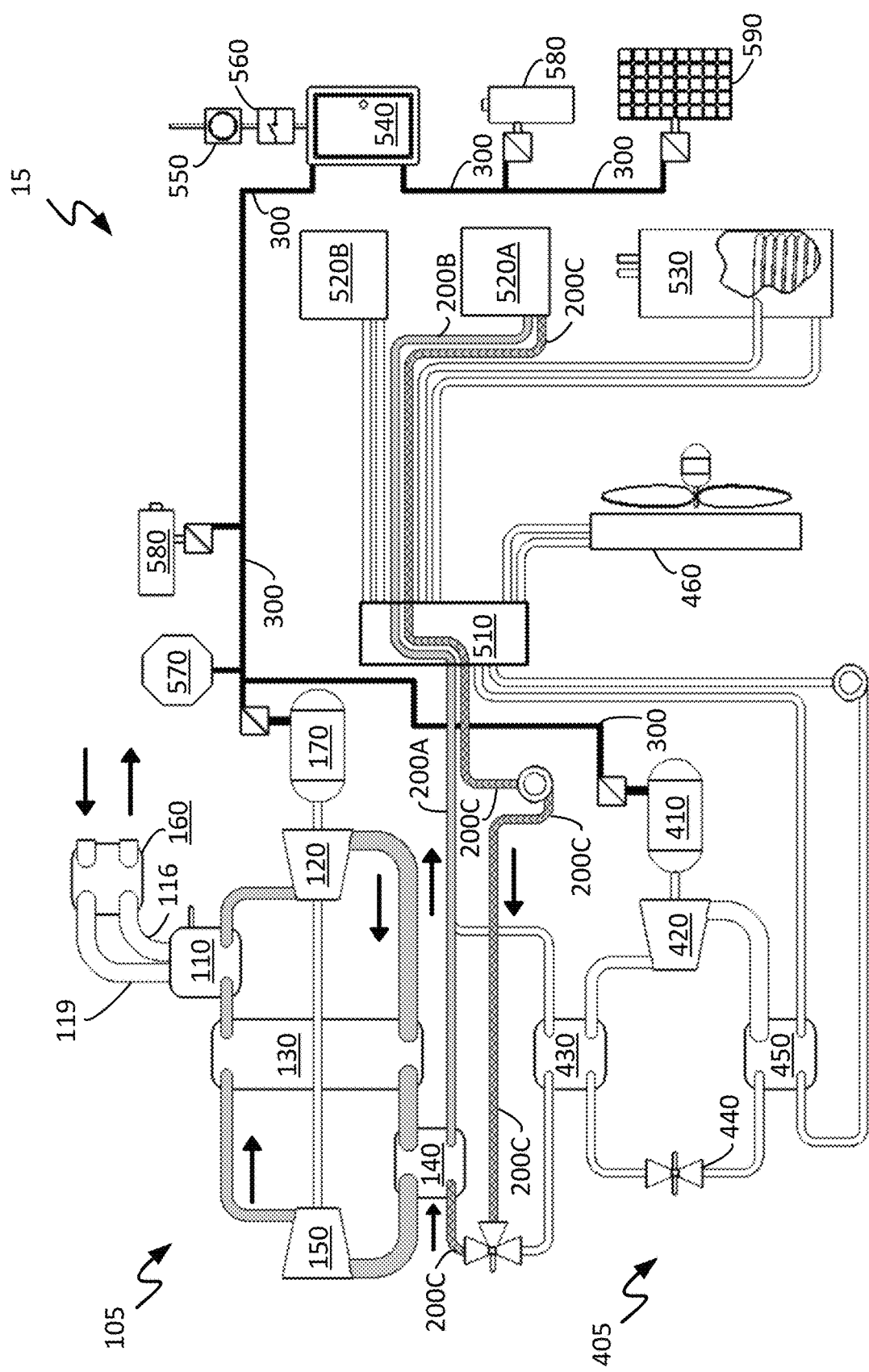
FIG. 6 is a schematic diagram of a cogeneration system configured to supply space heating and electricity to the enclosure using a heat engine, in accordance with an embodiment of the present disclosure.

FIG. 6 is a schematic diagram of a cogeneration system 15 configured to supply space heating to the enclosure 500, in accordance with an embodiment of the present disclosure. As previously described herein, the heat engine 105 can generate both thermal and electrical energy. In this application, the cogeneration system 15 can operate the heat engine 105 (as indicated by the shaded lines) to supply or otherwise provide heating to the enclosure 500 via the heat transfer fluid. The operation of the heat engine 105, as can be seen, is accomplished without operating the heat pump 405. There are a number of instances in which operating only the heat engine 105 to generate thermal energy may be preferred. In one such instance, the heat (co)generated by the heat engine in meeting the electric located is sufficient to satisfy the heat load. Other instances may include grid-connected situations when the system might generate electricity which can be exported to the grid while cogenerating at least sufficient heat to meet the heat load. As a result, the cogeneration system 15 can be configured to operate the heat engine 105 (as indicated by shading and arrows) by itself when it is most practical to do so. In the application shown in FIG. 6, the heat transfer fluid moves through the heat exchanger 140 to absorb thermal energy from the working fluid of the heat engine 105. As can be seen, the high-temperature heat transfer fluid (as indicated by solid shading) moves from the heat engine 105 to the valve arrangement 510 via conduit 200A (i.e. first conduit) attached to the heat engine 105. At the valve arrangement 510, the high-temperature heat transfer fluid can be directed to a number of cogeneration system components. In this instance, the valve arrangement 510 directs the high-temperature heat transfer fluid to the inside heat exchanger 520A via conduit 200B. Once at the heat exchanger 520A, ambient air of the enclosure 500 absorbs thermal energy from the heat transfer fluid, as previously described herein, to heat the enclosure 500. Upon exiting the heat exchanger 520A, the heat transfer fluid is at a reduced temperature (as indicated by shading with zig-zag lines). The reduced-temperature heat transfer fluid moves or otherwise flows back to the valve arrangement 510 and to the heat exchanger 140 via conduits 200C to repeat the heating cycle. As can be seen, in addition to thermal energy, the heat engine 105 also generates electricity (as indicated by heavy solid black lines) by operating generator 170. This electricity can be supplied to any number of cogeneration system components. In this instance, electricity is transmitted via electrical cables 300 to the control panel 570, electrical energy storage system 580, and power panel 540. In other instances, the generated electricity can be provided to one or more energy suppliers via an electrical connection with the grid.

Figure 7:
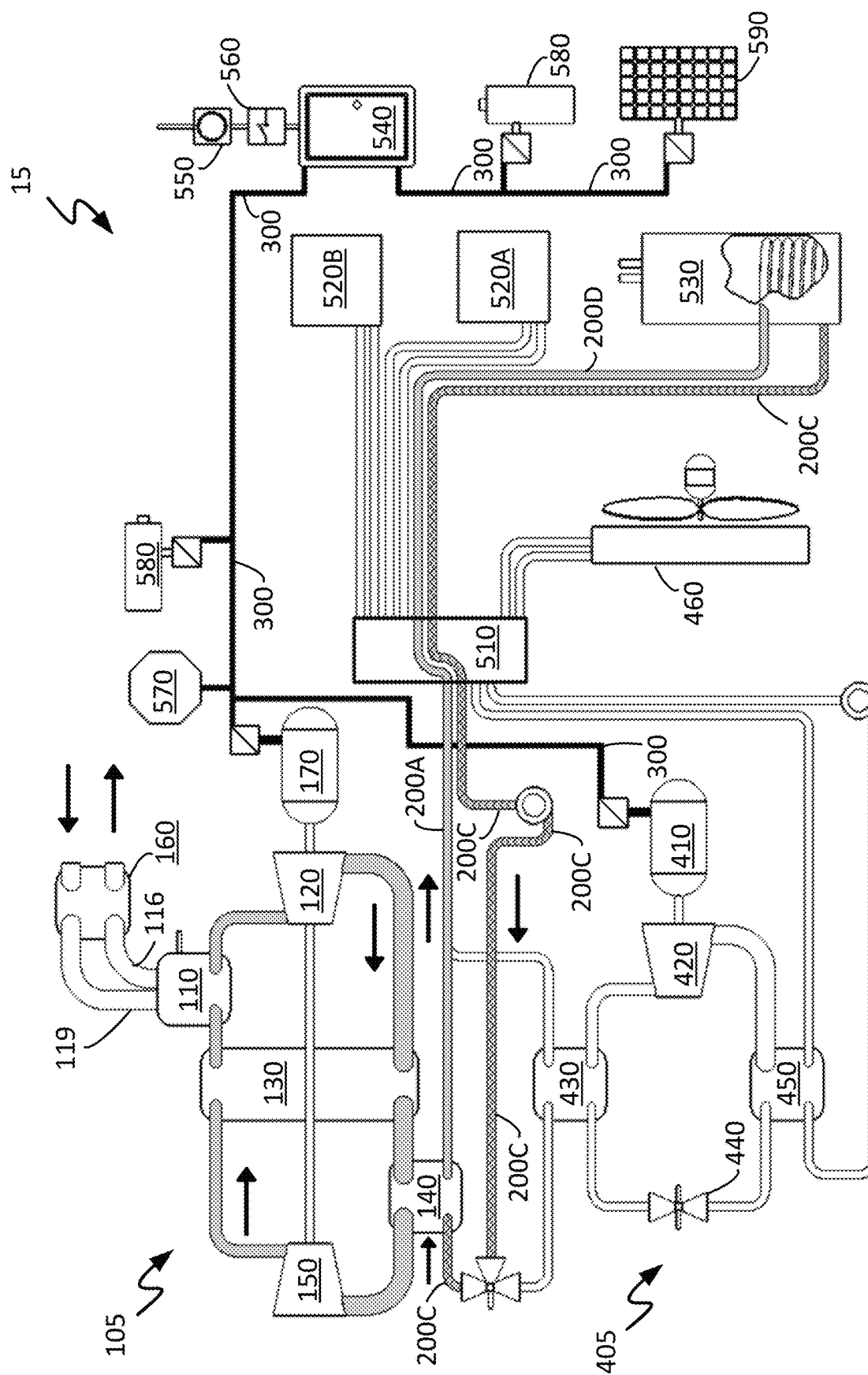
FIG. 7 is a schematic diagram of a cogeneration system configured to supply water heating and electricity to the enclosure using a heat engine, in accordance with an embodiment of the present disclosure.

FIG. 7 is a schematic diagram of a cogeneration system 15 configured to supply water heating to the enclosure 500 using a heat engine 105, in accordance with an embodiment of the present disclosure. As can be seen, the cogeneration system 15 can operate the heat engine 105 (as indicated by shading and arrows) without operating the heat pump 405 to supply or otherwise provide water heating to the enclosure 500. Generally speaking, water heating can be for various purposes, such as domestic hot water usage or hot water storage. As previously described, the heat transfer fluid can absorb thermal energy from heat exchanger 140 and it moves towards the valve arrangement 510 via conduit 200A (first conduit). At the valve arrangement 510, the high-temperature heat transfer fluid (as indicated by solid shading) can be directed to the thermal storage system 530 (e.g., a water heat tank) via conduit 200D. Once at the thermal energy storage system 530, fluid disposed in the storage system 530 absorbs thermal energy from the high-temperature heat transfer fluid, for example via a heat exchanger disposed in a tank. As a result, the temperature of fluid in the thermal storage system 530 increases, and thus storing thermal energy therein. This stored thermal energy can be maintained for a period of time (e.g., for weeks or months) with little or no further thermal inputs. Once stored in thermal storage system 530, this thermal energy can be used to supply energy to other cogeneration system components, as will be described further herein. Upon exiting the thermal storage system 530, the heat transfer fluid is at a reduced temperature (as indicated by shading with zig-zag lines). The reduced-temperature heat transfer fluid can move or otherwise flow back to the valve arrangement 510 and the heat exchanger 140 via conduits 200C to repeat the heating cycle. As can be seen, the heat engine 105 also generates electricity which can be used to operate cogeneration system components or can be sold to energy suppliers, as previously described herein.

Figure 8:
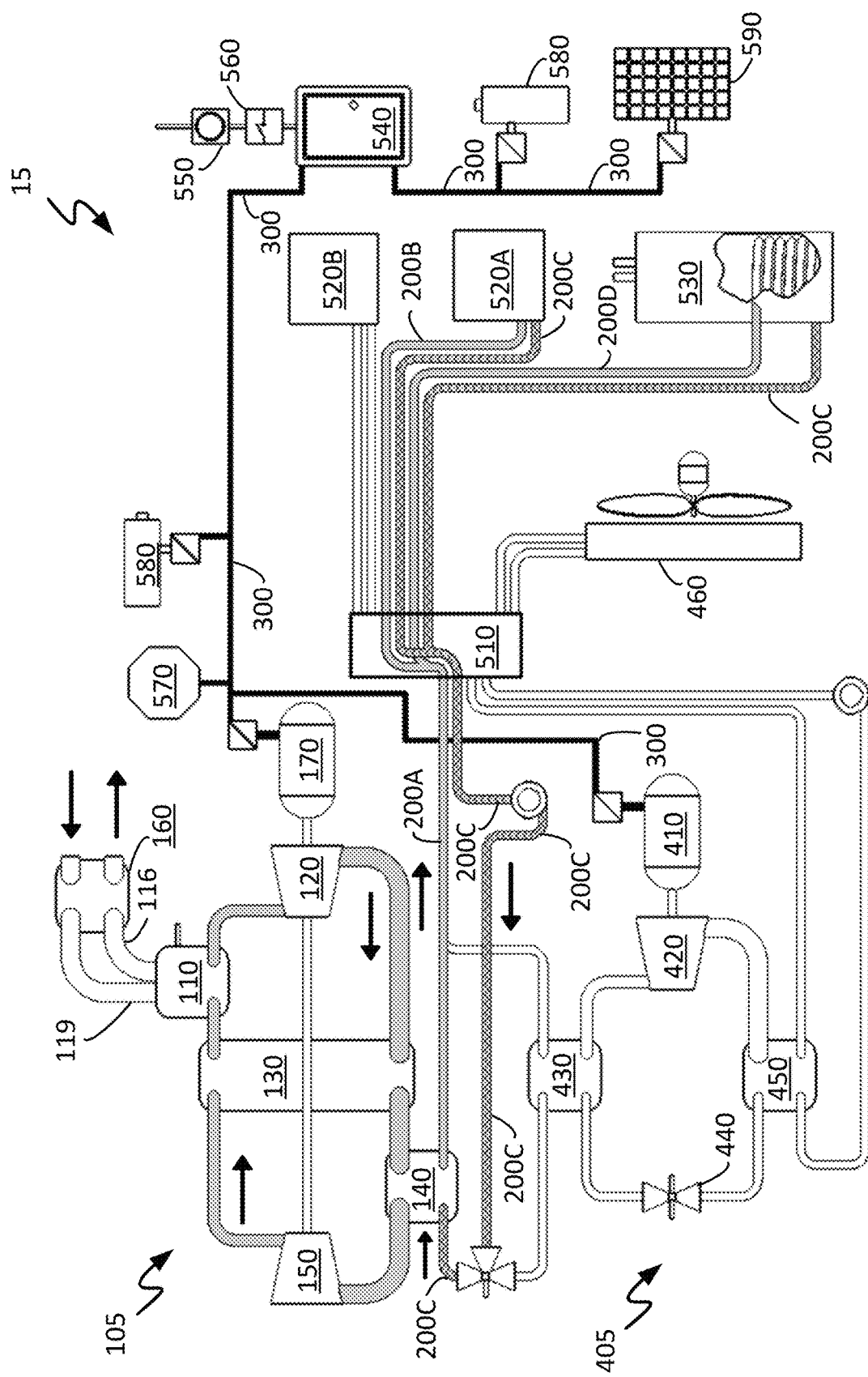
FIG. 8 is a schematic diagram of a cogeneration system configured to supply space and water heating and electricity to the enclosure using a heat engine, in accordance with an embodiment of the present disclosure.

FIG. 8 is a schematic diagram of a cogeneration system 15 configured to supply space heating and water heating to the enclosure 500 using a heat engine 105, in accordance with an embodiment of the present disclosure. As can be seen, the cogeneration system 15 can operate only the heat engine 105 (as indicated by shading and arrows) to provide both space and water heating to the enclosure 500. In this embodiment, for in this instance, the high-temperature heat transfer fluid (as indicated by solid shading) can move from the heat exchanger 140 of the heat engine 105 to the valve arrangement 510 via conduit 200A (first conduit). At the valve arrangement 510, the high-temperature heat transfer fluid can be directed to heat exchanger 520A via conduit 200B and the thermal storage system 530 (e.g., a water heat tank) via conduit 200D, as previously described herein. In an example embodiment, the valve arrangement 510 can simultaneously direct high-temperature heat transfer fluid to both heat exchanger 520A and thermal storage system 530, thereby heating the enclosure 500 and storing thermal energy at the same time. In other embodiments, the valve arrangement 510 may direct the high-temperature heat transfer fluid to one component first and then to another. For instance, in one embodiment, the cogenerations system 15 can be configured to prioritize demands for space heating ahead of storing thermal energy. In such an instance, the valve arrangement 510 may direct all the high-temperature heat transfer fluid to heat exchanger 520A until a desired temperature within the enclosure 500 is achieved (e.g., 20° Celsius (C)). In other instances, the valve arrangement 510 may vary the amount of high-temperature heat transfer fluid to each component (e.g., 75% to heat exchanger 520A and 25% to thermal storage system 530). Such an instance, may be desired when the thermal storage system requires only a limited input (e.g., when the temperature of the fluid of the storage system is nearly the same as the heat transfer fluid). No matter its particular sequence or manner of operation, the cogeneration system 15 can use the heat engine 105 to both heat the enclosure 500 and store thermal energy for subsequent use by the system 15, as previously described herein. Upon exiting the heat exchanger 520A and thermal storage system 530, the heat transfer fluid is at a reduced temperature (as indicated by shading with zig-zag lines). The reduced-temperature heat transfer fluid can return to the valve arrangement 510 via conduits 200C to repeat the space heating and thermal energy storing cycles. As can be seen, the heat engine 105 also generates electricity which can be used to operate cogeneration system components or can be sold to energy buyers over the grid, as previously described herein.

Figure 9:
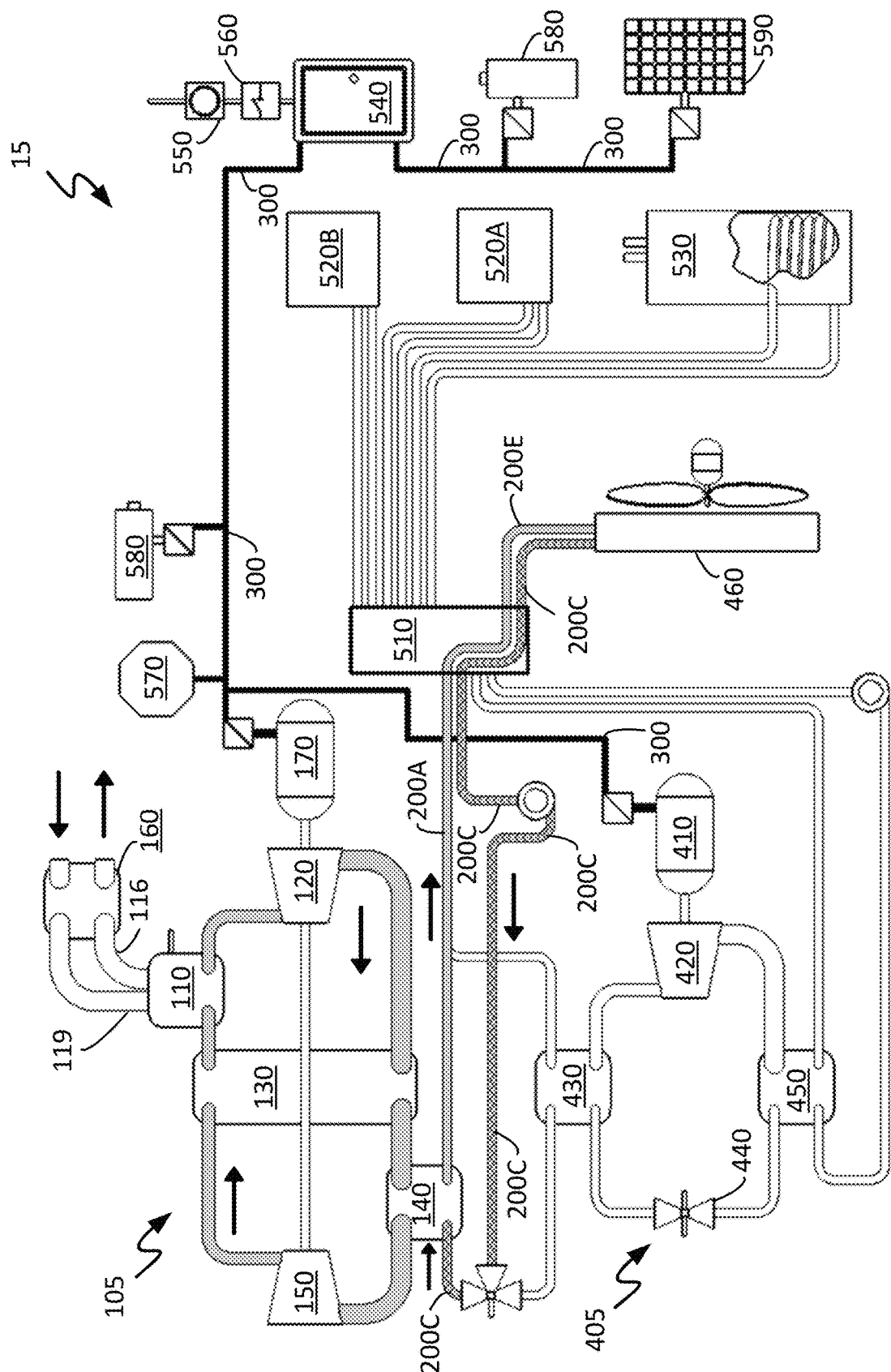
FIG. 9 is a schematic diagram of a cogeneration system configured to supply electricity to the enclosure using a heat engine, in accordance with an embodiment of the present disclosure.

FIG. 9 is a schematic diagram of a cogeneration system configured to supply electricity to the enclosure 500 using a heat engine 105, in accordance with an embodiment of the present disclosure. In this example application, only the heat engine 105 is operated (as indicated by shading and arrows) for purposes of generating electricity because the heat pump 405 does not produce electricity. Rather, heat pumps, such as heat pump 405, consume electricity to produce heating and cooling, as will be described further herein. The cogeneration system 15 can operate in this manner in a number of instances. For example, in one instance, the enclosure 500 may be demanding electricity, but not heating or cooling. As a result, the cogeneration system 15 can be configured to operate just the heat engine 105 because there are no unfulfilled or unsatisfied thermal energy needs for the enclosure 500 (e.g., no heating or cooling demands and thermal storage systems are at or nearly at full capacity). In other instances, the cogeneration system 15 can be configured to determine the most cost effective manner in which to supply electricity. For example, if the demand for electricity occurs when market prices for electricity are high (e.g., peak hours, such as early morning hours) then the cogeneration system 15 may operate the heat engine 105 to produce electricity rather than purchasing it from the grid. As can be seen, in this instance, high-temperature heat transfer fluid (as indicated by solid shading) can move or otherwise flow from the heat exchanger 140 to the valve arrangement 510 via conduit 200A. From valve arrangement 510, the high-temperature heat transfer fluid can move to the outside heat exchanger 460 via conduit 200E. Once at the heat exchanger 460, ambient air of the surrounding environment absorbs the thermal energy from the heat transfer fluid thereby allowing the cogeneration system 15 to dispose of thermal energy that is not needed to operate the system. Upon exiting the heat exchanger 460, the heat transfer fluid is at a reduced temperature (as indicated by shading with zig-zag lines). The reduced-temperature heat transfer fluid can move or otherwise flow back to the valve arrangement 510 via conduits 200C to repeat the cycle to cool the heat engine 105. The electricity generated by the heat engine 105 can be used to operate cogeneration system components or can be sold to energy suppliers, as previously described herein.

Figure 10:
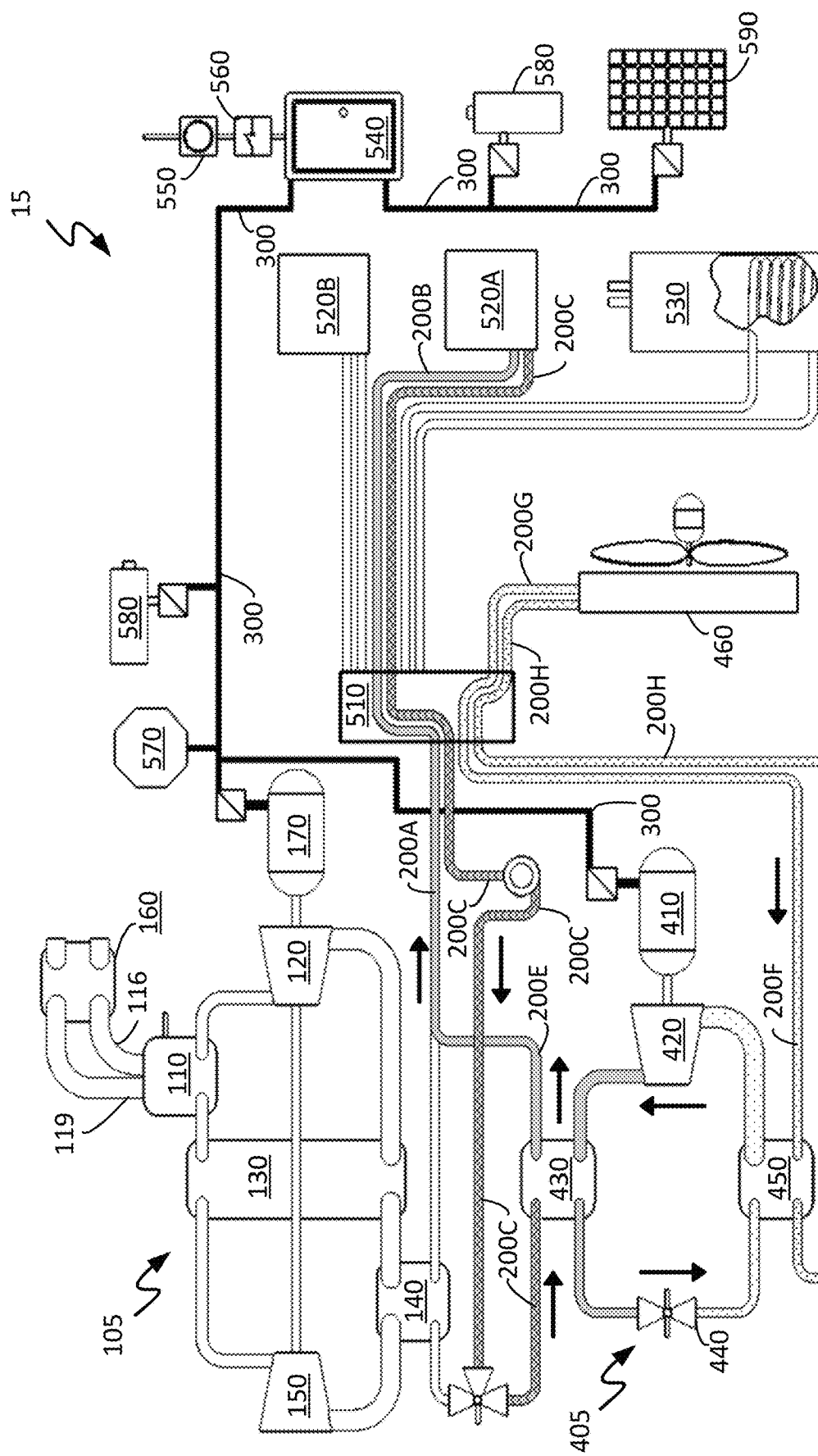
FIG. 10 is a schematic diagram of a cogeneration system configured to supply space heating to the enclosure using a heat pump, in accordance with an embodiment of the present disclosure.

FIG. 10 is a schematic diagram of a cogeneration system 15 configured to supply space heating to the enclosure 500 using a heat pump 405, in accordance with an embodiment of the present disclosure. As can be seen, the cogeneration system 15 can operate only the heat pump 405 (as indicated by shading and arrows) to heat to the enclosure 500. There are a number of instances in which operating only the heat pump 405 to generate thermal energy may be preferred. In one such instance, cost to operate the heat engine 105 (e.g., price of fuel) may make operation of the engine 105 more expensive than purchasing electricity from an energy supplier. In some other instances, heating demands for the enclosure may be high while its electricity demands are low (e.g., during late evening and early morning hours when there is little to no activity happening in the enclosure 500). Other instances may include situations when grid electricity is available for relatively low prices or when there is surplus electricity available from on-site solar. As a result, the cogeneration system 15 can be configured to operate the heat pump 405 by itself using electricity from the grid when it is most practical to do so. In the application shown in FIG. 10, the heat transfer fluid moves through the condenser 430 of the heat pump 405 to absorb thermal energy from the working fluid of the heat pump 405. As can be seen, the high-temperature heat transfer fluid (as indicated by solid shading) moves from the heat pump 405 to the valve arrangement 510 via conduits 200E and 200A. From the valve arrangement 510, the high-temperature heat transfer fluid can move to the inside heat exchanger 520A via conduit 200B. Once at the heat exchanger 520A, ambient air of the enclosure 500 absorbs thermal energy from the heat transfer fluid, as previously described herein, to heat the enclosure 500. Upon exiting the heat exchanger 520A, the heat transfer fluid is at a reduced temperature (as indicated by shading with zig-zag lines). The reduced-temperature heat transfer fluid can move back to the condenser 430 via conduits 200C to repeat the heating cycle.

While the heat transfer fluid in conduit 200E absorbs thermal energy from the working fluid of the heat pump 405, the working fluid is also absorbing thermal energy from heat transfer fluid in conduit 200F. As can be seen, upon moving through the reducing valve 440, the temperature of the working fluid has been reduced. To increase its temperature and thus ready the working fluid to enter the compressor 420, the working fluid can move through an evaporator 450. At the evaporator 450, the low-temperature working fluid absorbs thermal energy from higher-temperature heat transfer fluid thereby raising the temperature of the working fluid. In addition, the temperature of the heat transfer fluid in conduit 200F is reduced. After exiting the evaporator 450, the low-temperature heat transfer fluid (as indicated by lightly dotted shading) can move from the heat pump 405 to the valve arrangement 510 via conduit 200H. From the valve arrangement 510, the low-temperature heat transfer fluid can move to the outside heat exchanger 460 via conduit 200G. Once at heat exchanger 460, the heat transfer fluid absorbs thermal energy from ambient air of the surrounding to increase the temperature of the fluid. Upon exiting the heat exchanger 460, the heat transfer fluid is at an increased temperature (as indicated by more heavily dotted shading). The increased-temperature heat transfer fluid moves back to the evaporator 450 via conduits 200F to repeat the cycle.

Figure 11:
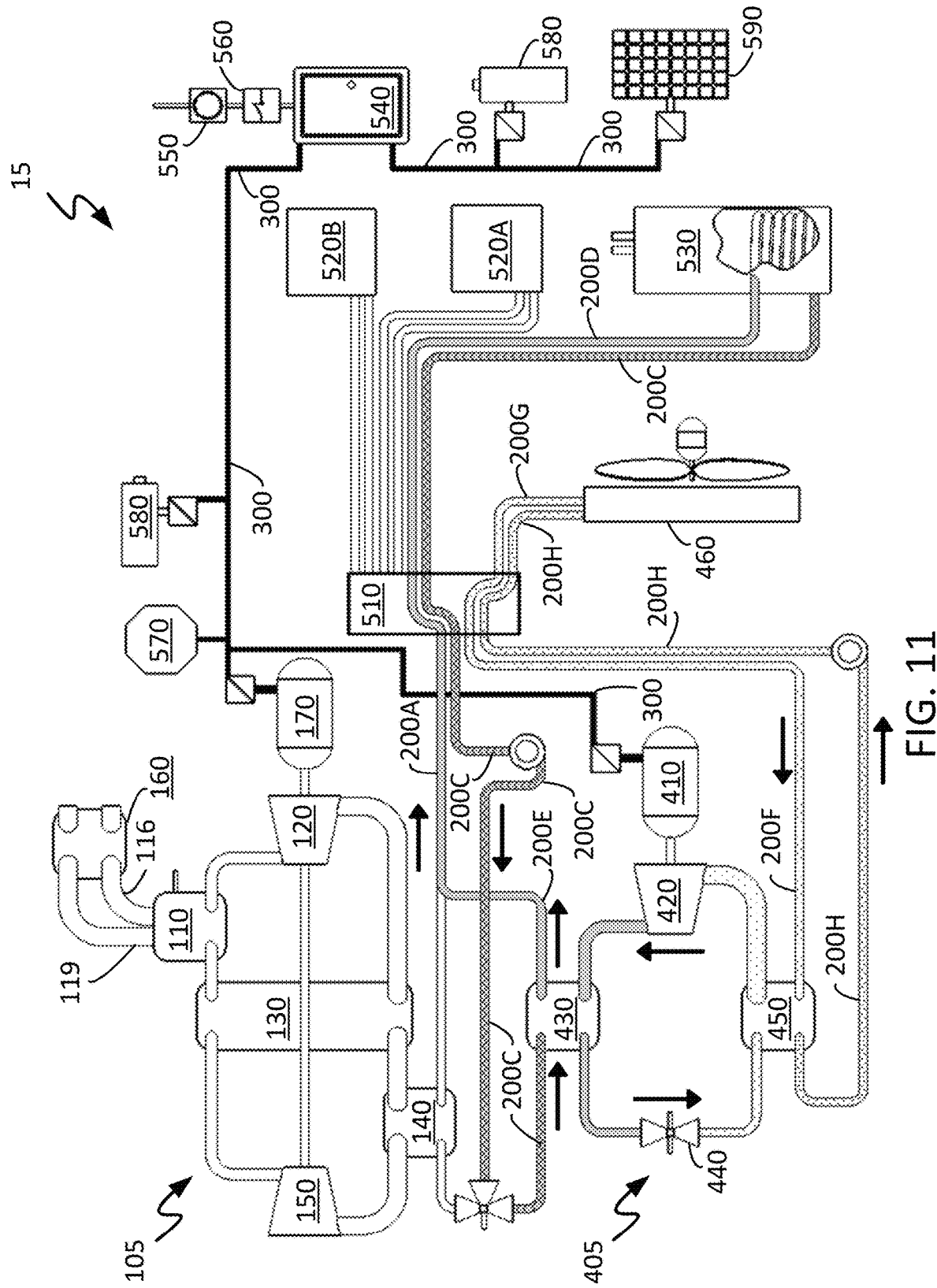
FIG. 11 is a schematic diagram of a cogeneration system configured to supply water heating to the enclosure using a heat pump, in accordance with an embodiment of the present disclosure.

FIG. 11 is a schematic diagram of a cogeneration system 15 configured to supply water heating to the enclosure 500 using a heat pump 405, in accordance with an embodiment of the present disclosure. In an example application, the cogeneration system 15 can operate only the heat pump 405 (as indicated by shading and arrows) to provide water heating to the enclosure 500. In the application shown in FIG. 11, the heat transfer fluid absorbs thermal energy from the working fluid via the condenser 430 of the heat pump 405. As can be seen, the high-temperature heat transfer fluid (as indicated by solid shading) moves from the heat pump 405 to the valve arrangement 510 via conduits 200E and 200A. From the valve arrangement, the high-temperature heat transfer fluid moves to the thermal storage system 530 (e.g., a water heat tank) via conduit 200D. Once at the thermal storage system 530, the fluid disposed in the storage system 530 absorbs thermal energy from the high-temperature heat transfer fluid, for example via a heat exchanger disposed in a tank, as previously described herein. Upon exiting the thermal storage system 530, the heat transfer fluid is at a reduced temperature (as indicated by shading with zig-zag lines). The reduced-temperature heat transfer fluid can move back to the condenser 430 of the heat pump 405 via conduits 200C to repeat the water heating cycle. Also shown is a conduit 200F attached to the evaporator 450 and configured to supply low-temperature heat transfer fluid to cogeneration system components to operate the heat pump 405, as previously described above in relation to FIG. 10.

Figure 12:
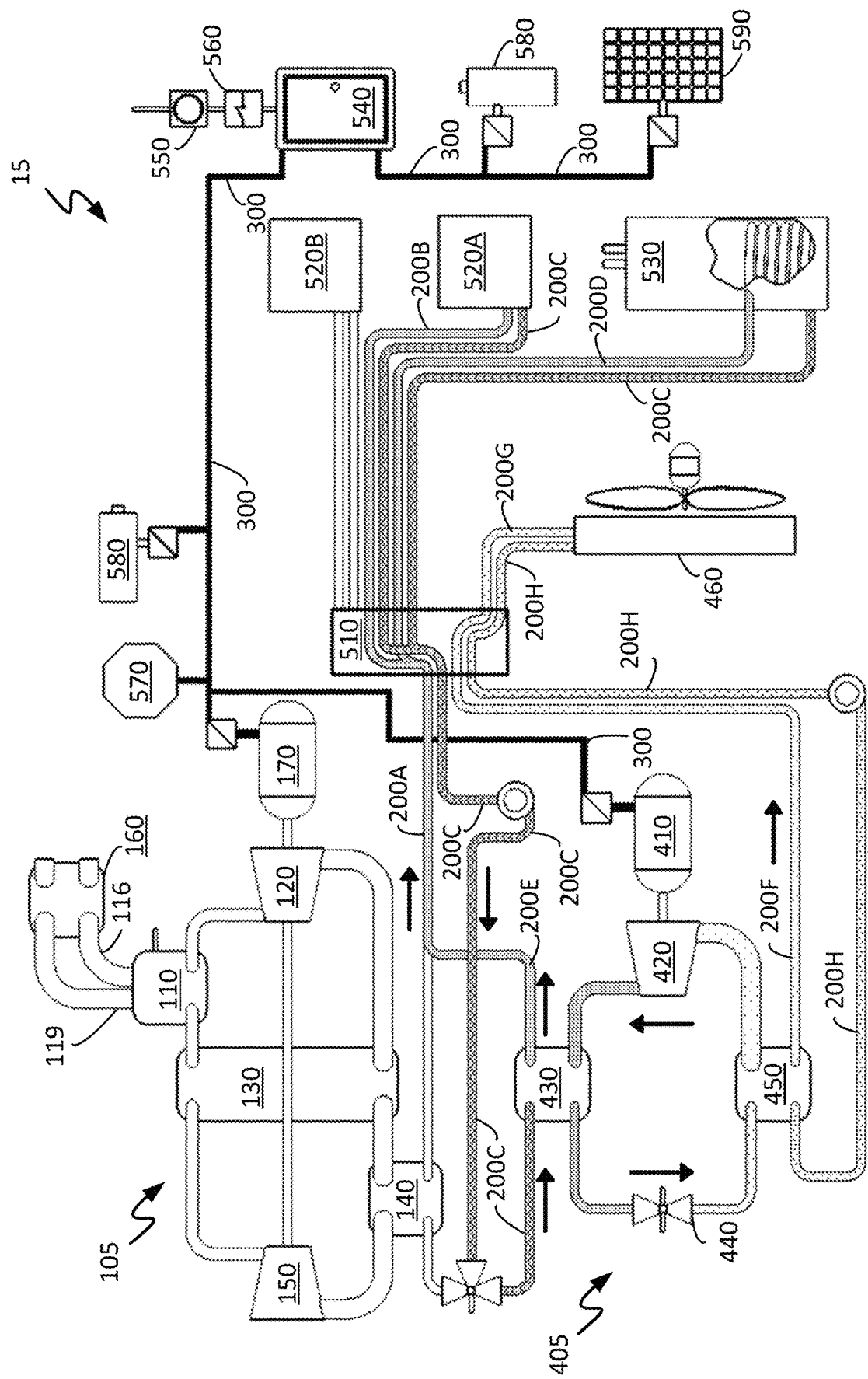
FIG. 12 is a schematic diagram of a cogeneration system configured to supply space and water heating to the enclosure using a heat pump, in accordance with an embodiment of the present disclosure.

FIG. 12 is a schematic diagram of a cogeneration system 15 configured to supply space heating and water heating to the enclosure 500 using a heat pump 405, in accordance with an embodiment of the present disclosure. As can be seen, the cogeneration system 15 can operate the heat pump 405 (as indicated by shading and arrows) without operating the heat engine 105 (as indicated by no shading and arrows) to provide both space heating and water heating to the enclosure 500. As can be seen, in this instance, high-temperature heat transfer fluid (as indicated by solid shading) moves from the condenser 430 to the valve arrangement 510 via conduits 200E and 200A. From the valve arrangement 510, high-temperature heat transfer fluid moves to heat exchanger 520A via conduit 200B and the thermal storage system 530 (e.g., a water heat tank) via conduit 200D. The heat pump 405 can supply space and water heating in a number of fashions, such as simultaneously, individually (e.g., supplying one component than another), or proportionally (75% of heat transfer fluid to one component and 25% to another) as previously described herein. Upon exiting the heat exchanger 520A and thermal storage system 530, the heat transfer fluid is at a reduced temperature (as indicated by shading with zig-zag lines). The reduced-temperature heat transfer fluid moves back to the condenser 430 via conduits 200C to repeat the space and water heating cycle. Also shown is conduit 200F that supplies low-temperature heat transfer fluid to cogeneration system components to operate the heat pump 405, as previously described above in relation to FIGS. 10 and 11.

Figure 13:
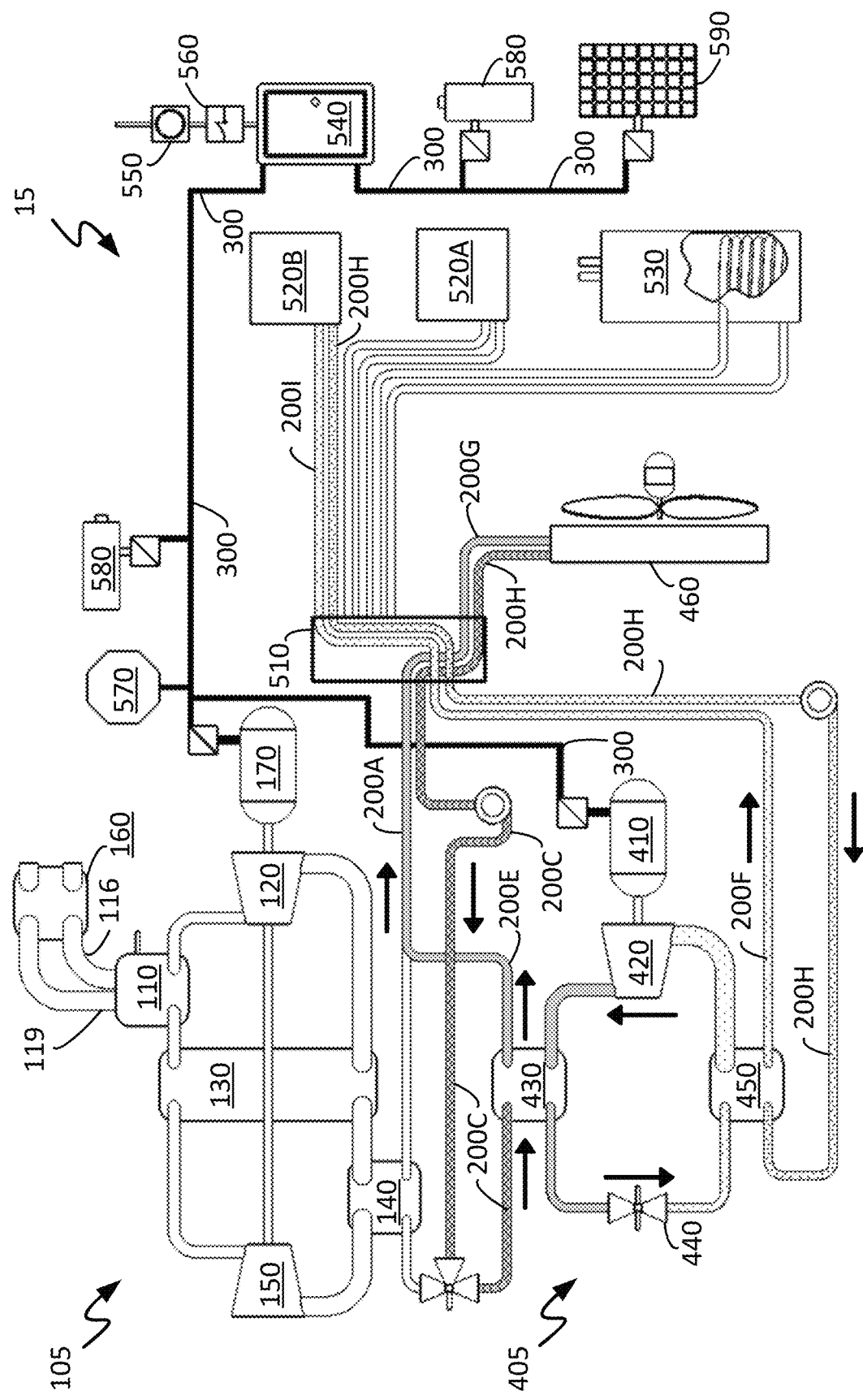
FIG. 13 is a schematic diagram of a cogeneration system configured to supply space cooling to the enclosure using a heat pump, in accordance with an embodiment of the present disclosure.

FIG. 13 is a schematic diagram of a cogeneration system 15 configured to supply space cooling to the enclosure 500 using a heat pump 405, in accordance with an embodiment of the present disclosure. As previously described herein, the heat pump 405 can also provide space cooling to the enclosure 500. In this application, the cogeneration system 15 can operate the heat pump 405 (as indicated by shading and arrows) to supply or otherwise provide space cooling to the enclosure 500 via the heat transfer fluid. Note that the enclosure 500 can be cooled by the heat pump 405 without operating the heat engine 105 for reasons provided above. As a result, the cogeneration system 15 can be configured to operate the heat pump 405 by itself using electricity from the grid when it is most practical to do so. In the application shown in FIG. 13, the working fluid of the heat pump 405 absorbs thermal energy from the heat transfer fluid flowing through the evaporator 450. As a result, the temperature of the heat transfer fluid is reduced (as indicated by lighting dotted shading). Upon exiting the evaporator 450, the low-temperature heat transfer fluid can move or otherwise flow from the heat pump 405 to the valve arrangement 510 via conduit 200F. From the valve arrangement 510, the low-temperature heat transfer fluid can move to the inside heat exchanger 520B via conduit 200I. Once at heat exchanger 520B, the heat transfer fluid absorbs thermal energy from ambient air of the enclosure 500 and thereby cooling the enclosure 500. Upon exiting the heat exchanger 520B, the heat transfer fluid is at an increased temperature (as indicated by more heavily dotted shading). The increased-temperature heat transfer fluid moves back to the evaporator 450 via conduits 200H to repeat the cooling cycle.

While the working fluid is absorbing thermal energy from heat transfer fluid in conduit 200F to supply cooling to the enclosure, heat transfer fluid in conduit 200E absorbs thermal energy from the working fluid of the heat pump 405. As can be seen, in this instance, high-temperature heat transfer fluid (as indicated by solid shading) moves from the condenser 430 to the valve arrangement 510 via conduits 200E and 200A. From the valve arrangement 510, the high-temperature heat transfer fluid can move to the outside heat exchanger 460 via conduit 200G. Once at the heat exchanger 460, ambient air of the surrounding environment absorbs the thermal energy from the heat transfer fluid thereby allowing the cogeneration system 15 to dispose of thermal energy that is not needed to operate the system. Upon exiting the heat exchanger 460, the heat transfer fluid is at a reduced temperature (as indicated by shading with zig-zag lines).

The reduced-temperature heat transfer fluid can move back to the condenser 430 via conduits 200H to repeat the cycle to dispose of thermal energy generated by the heat pump 405.

Figure 14:
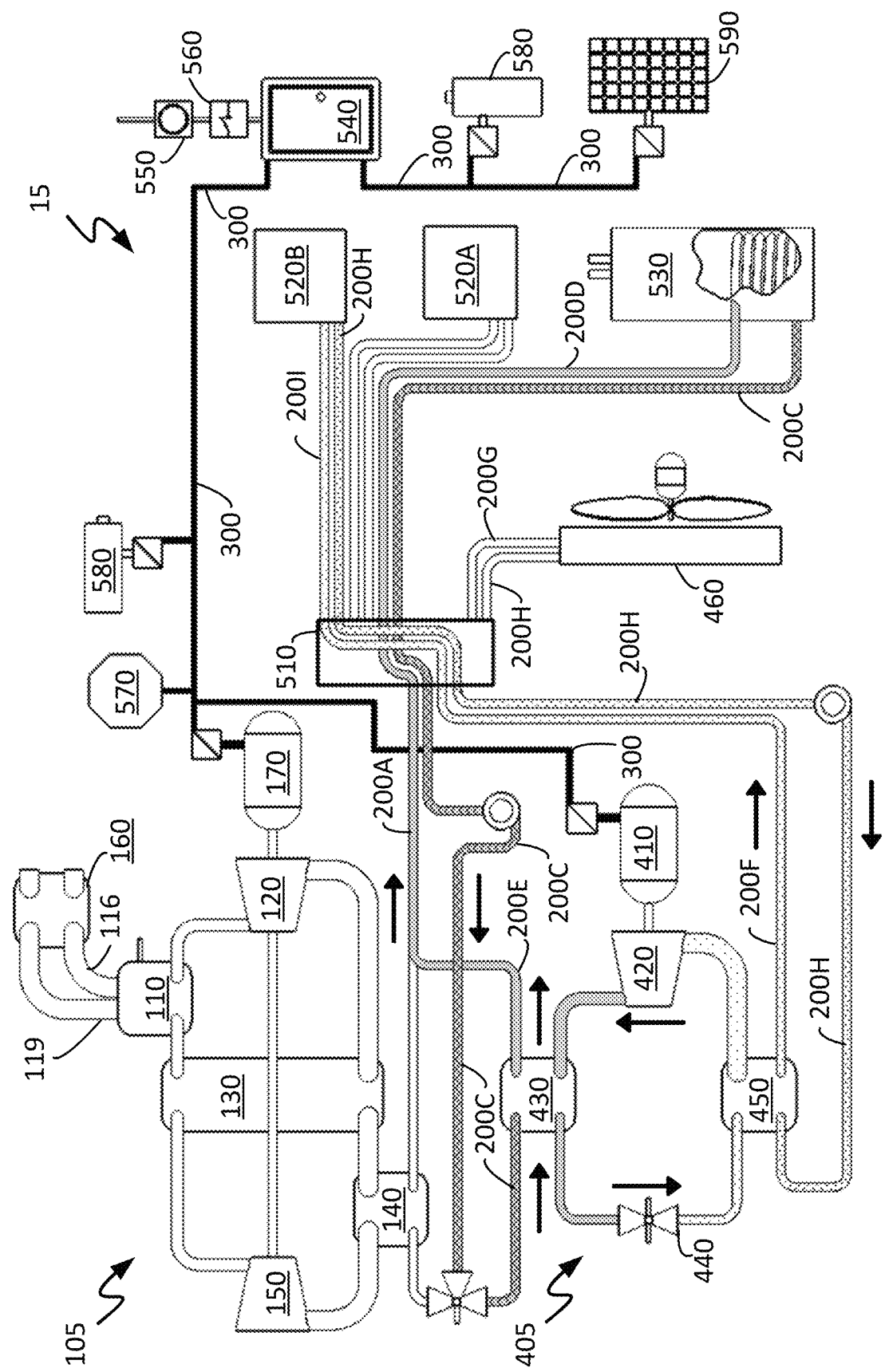
FIG. 14 is a schematic diagram of a cogeneration system configured to supply water heating and space cooling to the enclosure using a heat pump, in accordance with an embodiment of the present disclosure.

FIG. 14 is a schematic diagram of a cogeneration system 15 configured to supply water heating and space cooling to the enclosure 500 using a heat pump 405, in accordance with an embodiment of the present disclosure. Rather than transferring the thermal energy generated by the heat pump 405 during the cooling cycle to the environment as shown in FIG. 13, the cogeneration system 15 can be configured to recovery this energy in a number of ways. For instance, in one illustrative embodiment, the cogeneration system 15 can recover or otherwise capture thermal energy generated by the heat pump 405 and store it for later use. As can be seen, the heat pump 405 can absorb thermal energy from the heat transfer fluid moving through the third conduit 200F to cool the enclosure 500, as previous described in relation to FIG. 13. In addition, the cogeneration system 15 can store the thermal energy generated by the heat pump 405 as it provides space cooling to the enclosure 500. As shown, the high-temperature heat transfer fluid (as indicated by solid shading) moves from the condenser 430 to the valve arrangement 510 via conduits 200E and 200A. From the valve arrangement 510, the high-temperature heat transfer fluid can move to thermal storage system 530 (e.g., a water heat tank) via conduit 200D. Once at the thermal storage system 530, fluid disposed in the storage system 530 absorbs thermal energy from the high-temperature heat transfer fluid, for example via a heat exchanger disposed in a tank, as previously described herein. Upon exiting the thermal storage system 530, the heat transfer fluid is at a reduced temperature (as indicated by shading with zig-zag lines). The reduced-temperature heat transfer fluid can move back to the condenser 430 via conduits 200C to repeat the thermal storage cycle. Note that, in some embodiments, thermal energy can be stored by the cogeneration system 15 while it simultaneously supplies cooling to the enclosure 500. While in other embodiments, the cogeneration system 15 can supply cooling to the enclosure 500 and intermittently or periodically store thermal energy as needed (e.g., maintain a threshold level or capacity). For example, the valve arrangement 510 can initially direct high-temperature heat transfer fluid to the thermal storage system 530 and then to the outside heat exchanger 460 once the system 530 is a desired thermal energy level. Thus, the thermal storage system, in some embodiments, can periodically receive thermal energy to maintain an amount of thermal energy stored in the thermal storage system above a threshold level. A threshold level can be a minimum amount of energy that can be stored in the thermal storage system 530 to operate the cogeneration system 15 for a period of time (e.g., 6 hours, 12, hours, a day or several days). Numerous thermal storage configurations will be apparent in light of the present disclosure.

Figure 15:
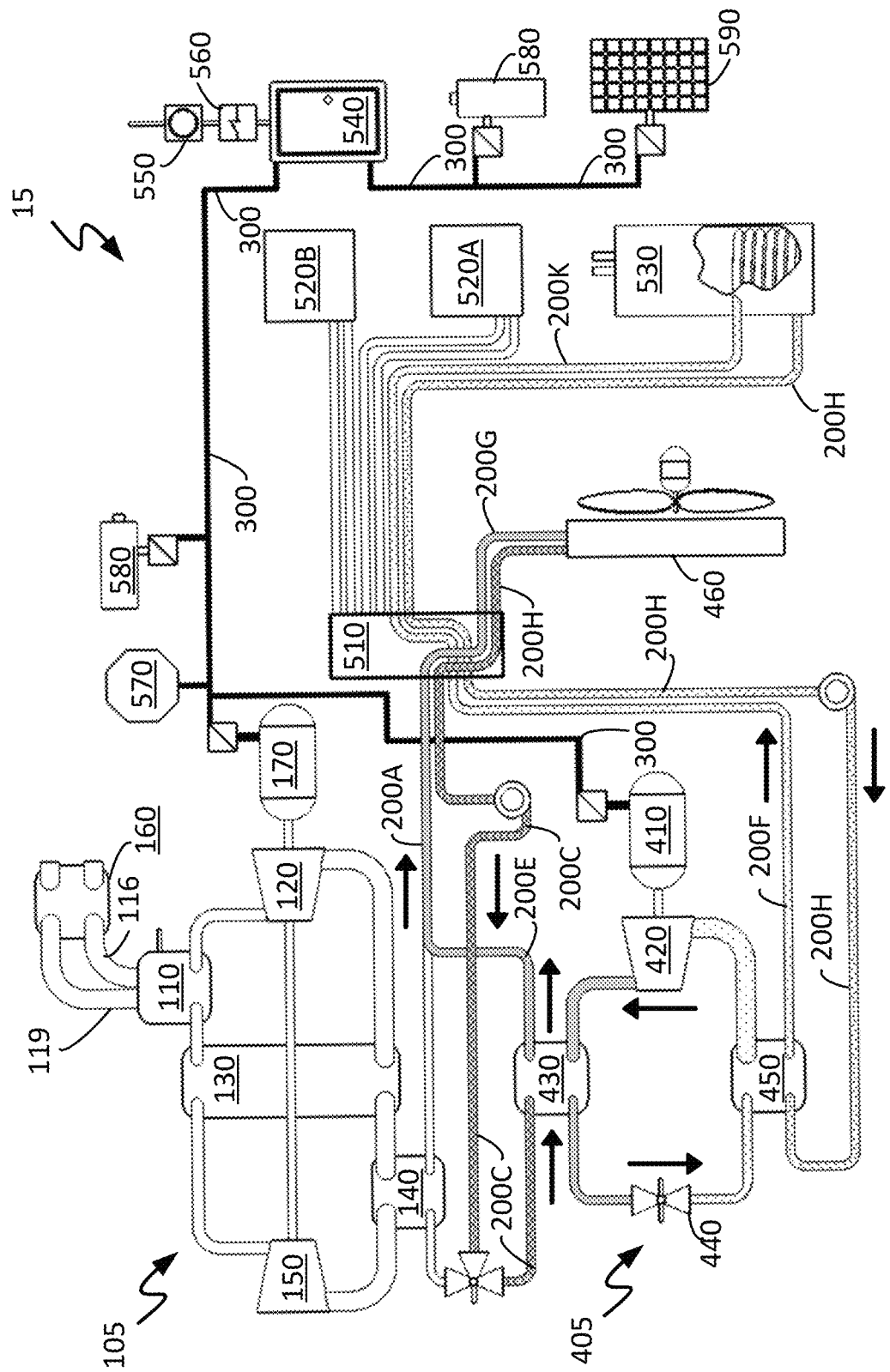
FIG. 15 is a schematic diagram of a cogeneration system configured to de-ice the point of contact to a heat reservoir, such as an outside heat exchanger, using a heat pump, in accordance with an embodiment of the present disclosure.

FIG. 15 is a schematic diagram of a cogeneration system 15 configured to de-ice a heat reservoir, such as an outside heat exchanger 460 using a heat pump 405, in accordance with an embodiment of the present disclosure. Under some conditions (e.g., cold days in which the heat pump operates at a high coefficient of performance) ice may form on the outside heat exchanger 460 and thereby preventing the heat exchanger 460 from functioning properly. Previous systems require that unwanted cooling be supplied to the enclosure 500 and/or physical changes to components be made (e.g., adding or swapping out valves) to remove or otherwise de-ice the heat exchanger. This unwanted cooling can be unpleasing or otherwise cause discomfort to individuals in the enclosure (e.g., cooling the enclosure during the winter). In addition, physically changing or adding components to the system is time consuming, and thus it is inconvenient and often times causes delays with system operation. The cogenerations systems of the present disclosure are not so limited. In one illustrative embodiment, the cogeneration system 15 can be configured to prevent an accumulation of excess ice or otherwise de-ice the outside heat exchanger 460 without cooling the enclosure 500 or changing components. In an example application, the heat pump 405 can be operated by itself (i.e., without the heat engine 105) to heat the outside heat exchanger 460, and thus prevent an accumulation of ice or melt ice present on the heat exchanger. In such an application, the thermal storage system 530 can provide thermal energy to operate the heat pump 405 instead of the outside heat exchanger 460. In more detail, as illustrated in FIG. 15, the working fluid of the heat pump 405 absorbs thermal energy from the heat transfer fluid moving through the evaporator 450, as previously described herein. As a result, the temperature of the heat transfer fluid is reduced (as indicated by lightly dotted shading). Upon exiting the evaporator 450, the low-temperature heat transfer fluid can move from the heat pump 405 valve arrangement 510 via conduit 200F. From the valve arrangement 510, the low-temperature heat transfer fluid can move to the thermal storage system 530 via conduit 200K. Once at storage system 530, the heat transfer fluid absorbs thermal energy from fluid therein. Upon exiting the thermal storage system 530, the heat transfer fluid is at an increased temperature (as indicated by more heavily dotted shading). The increased-temperature heat transfer fluid moves back to the evaporator 450 via conduits 200H to operate the heat pump 405.

While the working fluid is also absorbing thermal energy from heat transfer fluid in conduit 200F, the heat transfer fluid in conduit 200E absorbs thermal energy from the working fluid of the heat pump 405 to raise its temperature. The high-temperature heat transfer fluid can then be supplied to the outside heat exchanger 460 to heat or otherwise de-ice the heat exchanger 460. In more detail, as illustrated in the embodiment of FIG. 15, high-temperature heat transfer fluid (as indicated by solid shading) moves from the condenser 430 to the valve arrangement 510 via conduits 200E and 200A. From the valve arrangement 510, the high-temperature heat transfer fluid can move to the outside heat exchanger 460 via conduit 200G. Once at the heat exchanger 460, ambient air of the surrounding environment absorbs the thermal energy from the heat transfer fluid thereby causing the ice formed on the heat exchanger to melt. Upon exiting the heat exchanger 460, the heat transfer fluid is at a reduced temperature (as indicated by shading with zig-zag lines) and moves to the condenser 430 via conduits 200H to repeat the de-icing cycle.

Figure 16:
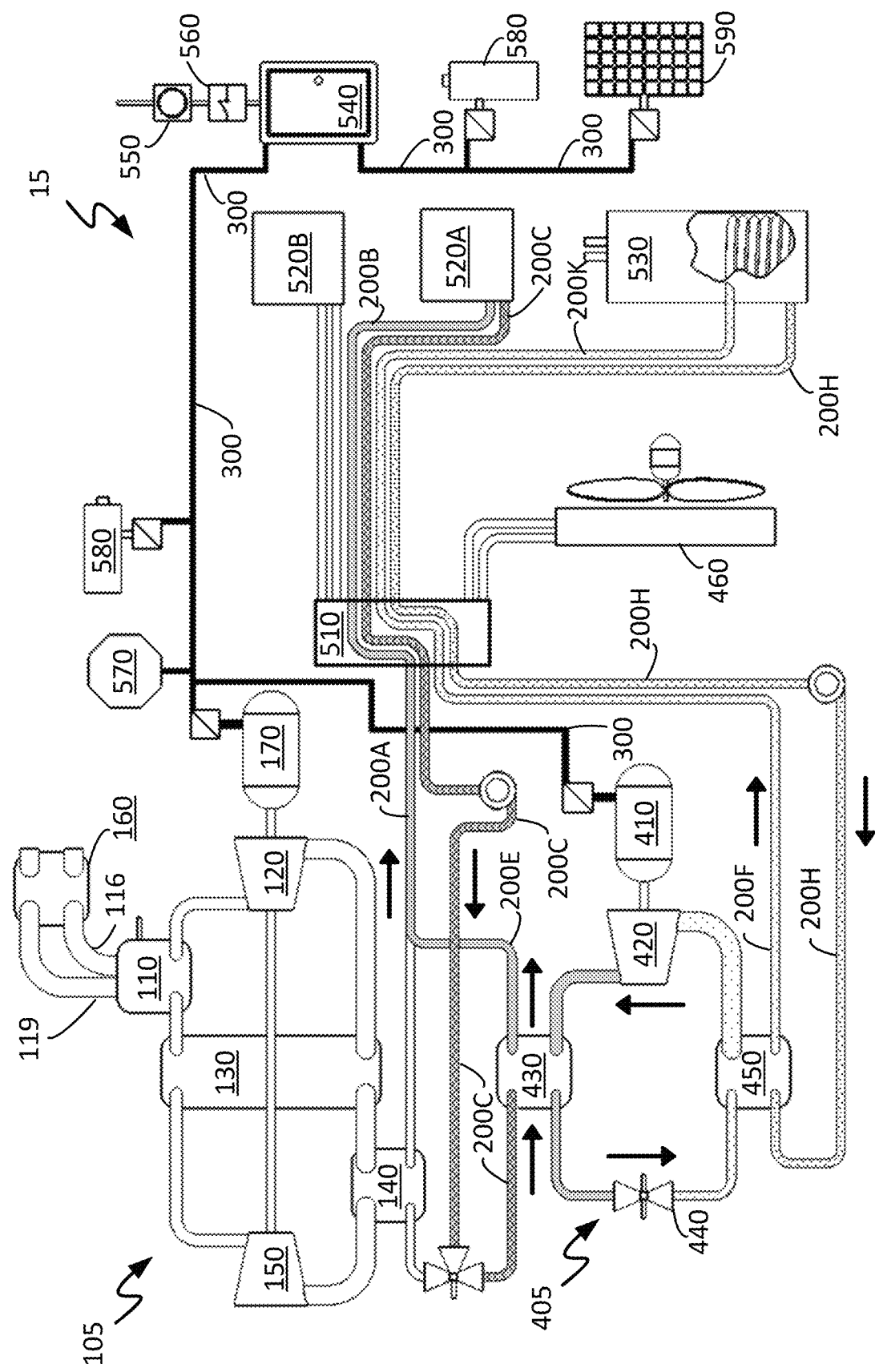
FIG. 16 is a schematic diagram of a cogeneration system configured to supply space heating to the enclosure using a heat pump and a thermal storage system, in accordance with an embodiment of the present disclosure.

FIG. 16 is a schematic diagram of a cogeneration system 15 configured to supply space heating to the enclosure 500 using a heat pump 405 and a thermal storage system 530, in accordance with an embodiment of the present disclosure. The cogeneration system 15, in some embodiments, can be configured to use the thermal storage system 530 as high-temperature reservoir rather than utilizing the outside heat exchanger 460. Such a configuration may be preferable as the temperature of the ambient air of the surrounding environment decreases. This is particularly the case, when the temperature of the surrounding environment is approximately the same as the heat transfer fluid so that there is little or no thermal energy transferred from one to the other. To avoid such situations, the cogeneration system 15 can utilize the stored energy of the thermal storage system 530 as a heat source to operate the heat pump 405. As previously described above, the working fluid of the heat pump 405 absorbs thermal energy from the heat transfer fluid moving through the evaporator 450, as previously described herein. As a result, the temperature of the heat transfer fluid is reduced (as indicated by lightly dotted shading). Upon exiting the evaporator 450, the low-temperature heat transfer fluid can move from the heat pump 405 to the valve arrangement 510 via conduit 200F. From the valve arrangement 510, the low-temperature heat transfer fluid can move to the thermal storage system 530 via conduit 200K. Once at storage system 530, the heat transfer fluid absorbs thermal energy from fluid therein. Upon exiting the thermal storage system 530, the heat transfer fluid is at an increased temperature (as indicated by more heavily dotted shading). The increased-temperature heat transfer fluid moves back to the evaporator 450 via conduits 200H to operate the heat pump 405. In addition, the heat transfer fluid in conduit 200E absorbs thermal energy from the working fluid of the heat pump 405 and is transmitted to the inside heat exchanger 520A to heat the enclosure, as previously described herein.

Figure 17:
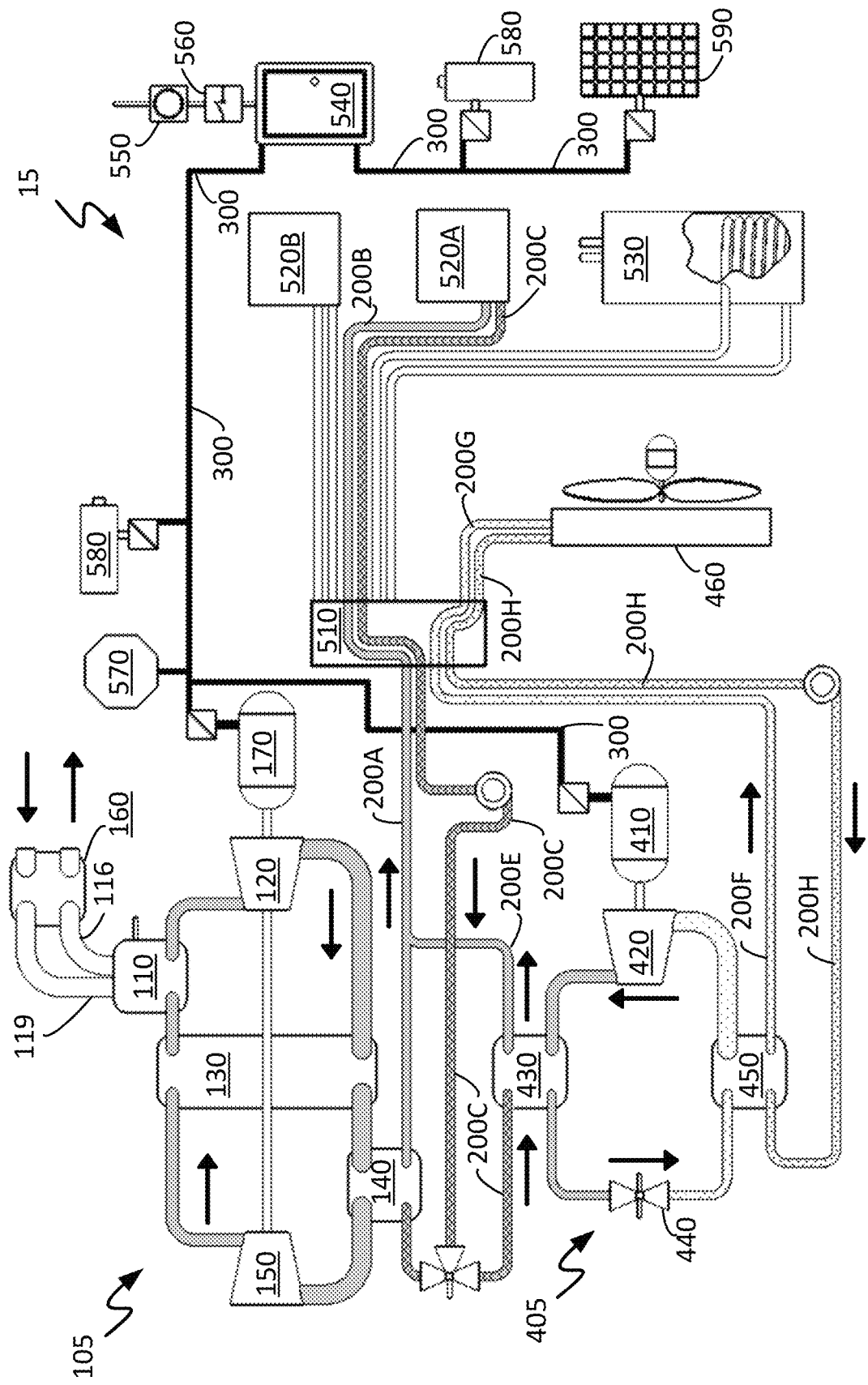
FIG. 17 is a schematic diagram of a cogeneration system configured to supply space heating and electricity to the enclosure using a heat pump, a heat engine, and a heat reservoir, in accordance with an embodiment of the present disclosure.

FIG. 17 is a schematic diagram of a cogeneration system 15 configured to supply space heating to the enclosure 500 using a heat pump 405, a heat engine 105 and a heat reservoir (an outside heat exchanger 460), in accordance with an embodiment of the present disclosure.

Figure 18:
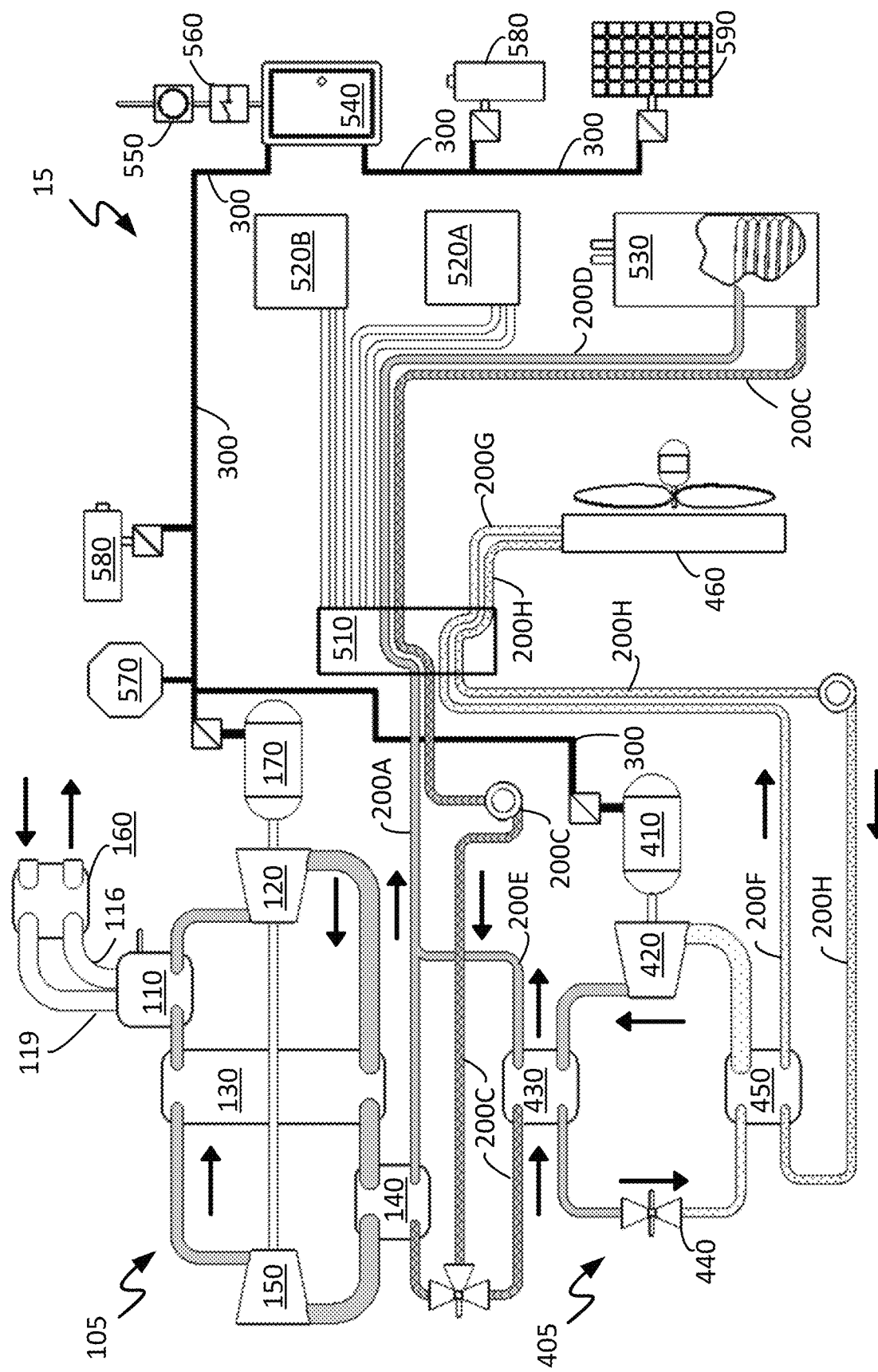
FIG. 18 is a schematic diagram of a cogeneration system configured to supply water heating and electricity to the enclosure using a heat pump and a heat engine, in accordance with an embodiment of the present disclosure.

FIG. 18 is a schematic diagram of a cogeneration system 15 configured to supply water heating to the enclosure 500 using a heat pump 405 and a heat engine 105, in accordance with an embodiment of the present disclosure.

Figure 19:
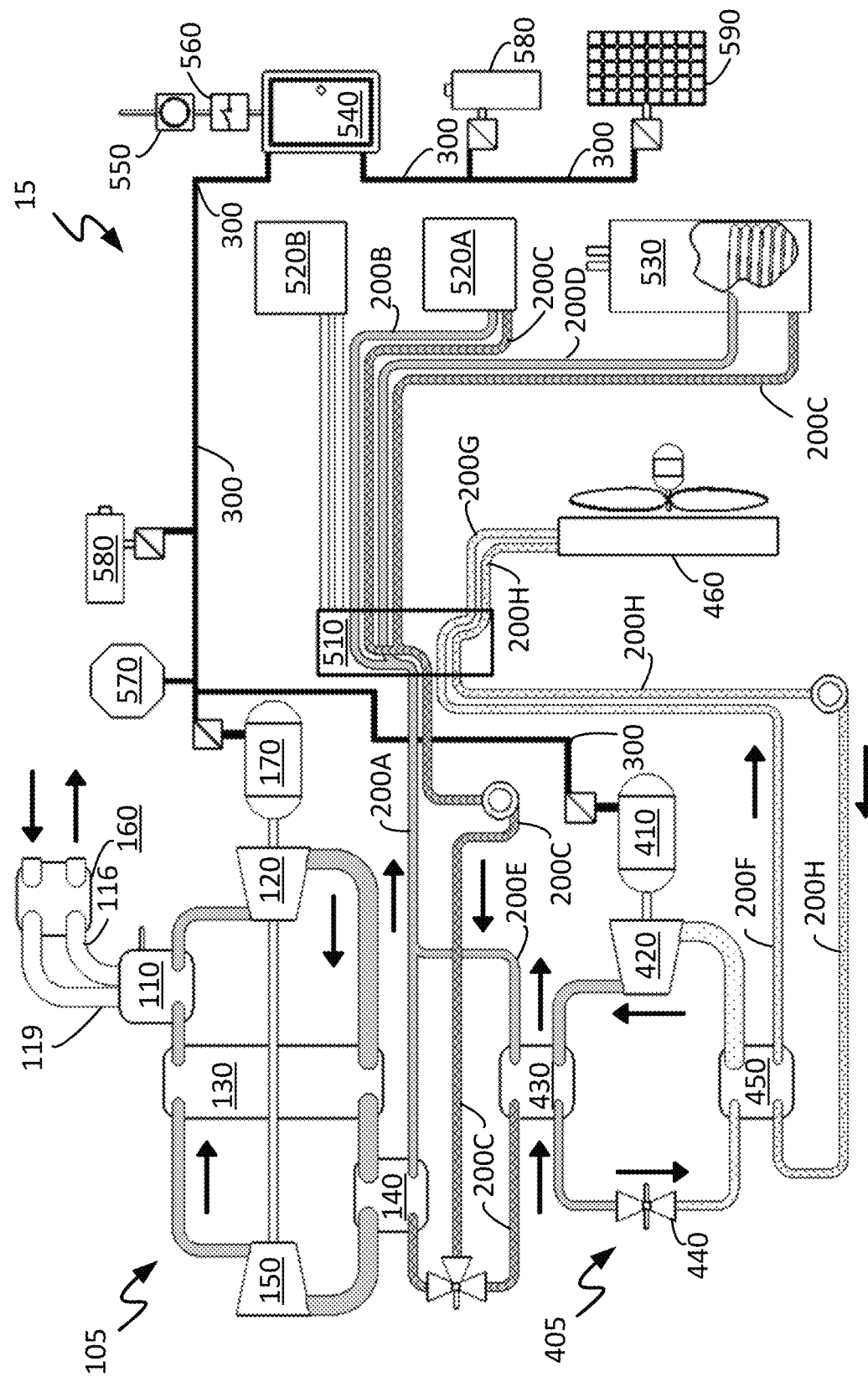
FIG. 19 is a schematic diagram of a cogeneration system configured to supply space and water heating and electricity to the enclosure using a heat pump and a heat engine, in accordance with an embodiment of the present disclosure.

FIG. 19 is a schematic diagram of a cogeneration system 15 configured to supply space and water heating to the enclosure 500 using a heat pump 405 and a heat engine 105, in accordance with an embodiment of the present disclosure.

As shown in FIGS. 17-19, the cogeneration system 15, in some instances, can operate both the heat engine 105 and heat pump 405 to heat the enclosure 500. There are number situations in which the cogeneration system may operate both the heat engine 105 and heat pump 405. In one such situation, for example, the heating demands for the enclosure 500 may exceed the thermal output of the heat engine 105 by itself. In other cases, it may be more cost effective to use electricity generated by the heat engine 105 rather than from the grid (e.g., at peak times of energy consumption). Or in yet other cases, electricity may not be available from electrical energy suppliers via the grid (e.g., electrical supplier disconnects enclosure from the grid or during a blackout).

In an example embodiment, as shown in FIGS. 17-19, the heat engine 105 can produce both thermal and electrical energy, as previously described herein. A portion of the electricity produced by the heat engine 105 can be used to operate the heat pump. The remaining portion of the electricity can be used to power electrical components of the enclosure 500 (e.g., power panel 540 and control panel 570) or be stored by electrical energy storage system 580 for future use. As can be seen, the heat transfer fluids within conduits 200A (i.e. first conduit) and 200E (i.e. second conduit) each absorb thermal energy from the working fluids of the heat engine 105 and heat pump 405 (respectively). As discussed above and as shown in FIGS. 3 and 4, the high-temperature heat transfer fluids can be combined in series or parallel fashion so that the fluid is moved to the inside heat exchanger 520A to heat the enclosure 500. In addition, the working fluid of the heat pump 405 can also absorb thermal energy from the heat transfer fluid in the conduit 200F (i.e. third conduit) in communication with other cogeneration system components (e.g., the outside heat exchanger 460 or thermal storage system 530) to operate the heat pump 405, as previously described herein. In some other applications, the combined high-temperature heat transfer fluid can also be supplied to the thermal storage system 530, as shown in FIG. 18, to store thermal energy. In yet other applications, the cogeneration system 15 may move the combined high-temperature heat transfer fluid to both the inside heat exchanger 520A and thermal storage system 530 to accomplish both space heating of the enclosure 500 and water heating, as shown in FIG. 19. As previously described herein, the cogeneration system 15 can be configured to perform both space heating and water heating operations simultaneously or one at a time. In some such cases, water heating may occur only periodically while space heating is performed. Numerous other cogeneration system applications will be apparent in light of the present disclosure.

Figure 20:
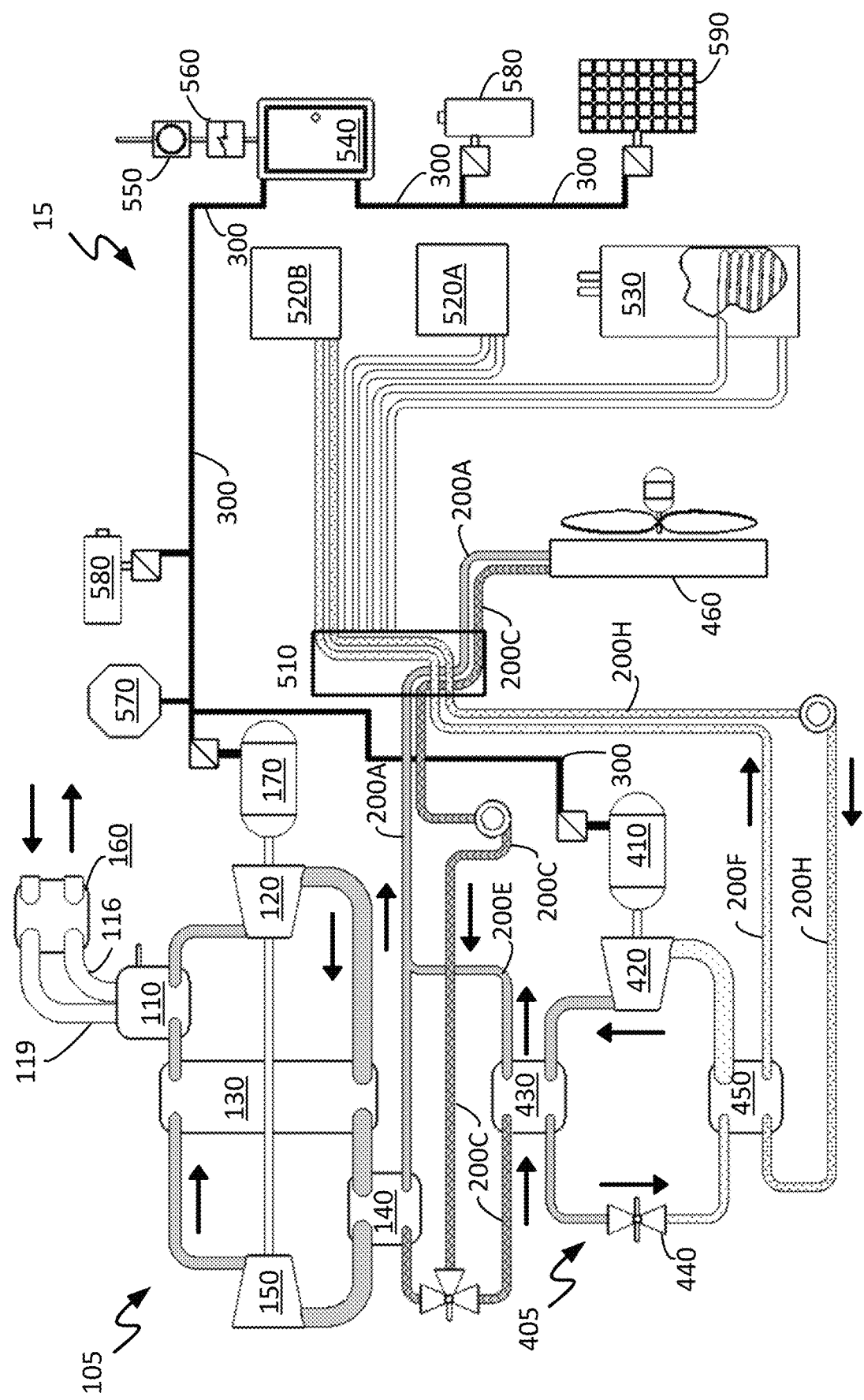
FIG. 20 is a schematic diagram of a cogeneration system configured to supply space cooling and electricity to the enclosure using a heat pump and a heat engine, in accordance with an embodiment of the present disclosure.

FIG. 20 is a schematic diagram of a cogeneration system 15 configured to supply space cooling to the enclosure using a heat pump 405 and a heat engine 105, in accordance with an embodiment of the present disclosure.

Figure 21:
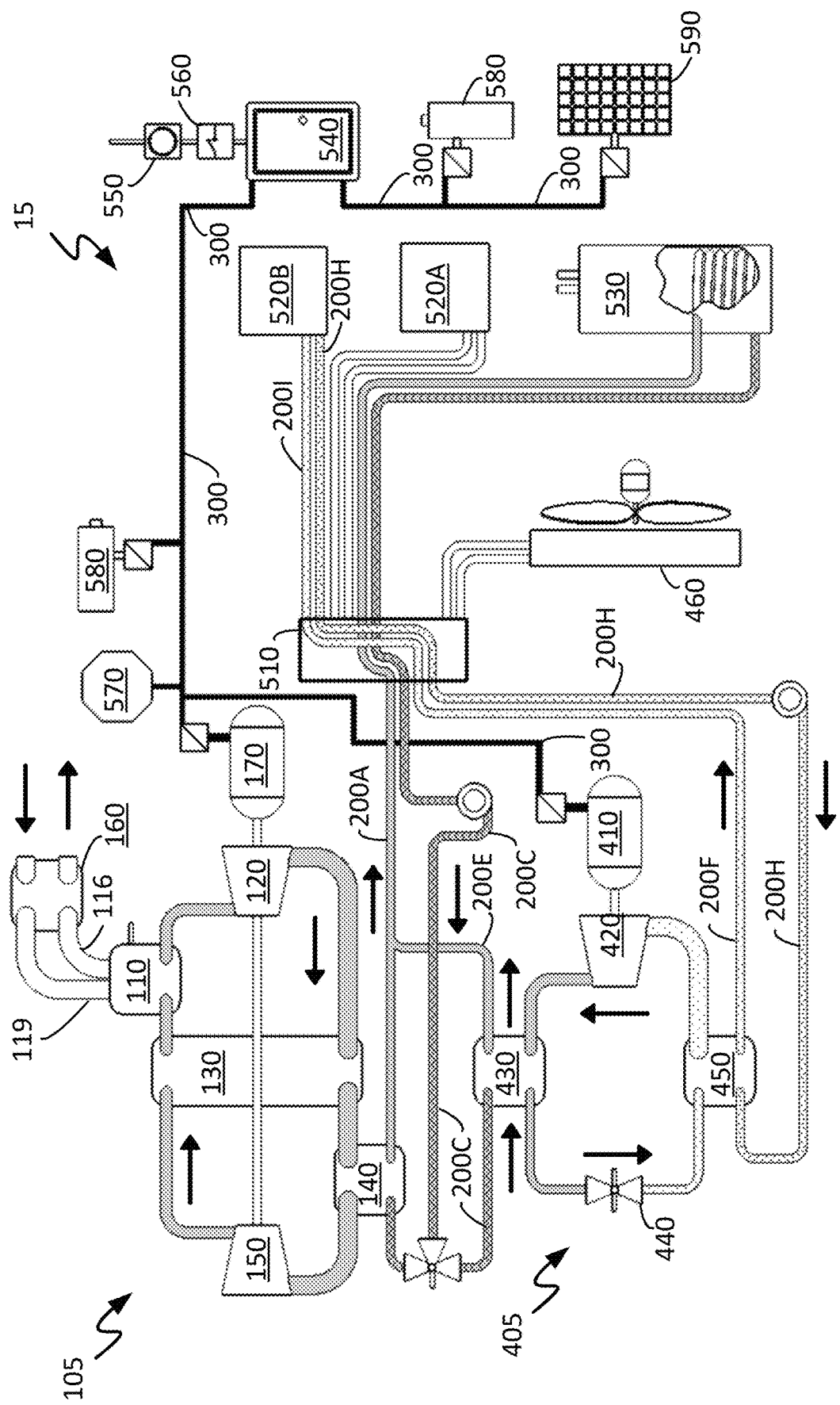
FIG. 21 is a schematic diagram of a cogeneration system configured to supply water heating and space cooling and electricity to the enclosure using a heat pump and a heat engine, in accordance with an embodiment of the present disclosure.

FIG. 21 is a schematic diagram of a cogeneration system 15 configured to supply water heating and space cooling to the enclosure using a heat pump 405 and a heat engine 105, in accordance with an embodiment of the present disclosure.

As shown in the embodiments illustrated in FIGS. 20 and 21, the cogeneration system 15 can operate both the heat engine 105 and heat pump 405 to cool the enclosure 500, as previously described above. In an example embodiment, as shown, the heat engine 105 can produce both thermal and electrical energy, as previously described herein. Some of the electricity from the heat engine 105 can be used to operate the heat pump 405 to supply cooling to the enclosure 500. As can be seen, the heat transfer fluids within conduits 200A (first conduit) and 200E (second conduit) each absorb thermal energy from the working fluids of the heat engine 105 and heat pump 405 (respectively). The high-temperature heat transfer fluids can be combined to transfer unwanted thermal energy from the heat engine 105 and heat pump 405 to an outside heat exchanger 460 at which the energy can be absorbed into the environment, as previously described herein. In some other applications, the combined high-temperature heat transfer fluid can also be supplied to the thermal storage system 530, as shown in FIG. 21, to store thermal energy produced by the heat engine 105 and heat pump 405 for subsequent use by the cogeneration system components. In addition, the working fluid of the heat pump 405 can also absorb thermal energy from the heat transfer fluid in conduit 200F (third conduit) in communication with other cogeneration system components (e.g., the inside heat exchanger 520B) to supply cooling to the enclosure 500, as previously described herein.

Figure 22:
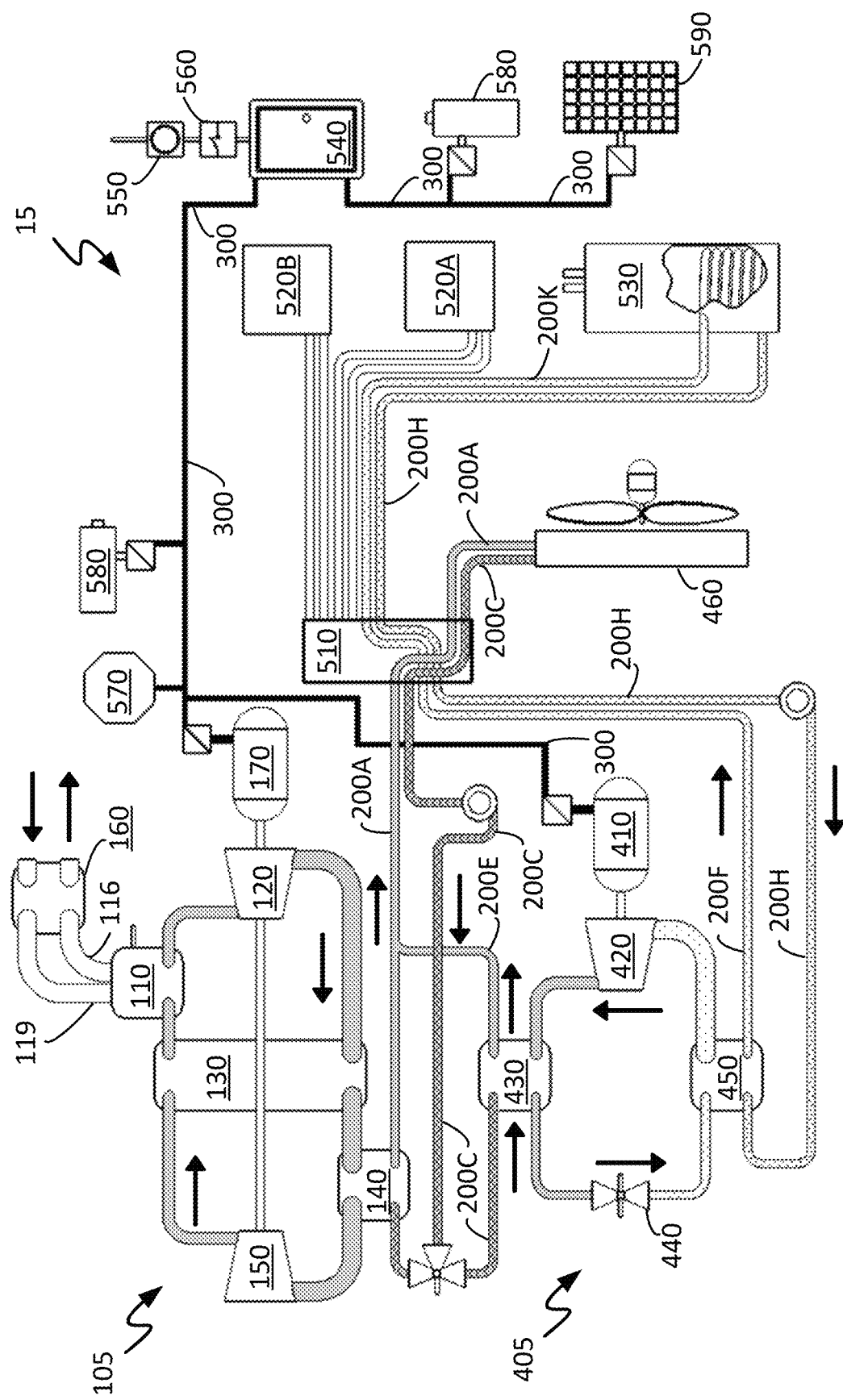
FIG. 22 is a schematic diagram of a cogeneration system configured to de-ice the point of contact to a heat reservoir and provide electricity to the enclosure using a heat pump and a heat engine, in accordance with an embodiment of the present disclosure.

FIG. 22 is a schematic diagram of a cogeneration system 15 configured to de-ice a heat reservoir such as an outside heat exchanger 460 using a heat pump 405 and a heat engine 105, in accordance with an embodiment of the present disclosure.

Figure 23:
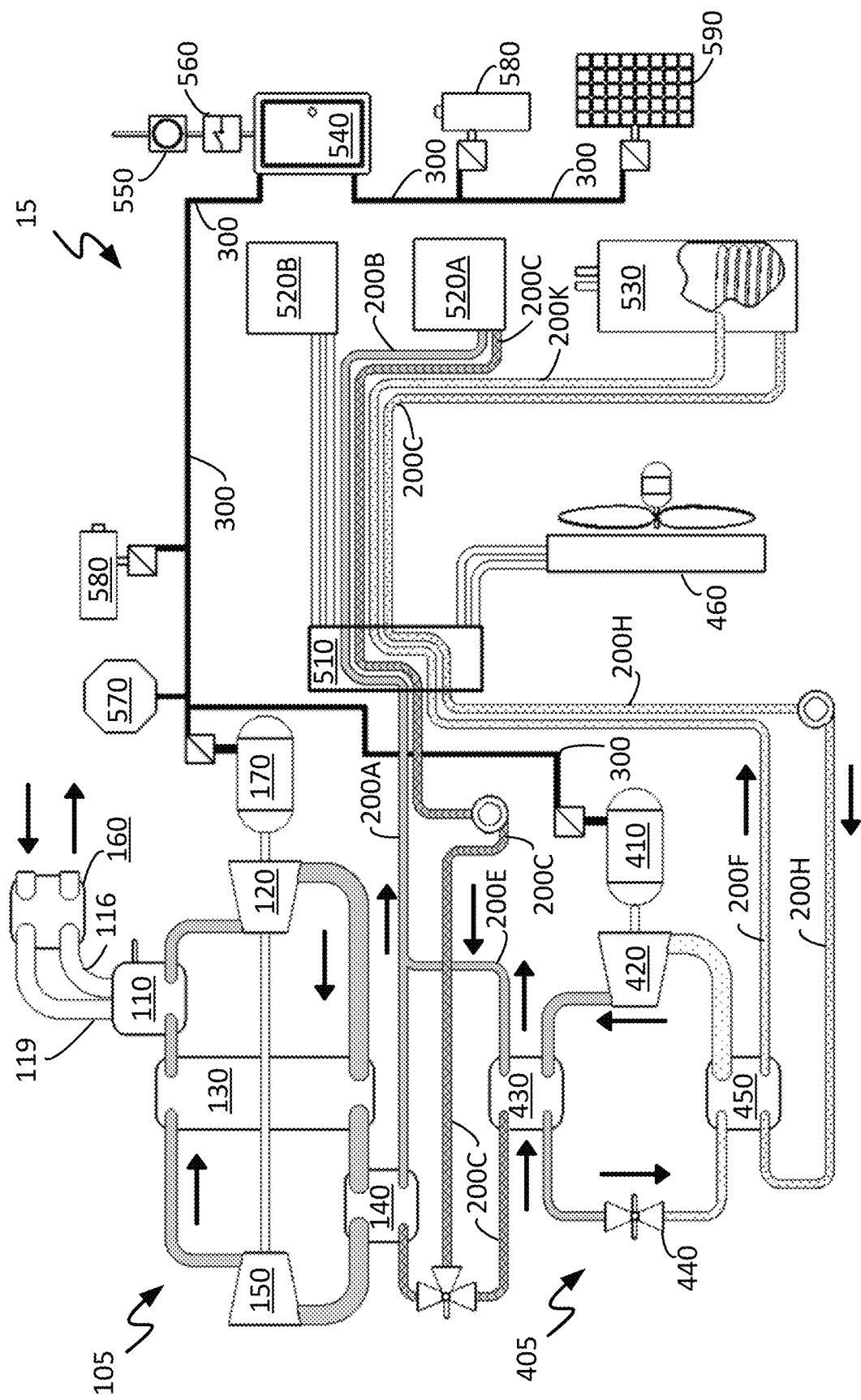
FIG. 23 is a schematic diagram of a cogeneration system configured to supply space heating and electricity to the enclosure using a heat pump, heat engine, and a thermal storage system, in accordance with an embodiment of the present disclosure.

FIG. 23 is a schematic diagram of a cogeneration system 15 configured to supply space heating to the enclosure 500 using a heat pump 405, heat engine 105, and a thermal storage system 530, in accordance with an embodiment of the present disclosure.

As shown in the embodiments illustrated in FIGS. 22 and 23, the cogeneration system 15 may be configured to utilize the thermal storage system 530 as a high-temperature reservoir instead of the outside heat exchanger 460. This is particularly the case when the outside heat exchanger 460 forms ice thereon or the air temperature of the environment is so low as to adversely affect the performance of the heat pump 405. In an example application, the heat pump 405 can receive thermal energy from the thermal storage system 530 via the heat transfer fluid in conduit 200F. As can be seen, the thermal energy produced by the heat engine 105 and heat pump 405 can be transferred to the outside heat exchanger 460 via high-temperature heat transfer fluid within conduits 200A and 200E. Once received, the high-temperature heat transfer fluid can transfer thermal energy to the outside heat exchanger 460 and thereby causing the ice formed thereon to melt. Similarly, the cogeneration system 15 can direct the high-temperature heat transfer fluid to inside heat exchanger 520A to heat the enclosure 500, as shown in FIG. 23. Numerous other cogeneration system applications will be apparent in light of the present disclosure.

SUMMARY

One example embodiment of the present disclosure provides a cogeneration system for providing heating, cooling, and electricity to an enclosure, the cogeneration system including a heat engine configured for heating and supplying electricity to the enclosure; a heat pump configured for heating and cooling of the enclosure; a first conduit coupled to the heat engine, wherein the first conduit is filled with a first heat transfer fluid, and the first conduit is constructed and arranged to transfer the first heat transfer fluid from the heat engine to the enclosure such that thermal energy is transferred from the first heat transfer fluid to the enclosure to provide heating to the enclosure; a second conduit coupled to the heat pump, wherein the second conduit is filled with the first heat transfer fluid, and the second conduit is constructed and arranged to transfer the first heat transfer fluid from the heat pump to the enclosure such that thermal energy is transferred from the first heat transfer fluid to the enclosure to provide heating to the enclosure; and a third conduit coupled to the heat pump, wherein the third conduit is filled with a second heat transfer fluid, and the third conduit is constructed and arranged to transfer the second heat transfer fluid from the heat pump to the enclosure such that thermal energy is absorbed by the second heat transfer fluid from the enclosure to provide cooling to the enclosure; and wherein said heat pump is configured to supply heating and cooling to the enclosure simultaneously.

Another example embodiment of the present disclosure provides a cogeneration system for providing heating and electricity to an enclosure, the cogeneration system including a heat engine configured for heating and supplying electricity to the enclosure; a heat pump configured for heating of the enclosure; a first conduit coupled to the heat engine, wherein said first conduit is filled with a heat transfer fluid, and the first conduit is constructed and arranged to transfer the heat transfer fluid from the heat engine to the enclosure such that thermal energy is transferred from the heat transfer fluid to the enclosure to provide heating to the enclosure; and a second conduit coupled to the heat pump and the first conduit, wherein the second conduit is filled with the heat transfer fluid, and said second conduit is constructed and arranged to transfer the heat transfer fluid from the heat pump to the enclosure such that thermal energy is transferred from the heat transfer fluid to the enclosure to provide heating to the enclosure; and wherein the first conduit and the second conduit are fluidly coupled such that the heat transfer fluid in the first conduit is the same as the heat transfer fluid in the second conduit.

Another example embodiment of the present disclosure provides a cogeneration system for providing heating and electricity to an enclosure, the cogeneration system including a heat engine configured to produce heating and electricity for the enclosure; a heat pump configured to produce heating for the enclosure; a heat reservoir constructed and arranged to transfer thermal energy from an area outside of the enclosure to the heat pump; a thermal storage system associated with the enclosure and including a thermal storage system heat exchanger; a first conduit coupled to the heat engine, wherein the first conduit is filled with a first heat transfer fluid, and the first conduit is constructed and arranged to transfer the first heat transfer fluid from the heat engine to the thermal storage system heat exchanger such that thermal energy is transferred from the first heat transfer fluid to the thermal storage system; and a second conduit coupled to the heat pump, wherein the second conduit is filled with the first heat transfer fluid, and the second conduit is constructed and arranged to transfer the first heat transfer fluid from the heat pump to the thermal storage system heat exchanger such that thermal energy is transferred from the first heat transfer fluid to the thermal storage system; and wherein the first conduit and the second conduit are fluidly coupled to the thermal storage system heat exchanger such that the first heat transfer fluid from the first conduit and the second conduit is transferred to the thermal storage system heat exchanger to store thermal energy within the thermal storage system.

Another example embodiment of the present disclosure provides a cogeneration system for providing heating, cooling and electricity to an enclosure, the cogeneration system including a heat engine configured to produce heating and electricity for the enclosure; a heat pump configured to produce heating and cooling for the enclosure; a first conduit coupled to the heat engine, wherein the first conduit is filled with a first heat transfer fluid, and the first conduit is constructed and arranged to transfer the first heat transfer fluid from the heat engine to the enclosure such that thermal energy is transferred from the first heat transfer fluid to the enclosure to provide heating to the enclosure; a second conduit coupled to the heat pump, wherein the second conduit is filled with the first heat transfer fluid, and the second conduit is constructed and arranged to transfer the first heat transfer fluid from the heat pump to the enclosure such that thermal energy is transferred from the first heat transfer fluid to the enclosure to provide heating to the enclosure; a third conduit coupled to the heat pump, wherein said third conduit is filled with a second heat transfer fluid, and the third conduit is constructed and arranged to transfer the second heat transfer fluid from the heat pump to the enclosure such that thermal energy is absorbed by the second heat transfer fluid from the enclosure to provide cooling to the enclosure; and a valve arrangement constructed and arranged to selectively couple the first conduit and the second conduit to transfer the first heat transfer fluid to the enclosure to provide at least one of space heating and water heating, and to selectively couple the third conduit to transfer the second heat transfer fluid to the enclosure to provide at least one of space cooling and a source of thermal energy for the heat pump.

Another example embodiment of the present disclosure provides a cogeneration system for providing heating, cooling, and electricity to an enclosure, the cogeneration system including a heat engine configured for heating and supplying electricity to the enclosure; a heat pump configured for heating and cooling of the enclosure; a first conduit coupled to the heat engine, wherein the first conduit is filled with a first heat transfer fluid, and the first conduit is constructed and arranged to transfer the first heat transfer fluid from the heat engine to the enclosure such that thermal energy is transferred from the first heat transfer fluid to the enclosure to provide heating to the enclosure; a second conduit coupled to the heat pump, wherein the second conduit is filled with the first heat transfer fluid, and the second conduit is constructed and arranged to transfer the first heat transfer fluid from the heat pump to the enclosure such that thermal energy is transferred from the first heat transfer fluid to the enclosure to provide heating to the enclosure; and a third conduit coupled to said heat pump, wherein said third conduit is filled with a second heat transfer fluid, and the third conduit is constructed and arranged to transfer the second heat transfer fluid from the heat pump to the enclosure such that thermal energy is absorbed by the second heat transfer fluid from the enclosure to provide cooling to the enclosure; and wherein the heat engine is configured to supply electricity to operate the heat pump.

Another example embodiment of the present disclosure provides a method of providing heating, cooling and electricity to an enclosure using a cogeneration system, the method including generating thermal energy and electricity by operation of a heat engine; providing thermal energy by operation of a heat pump using the electricity from the heat engine; transferring thermal energy from the heat engine and the heat pump to a first heat transfer fluid; providing at least one of space heating and water heating to the enclosure via the first heat transfer fluid at a heating system heat exchanger constructed and arranged to be coupled to a heating system associated with the enclosure; and providing space cooling to the enclosure by operation of the heat pump via a second heat transfer fluid that absorbs thermal energy from the enclosure at a cooling system heat exchanger constructed and arranged to be coupled to a cooling system associated with the enclosure, wherein at least one of space heating and water heating are provided to the enclosure simultaneously with space cooling to the enclosure.

Another example embodiment of the present disclosure provides a method of providing heating, cooling and electricity to an enclosure using a cogeneration system, the method including generating thermal energy and electricity by operation of a heat engine; providing thermal energy by operation of a heat pump; transferring thermal energy from the heat engine and the heat pump to a first heat transfer fluid; moving the first heat transfer fluid through a valve arrangement, the valve arrangement constructed and arranged to distribute the first heat transfer fluid to one or more cogeneration system components; providing at least one of space heating and water heating to the enclosure via the first heat transfer fluid at a heating system heat exchanger constructed and arranged to be coupled to a heating system associated with the enclosure; moving a second heat transfer fluid through the valve arrangement, the valve arrangement constructed and arranged to distribute the second heat transfer fluid to one or more cogeneration system components without the first heat transfer fluid contacting the second heat transfer fluid; and providing space cooling to the enclosure by operation of the heat pump via the second heat transfer fluid that absorbs thermal energy from the enclosure at a cooling system heat exchanger constructed and arranged to be coupled to a cooling system associated with the enclosure.

Another example embodiment of the present disclosure provides a method of providing heating, cooling and electricity to an enclosure using a cogeneration system, the method including generating thermal energy and electricity by operation of a heat engine; providing thermal energy by operation of a heat pump; transferring thermal energy from the heat engine and the heat pump to a first heat transfer fluid; providing at least one of space heating and water heating to the enclosure via the first heat transfer fluid at a heating system heat exchanger constructed and arranged to be coupled to a heating system associated with the enclosure; and providing thermal energy to a thermal storage system heat exchanger via at least one of the first heat transfer fluid and a second heat transfer fluid, the thermal storage system heat exchanger constructed and arranged to be coupled to a thermal storage system associated with the enclosure.

Yet another example embodiment of the present disclosure provides a cogeneration system including a heat engine and a heat pump which may be configured to provide only heating (for example for space heating, water heating, and/or process heating) but no electric output. Unlike the state of the art in other engine-driven heat pumps, this cogeneration system may go through the intermediate stage of producing electricity, 100% of which would be used to drive the heat pump, thus no electric output.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A method of providing heating, cooling and electricity to an enclosure using a cogeneration system, the method comprising:
   generating thermal energy and electricity by operation of a heat engine configured for heating the enclosure via a first heat transfer fluid;
   providing thermal energy by operation of a heat pump using the electricity from the heat engine, the heat pump configured for heating the enclosure via only the first heat transfer fluid;
   transferring thermal energy from the heat engine and the heat pump to the first heat transfer fluid via a first conduit coupled to the heat engine and filled with the first heat transfer fluid and a second conduit coupled to the heat pump and filled with the second heat transfer fluid;
   providing at least one of space heating and water heating to the enclosure via the first heat transfer fluid at a heating system heat exchanger constructed and arranged to be coupled to a heating system associated with the enclosure; and
   providing space cooling to the enclosure by operation of the heat pump via a second heat transfer fluid that absorbs thermal energy from the enclosure at a cooling system heat exchanger constructed and arranged to be coupled to a cooling system associated with the enclosure, wherein at least one of space heating and water heating are provided to the enclosure simultaneously with space cooling to the enclosure.

2. The method of claim 1, further comprising:
   providing thermal energy to a thermal storage system heat exchanger, the thermal storage system heat exchanger constructed and arranged to be coupled to a thermal storage system associated with the enclosure.

3. The method of claim 2, wherein at least one of space heating and water heating is provided to the enclosure before thermal energy is provided to the thermal storage system heat exchanger.

4. The method of claim 2, wherein thermal energy is provided to the thermal storage system periodically to maintain an amount of thermal energy stored in the thermal storage system above a threshold level.

5. The method of claim 2, further comprising:
providing thermal energy from the thermal storage system heat exchanger to the second heat transfer fluid; and
providing thermal energy from the second heat transfer fluid to a heat reservoir to prevent excess ice from accumulating on the heat reservoir.

6. The method of claim 2, further comprising:
providing thermal energy from the thermal storage system heat exchanger to the second heat transfer fluid; and
providing thermal energy to the heat pump by absorption of thermal energy from the second heat transfer fluid to operate the heat pump.

7. The method of claim 2, further comprising providing electricity to an electrical energy storage system, the electrical energy storage system constructed and arranged to selectively transfer the electricity to at least one of the heat pump and a power panel.

8. A method of providing heating, cooling and electricity to an enclosure using a cogeneration system, the method comprising:
generating thermal energy and electricity by operation of a heat engine configured for heating the enclosure via a first heat transfer fluid;
providing thermal energy by operation of a heat pump, the heat pump configured for heating the enclosure via only the first heat transfer fluid;
transferring thermal energy from the heat engine and the heat pump to the first heat transfer fluid via a first conduit coupled to the heat engine and filled with the first heat transfer fluid and a second conduit coupled to the heat pump and filled with the second heat transfer fluid;
moving the first heat transfer fluid through a valve arrangement, the valve arrangement constructed and arranged to distribute the first heat transfer fluid to one or more cogeneration system components;
providing at least one of space heating and water heating to the enclosure via the first heat transfer fluid at a heating system heat exchanger constructed and arranged to be coupled to a heating system associated with the enclosure;
moving a second heat transfer fluid through the valve arrangement, the valve arrangement constructed and arranged to distribute the second heat transfer fluid to one or more cogeneration system components without the first heat transfer fluid contacting the second heat transfer fluid; and
providing space cooling to the enclosure by operation of the heat pump via the second heat transfer fluid that absorbs thermal energy from the enclosure at a cooling system heat exchanger constructed and arranged to be coupled to a cooling system associated with the enclosure.

9. The method of claim 8, further comprising:
moving the first heat transfer fluid from at least one of the heat engine and heat pump and through the valve arrangement in a first direction to supply thermal energy to the heating system heat exchanger to provide heating to the enclosure; and
moving the first heat transfer fluid from the heating system heat exchanger and through the valve arrangement in a second direction opposite the first direction to return the first heat transfer fluid to at least one of the heat engine and the heat pump so that the first heat transfer fluid absorbs further thermal energy from at least one of the heat engine and the heat pump.

10. The method of claim 8, further comprising:
moving the second heat transfer fluid from the heat pump and through the valve arrangement in a first direction to receive thermal energy from the cooling system heat exchanger to provide cooling to the enclosure; and
moving the second heat transfer fluid from the cooling system heat exchanger and through the valve arrangement in a second direction opposite the first direction to return the second heat transfer fluid the heat pump at which further thermal energy is transferred from the second heat transfer fluid to the heat pump.

11. The method of claim 8, further comprising:
moving the second heat transfer fluid from a thermal storage system heat exchanger and through the valve arrangement in a first direction to supply thermal energy to the heat pump to operate the heat pump; and
moving the second heat transfer fluid from the heat pump and through the valve arrangement in a second direction opposite the first direction to return the second heat transfer fluid to the thermal storage system heat exchanger.

12. The method of claim 8, further comprising:
moving the second heat transfer fluid from a thermal storage system heat exchanger and through the valve arrangement in a first direction to supply thermal energy to heat reservoir to prevent excess ice from accumulating on the heat reservoir; and
moving the second heat transfer fluid from the heat reservoir and through the valve arrangement in a second direction opposite the first direction to return the second heat transfer fluid to the thermal storage system heat exchanger.

13. A method of providing heating, cooling and electricity to an enclosure using a cogeneration system, the method comprising:
generating thermal energy and electricity by operation of a heat engine configured for heating the enclosure via a first heat transfer fluid;
providing thermal energy by operation of a heat pump, the heat pump configured for heating the enclosure via only the first heat transfer fluid;
transferring thermal energy from the heat engine and the heat pump to the first heat transfer fluid via a first conduit coupled to the heat engine and filled with the first heat transfer fluid and a second conduit coupled to the heat pump and filled with the second heat transfer fluid;
providing at least one of space heating and water heating to the enclosure via the first heat transfer fluid at a heating system heat exchanger constructed and arranged to be coupled to a heating system associated with the enclosure; and
providing thermal energy to a thermal storage system heat exchanger via at least one of the first heat transfer fluid and a second heat transfer fluid, the thermal storage system heat exchanger constructed and arranged to be coupled to a thermal storage system associated with the enclosure.

14. The method of claim 13, further comprising providing space cooling to the enclosure via the second heat transfer fluid that absorbs thermal energy from the enclosure at a cooling system heat exchanger constructed and arranged to be coupled to a cooling system associated with the enclosure.

15. The method of claim 13, further comprising supplying electricity generated by the heat engine to one or more energy suppliers.

16. The method of claim 13, wherein thermal energy is provided to the thermal storage system periodically to maintain an amount of thermal energy stored in the thermal storage system above a threshold level.

* * * * *